(12) United States Patent
Salafia et al.

(10) Patent No.: US 8,565,507 B2
(45) Date of Patent: Oct. 22, 2013

(54) AUTOMATED PLACENTAL MEASUREMENT

(75) Inventors: Carolyn M. Salafia, Larchmont, NY (US); Richard K. Miller, Pittsford, NY (US)

(73) Assignee: University of Rochester, Rochester, NY (US)

(*) Notice: Subject to any disclaimer, the term of this patent is extended or adjusted under 35 U.S.C. 154(b) by 724 days.

(21) Appl. No.: 12/718,445

(22) Filed: Mar. 5, 2010

(65) Prior Publication Data
US 2010/0220916 A1 Sep. 2, 2010

Related U.S. Application Data

(63) Continuation-in-part of application No. 12/153,724, filed on May 23, 2008, now Pat. No. 8,107,710.

(60) Provisional application No. 61/202,510, filed on Mar. 6, 2009.

(51) Int. Cl.
*G06K 9/00* (2006.01)
*A61B 10/00* (2006.01)

(52) U.S. Cl.
USPC .............................. 382/133; 382/134; 600/562

(58) Field of Classification Search
USPC .............................. 382/128, 133, 134; 600/562
See application file for complete search history.

(56) References Cited

U.S. PATENT DOCUMENTS

| | | | |
|---|---|---|---|
| 5,433,204 A | 7/1995 | Olson | |
| 6,130,071 A | 10/2000 | Alitalo et al. | |
| 7,399,278 B1 | 7/2008 | Ross | |
| 7,606,394 B2 | 10/2009 | Mirtsching | |
| 7,613,330 B2 | 11/2009 | Mirtsching et al. | |
| 8,107,710 B2* | 1/2012 | Salafia et al. | 382/133 |
| 2002/0186875 A1* | 12/2002 | Burmer et al. | 382/133 |
| 2005/0203353 A1 | 9/2005 | Ma et al. | |
| 2006/0036373 A1* | 2/2006 | Ghosh et al. | 702/20 |
| 2008/0192897 A1 | 8/2008 | Piorek et al. | |
| 2009/0023168 A1 | 1/2009 | Park et al. | |
| 2009/0024043 A1 | 1/2009 | MacLeod et al. | |
| 2009/0252392 A1 | 10/2009 | Panarace | |

OTHER PUBLICATIONS

Benirschke, "Architecture of Normal Villous Trees," Chapter 7 in Pathology of the Human Placenta, 2002, pp. 121-173, Springer, New York, NY, USA.

Kaufmann, et al., "Aspects of human fetoplacental vasculogenesis and angiogenesis: II. Changes during normal pregnancy," Placenta, 2004, pp. 114-126, vol. 25, Elsevier, Maryland Heights, MO, USA. Ltd., Maryland Heights, MO, USA.

Demir, et al., "Classification of human placental stem villi: review of structural and functional aspects," Microscopy Research and Technique, 1997, pp. 29-41, vol. 38, Wiley, Hoboken, NJ, USA.

(Continued)

*Primary Examiner* — Rochelle-Ann J Blackman

(74) *Attorney, Agent, or Firm* — Blank Rome LLP

(57) ABSTRACT

A method for analyzing the placenta in two or three dimensions comprising: selecting one or more placental samples to be analyzed; obtaining a digital image of each placental sample; and performing an analysis on the digital images, wherein a mathematical algorithm is applied to the digital image. The results of the analysis are correlated with data on health outcomes in infants, children, or adults and are used to assess future health risks to a patient.

12 Claims, 25 Drawing Sheets

(56) References Cited

OTHER PUBLICATIONS

Kosanke, et al., "Branching patterns of human placental villous trees: perspectives of topological analysis," Placenta, 1993, pp. 591-604, vol. 14, Elsevier, Maryland Heights, MO, USA.

Kaufmann, et al., "Classification of human placental villi: I. Histology," Cell and Tissue Research, 1979, pp. 409-423, vol. 200, Springer, New York, NY, USA.

Kingdom, et al., "Development of the placental villous tree and its consequences for fetal growth," European Journal of Obstetrics & Gynecology and Reproductive Biology, 2000, pp. 35-43, vol. 92, Elsevier, Maryland Heights, MO, USA.

Charnock-Jones, et al., "Aspects of human fetoplacental vasculogenesis and angiogenesis: I. Molecular regulation," Placenta, 2004, pp. 103-113, vol. 25, Elsevier, Maryland Heights, MO, USA.

Mayhew, et al., "Aspects of human fetoplacental vasculogenesis and angiogenesis: III. Changes in complicated pregnancies," Placenta, 2004, pp. 127-139, vol. 25, Elsevier, Maryland Heights, MO, USA.

Demir, et al., "Fetal vasculogenesis and angiogenesis in human placental villi," Acta Anat, 1989, pp. 190-203, vol. 136, Karger AG, Basel, Switzerland.

Castellucci, et al., "Basic Structure of the Villous Trees," Chapter 6 in The Pathology of the Placenta, 2002, pp. 50-120, Springer, New York, NY, USA.

Grether, et al., "Reliability of placental histology using archived specimens," Paediatric Perinatal Epidemiology, 1999, pp. 489-495, vol. 13, Wiley, Hoboken, NJ, USA.

Khong, et al., "Observer reliability in assessing placental maturity by histology," Journal of Clinical Pathology, 1995, pp. 420-423, vol. 48, BMJ, London, UK.

Khong, "Placental vascular development and neonatal outcome," Seminars in Neonatology, 2004, pp. 255-263, vol. 9, Elsevier, Maryland Heights, MO, USA.

Jaddoe, et al., "Hypotheses on the fetal origins of adult diseases: contributions of epidemiological studies," European Journal of Epidemiology, 2006, pp. 91-102, vol. 21, Springer, New York, NY, USA.

De Boo, et al., "The developmental origins of adult disease (Barker) hypothesis," Australian and New Zealand Journal of Obstetrics and Gynaecology, 2006, pp. 4-14, vol. 46, Wiley, Hoboken, NJ, USA.

Barker, et al., "The developmental origins of insulin resistance," Hormone Research, 2005, pp. 2-7, vol. 64, suppl 3, Karger AG, Basel, Switzerland.

Levitt, et al., "The foetal origins of the metabolic syndrome—a South African perspective," Cardiovascular Journal of South Africa, 2002, pp. 179-180, vol. 13, No. 4, Durbanville, South Africa.

Barker, "The fetal origins of type 2 diabetes mellitus," Annals of Internal Medicine, 1999, pp. 322-324, vol. 130, No. 4, pt. 1, Philadelphia, PA, USA.

Adair, et al., "Developmental determinants of blood pressure in adults," Annual Review of Nutrition, 2005, pp. 407-434, vol. 25, Palo Alto, CA, USA.

Levitt, et al., "Adult BMI and fat distribution but not height amplify the effect of low birthweight on insulin resistance and increased blood pressure in 20-year-old South Africans," Diabetologia, 2005, pp. 1118-1125, vol. 48, Springer, New York, NY, USA.

Levitt, et al., "An inverse relation between blood pressure and birth weight among 5 year old children from Soweto, South Africa," Journal of Epidemiology and Community Health, 1999, pp. 264-268. vol. 53, BMJ, London, UK.

Barker, et al., "The intrauterine and early postnatal origins of cardiovascular disease and chronic bronchitis," Journal of Epidemiology and Community Health, 1989, pp. 237-240, vol. 43, BMJ, London, UK.

Barker, et al., "The maternal and fetal origins of cardiovascular disease," Journal of Epidemiology and Community Health, 1992, pp. 8-11, vol. 46, BMJ, London, UK.

Tanis, et al., "Dutch women with a low birth weight have an increased risk of myocardial infarction later in life: a case control study," Reproductive Health, 2005, pp. 1-4, vol. 2, No. 1, Springer, New York, NY, USA.

Rich-Edwards, et al., "Longitudinal study of birth weight and adult body mass index in predicting risk of coronary heart disease and stroke in women," BMJ Online First, 2005, pp. 16, BMJ, London, UK.

Lawlor, et al., "Birth weight is inversely associated with incident coronary heart disease and stroke among individuals born in the 1950s: findings from the Aberdeen Children of the 1950s prospective cohort study," Circulation, 2005, pp. 1414-1418, vol. 112, Lippincott Williams & Wilkins, Hagerstown, MD, USA.

Cooper, et al., "Review: developmental origins of osteoporotic fracture," Osteoporosis International, 2006, pp. 337-347, vol. 17, Springer, New York, NY, USA.

Gluckman, et al., "Life-long echoes—a critical analysis of the developmental origins of adult disease model," Biology of the Neonate, 2005, pp. 127-139, vol. 87, Karger AG, Basel, Switzerland.

Jasienska, et al., "High ponderal index at birth predicts high estradiol levels in adult women," American Journal of Human Biology, 2006, pp. 133-140, vol. 18, Wiley, Hoboken, NJ, USA.

Lagiou, et al., "Diet during pregnancy and levels of maternal pregnancy hormones in relation to the risk of breast cancer in the offspring," European Journal of Cancer Prevention, 2006, pp. 20-26, vol. 15, Lippincott Williams & Wilkins, Hagerstown, MD, USA.

Lagiou, et al., "Maternal height, pregnancy estriol and birth weight in reference to breast cancer risk in Boston and Shanghai," International Journal of Cancer, 2005, pp. 494-498, vol. 117, Wiley, Hoboken, NJ, USA.

Baik, et al., "Association of fetal hormone levels with stem cell potential: evidence for early life roots of human cancer," Cancer Research, 2005, pp. 358-363, vol. 65, No. 1, American Association for Cancer Research, Philadelphia, PA USA.

Nilsen, et al., "Birth size and subsequent risk for prostate cancer: a prospective population-based study in Norway," International Journal of Cancer, 2005, pp. 1002-1004, vol. 113, Wiley, Hoboken, NJ, USA.

Asbury, et al., "Birthweight-discordance and differences in early parenting relate to monozygotic twin differences in behaviour problems and academic achievement at age 7," Developmental Science, 2006, pp. F22-F31, vol. 9, No. 2, Wiley, Hoboken, NJ, USA.

Bellingham-Young, et al., "Prematurity and adult minor illness," Neuroendocrinology Letters, 2004, pp. 117-126, vol. 25, suppl. 1, Society of Integrated Sciences.

Nilsson, et al., "Fetal growth restriction and schizophrenia: a Swedish twin study," Twin Research and Human Genetics, 2005, pp. 402-408, vol. 8, No. 4. Australian Academic Press, Bowen Hills, Australia.

Gunnell, et al., "The association of fetal and childhood growth with risk of schizophrenia. Cohort study of 720,000 Swedish men and women," Schizophrenia Research, 2005, pp. 315-322, vol. 79, Elsevier, Maryland Heights, MO, USA.

Willinger, et al., "Neurodevelopmental schizophrenia: obstetric complications, birth weight, premorbid social withdrawal and learning disabilities," Neuropsychobiology, 2001, pp. 163-169, vol. 43, Karger AG, Basel, Switzerland.

Talbert, "Uterine flow velocity waveform shape as an indicator of maternal and placental development failure mechanisms: a model-based synthesizing approach," Ultrasound in Obstetrics and Gynecology, 1995, pp. 261-271, vol. 6, Wiley, Hoboken, NJ, USA.

Naeye, "Disorders of the Placenta and Decidua," in Disorders of the Placenta, Fetus and Neonata, 1992, pp. 129-134, Mosby Year Book: Philadelphia, PA, USA.

Benirschke, "Placental Shape Aberrations," Chapter 13, in Pathology of the Human Placenta, 2002, pp. 452-472, Springer, New York, NY, USA.

Naeye, "Disorders of the Placenta and Decidua," in Disorders of the Placenta, Fetus and Neonata, 1992, pp. 129-130, Mosby Year Book: Philadelphia, PA, USA.

Benirschke, "Classification of Villous Maldevelopment," Chapter 15, in Pathology of the Human Placenta, 2002, pp. 491-518, Springer, New York, NY, USA.

Kaufmann, et al., "Cross-sectional features and three-dimensional structure of human placental villi," Placenta, 1987, pp. 235-247, vol. 8, Elsevier, Maryland Heights, MO, USA. Ltd., Maryland Heights, MO, USA.

(56) References Cited

OTHER PUBLICATIONS

Schweikhart, et al., "Morphology of placental villi after premature delivery and its clinical relevance," Archives of Gynecology, 1986, pp. 101-114, vol. 239, Springer, New York, NY, USA.

Larsen, et al., "Stereologic examination of placentas from mothers who smoke during pregnancy," American Journal of Obstetrics & Gynecology, 2002, pp. 531-537, vol. 186, Elsevier, Maryland Heights, MO, USA.

Mayhew, "Changes in fetal capillaries during preplacental hypoxia: growth, shape remodelling and villous capillarization in placentae from high-altitude pregnancies," Placenta, 2003, pp. 191-198, vol. 24, Elsevier, Maryland Heights, MO, USA.

Reshetnikova, et al., "Placental histomorphometry and morphometric diffusing capacity of the villous membrane in pregnancies complicated by maternal iron-deficiency anemia," American Journal of Obstetrics & Gynecology, 1995, pp. 724-727, vol. 173, Elsevier, Maryland Heights, MO, USA.

Vickers, et al., "Fetal origins of hyperphagia, obesity, and hypertension and postnatal amplification by hypercaloric nutrition," American Journal of Physiology—Endocrinology and Metabolism, 2000, pp. E83-E87, vol. 279 The American Physiological Society, Bethesda, MD, USA.

Stocker, et al., "Fetal origins of insulin resistance and obesity," Proceedings of the Nutrition Society, 2005, pp. 143-151, vol. 64, Cambridge University Press, New York, NY, USA.

McMillen, et al., "Early origins of obesity: programming the appetite regulatory system," Journal of Physiology, 2005, pp. 9-17, vol. 565, The Physiological Society, Cambridge, UK.

Armitage, et al. "Experimental models of developmental programming: consequences of exposure to an energy rich diet during development," Journal of Physiology, 2005, pp. 3-8, vol. 565, The Physiological Society, Cambridge, UK.

Longo, "Fetal origins of adult vascular dysfunction in mice lacking endothelial nitric oxide synthase," American Journal of Physiology—Regulatory, Integrative and Comparative Physiology, 2005, pp. R1114-R1121, vol. 288, The American Physiological Society, Bethesda, MD, USA.

Bertram, et al., "Prenatal programming of postnatal endocrine responses by glucocorticoids," Reproduction, 2002, pp. 459-467, vol. 124, BioScientifica Ltd, Bradley Stoke, UK.

Green, "Programming of endocrine mechanisms of cardiovascular control and growth," Journal of the Society for Gynecologic Investigation, 2001, pp. 57-68, vol. 8, No. 2, SAGE Publications, Newbury Park, CA, USA.

McMillen, et al. "Developmental origins of the metabolic syndrome: prediction, plasticity, and programming," Physiological Review, 2005, pp. 571-633. vol. 85, The American Physiological Society, Bethesda, MD, USA.

Wu, et al., "Maternal nutrition and fetal development," The Journal of Nutrition, 2004, pp. 21692172, vol. 134, American Society for Nutrition, Bethesda, MD, USA.

Pham, et al., "Uteroplacental insufficiency increases apoptosis and alters p53 gene methylation in the full-term IUGR rat kidney," American Journal of Physiology—Regulatory, Integrative and Comparative Physiology, 2003, pp. R962-R970, vol. 285, The American Physiological Society, Bethesda, MD, USA.

Seckl, "Glucocorticoids, feto-placental 11 beta-hydroxysteroid dehydrogenase type 2, and the early life origins of adult disease,". Steroids, 1997, pp. 89-94, vol. 62, Elsevier, Maryland Heights, MO, USA.

Sibley, et al., "Placental phenotypes of intrauterine growth," Pediatric Research, 2005, vol. 58, pp. 827-832, International Pediatric Research Foundation, Inc., Lippincott Williams & Wilkins, Hagerstown MD, USA.

Randhawa, et al., "The role of the insulin-like growth factor system in prenatal growth," Molecular Genetics and Metabolism, 2005, pp. 84-90, vol. 86, Elsevier, Maryland Heights, MO, USA.

Wallace, et al., "Nutritionally mediated placental growth restriction in the growing adolescent: consequences for the fetus," Biology of Reproduction, 2004, pp. 1055-1062, vol. 71, The Society for the Study of Reproduction, Inc., Madison, WI, USA.

Baschat, et al., "Fetal growth restriction due to placental disease," Seminars in Perinatology, 2004, pp. 67-80, vol. 28, No. 1, Elsevier, Maryland Heights, MO, USA.

Resnik, "Intrauterine growth restriction," Obstetrics & Gynecology, 2002,, pp. 490-496, vol. 99, Elsevier, Maryland Heights, MO, USA.

Morley, "Fetal origins of adult disease," Seminars in Fetal & Neonatal Medicine, 2006, pp. 73-78, vol. 11, Elsevier, Maryland Heights, MO, USA.

Lockwood, "The diagnosis of preterm labor and the prediction of preterm delivery," Clinical Obstetrics and Gynecology, 1995, pp. 675-687, vol. 38, No. 4, Lippincott Williams & Wilkins, Hagerstown, MD, USA.

Metzger, et al., "Genetic control of branching morphogenesis," Science Magazine, 1999, pp. 1635-1639, vol. 284, Washington, DC, USA.

Yevtodiyenko, et al., "Dlk1 expression marks developing endothelium and sites of branching morphogenesis in the mouse embryo and placenta," Developmental Dynamics, 2006, pp. 1115-1123, vol. 235, Wiley, Hoboken, NJ, USA.

Le Noble, et al., "Control of arterial branching morphogenesis in embryogenesis: go with the flow," Cardiovascular Research, 2005, vol. 65, pp. 619-628, Elsevier, Maryland Heights, MO, USA.

Warburton, et al., "Molecular mechanisms of early lung specification and branching morphogenesis," Pediatric Research, 2005, pp. 26R-37R, vol. 57, No. 5, pt. 2, Lippincott Williams & Wilkins, Hagerstown, MD, USA.

Hu, et al., "Genetic regulation of branching morphogenesis: lessons learned from loss-of-function phenotypes," Pediatric Research, 2003, pp. 433-438, vol. 54, Lippincott Williams & Wilkins, Hagerstown MD, USA.

Ingelfinger, et al., "Perinatal programming, renal development, and adult renal function," American Journal of Hypertension, 2002, pp. 46S-49S vol. 15, No. 2, pt. 2, Elsevier, Maryland Heights, MO, USA.

Miettinen, "Epidermal growth factor receptor in mice and men—any applications to clinical practice?" Annals of Medicine, 1997, pp. 531-534, vol. 29, Informa PLC, St. Helier, Jersey.

Miettinen, et al., "Epithelial immaturity and multiorgan failure in mice lacking epidermal growth factor receptor," Nature, 1995, pp. 337-341, vol. 376, Nature Publishing Group, London, UK.

Grenander, "General Pattern Theory—A Mathematical Study of Regular Structures," 1993, pp. 539-544 and 740-784, Oxford University Press, Oxford, UK.

Amit, et al., "Structural image restoration through deformable templates,". Journal of the American Statistical Association, 1991, pp. 376-387, vol. 86, No. 414, American Statistical Association, Alexandria, VA, USA.

Grizzi, et al., "Estimate of Neovascular Tree Complexity by Microscopy Analysis," Current Issues on Multidisciplinary Microscopy Research and Education, 2005, pp. 140-148, Formatex, Badajoz, Spain.

Giles, "Benoit Mandelbrot: father of fractals," Nature, 2004, pp. 266-267, vol. 432, Nature Publishing Group, London, UK.

Meisel, "Generalized Mandelbrot rule for fractal sections," Physical Review A, 1992, pp. 654-656, vol. 45, No. 2, American Physical Society, College Park, MD, USA.

Keipes, et al., "Of the British coastline and the interest of fractals in medicine," Biomedicine & Pharmacotherapy, 1993, pp. 409-415, vol. 47, Elsevier, Maryland Heights, MO, USA.

Porter, et al., "A fractal analysis of pyramidal neurons in mammalian motor cortex," Neuroscience Letters, 1991, pp. 112-116, vol. 130, Elsevier, Maryland Heights, MO, USA.

Mayhew, et al., "Stereological investigation of placental morphology in pregnancies complicated by pre-eclampsia with and without intrauterine growth restriction," Placenta, 2003, pp. 219-226, vol. 24, Elsevier, Maryland Heights, MO, USA.

Byrne, "Factor analytic models: viewing the structure of an assessment instrument from three perspectives," Journal of Personality Assessment, 2005, pp. 17-32, vol. 85, Informa PLC, St. Helier, Jersey.

Coste, et al., "Methodological issues in determining the dimensionality of composite health measures using principal component analy-

(56) References Cited

OTHER PUBLICATIONS sis: case illustration and suggestions for practice," Quality of Life Research, 2005, pp. 641-654, vol. 14, Springer, New York, NY, USA.
Bentler, et al., "Structural equation models in medical research," Statistical Methods in Medical Research, 1992, pp. 159-181, vol. 1, SAGE Publications, Newbury Park, CA, USA.
Pembrey, "The Avon Longitudinal Study of Parents and Children (ALSPAC): a resource for genetic epidemiology," European Journal of Endocrinology, 2004, pp. U125-U129, vol. 151, BioScientifica Ltd, Bristol, UK.
Patel, et al., "Prenatal risk factors for Caesarean section. Analyses of the ALSPAC cohort of 12,944 women in England," International Journal of Epidemiology, 2005, pp. 353-367, vol. 34, Oxford University Press, Oxford, UK.
Headley, et al., "Medication use during pregnancy: data from the Avon Longitudinal Study of Parents and Children," European Journal of Clinical Pharmacology, 2004, pp. 355-361, vol. 60, Springer, New York, NY, USA.
Fergusson, et al., "Maternal use of cannabis and pregnancy outcome," BJOG: An International Journal of Obstetrics and Gynaecology, 2002, pp. 21-27, vol. 109, Wiley, Hoboken, NJ, USA.
Golding, "Outcome of pregnancy in diabetic women—more investigation is needed into whether control of diabetes is really poorer in England than Norway," BMJ, 2001, pp. 614-615, vol. 322, BMJ Group, London, UK.
Dorosty, et al., "Factors associated with early adiposity rebound," Pediatrics, 2000, pp. 1115-1118, vol. 105, American Academy of Pediatrics, Elk Grove Village, IL, USA.
Rogers, et al., "Financial difficulties, smoking habits, composition of the diet and birthweight in a population of pregnant women in the South West of England," European Journal of Clinical Nutrition, 1998, pp. 251-260, vol. 52, Nature Publishing Group, London, UK.
Farrow, et al., "Birthweight of term infants and maternal occupation in a prospective cohort of pregnant women," Occupational and Environmental Medicine, 1998, pp. 18-23, vol. 55, BMJ Group, London, UK.
Maitra, et al., "Mode of delivery is not associated with asthma or atopy in childhood," Clinical and Experimental Allergy, 2004, pp. 1349-1355, vol. 34, Wiley, Hoboken, NJ, USA.
Golding, "Children of the nineties—a longitudinal study of pregnancy and childhood based on the population of Avon (ALSPAC)," West of England Medical Journal, 1990, pp. 80-82, vol. 105.
Carey, et al., "Revision of the Infant Temperament Questionnaire," Pediatrics, 1978, pp. 735-739, vol. 61, No. 5, American Academy of Pediatrics, Elk Grove Village, IL, USA.
Fullard, et al., "Assessing Temperament in One- to Three-Year-Old Children," Journal of Pediatric Psychology, 1984, pp. 205-217, vol. 9, No. 2, Oxford University Press, Oxford, UK.
Buss, et al., "Behavioral Genetics," in Temperament: Early Developing Personality Traits, 1984, pp. 105-117, Lawrence Erlbaum Associates, Hillsdale, NJ, USA.
Goodman, "The Strengths and Difficulties Questionnaire: a Research Note," Journal of Child Psychology and Psychiatry, 1997, pp. 581-586, vol. 38, No. 5, Wiley, Hoboken, NJ, USA.
Frankenburg, et al., "The Denver Developmental Screening Test," Journal of Pediatrics, 1967, pp. 181-191, vol. 71, No. 2, Elsevier, Maryland Heights, MO, USA.
Griffiths, "Administering the Scale," in The Abilities of Babies—A Study in Mental Measurement, 1954, pp. 117-182, McGraw-Hill, New York, NY, USA.
Fenson, et al., MacArthur-Bates Communicative Development Inventories—User's Guide Technical Manual, 2007, pp. 15-46 and 151-161, Paul H. Brookes Publishing Co., Baltimore, MD, USA.
Miller, et al., "Mathematical textbook of deformable neuroanatomies," Proceedings of the National Academy of Sciences, 1993, pp. 11944-11948, National Academy of Sciences, Washington, DC, USA.
Hastie, et al., "The Elements of Statistical Learning—Data Mining, Inference, and Prediction," 2001, pp. 1-40, Springer, New York, NY, USA.
Penev, et al., "Local feature analysis: a general statistical theory for object representation," Network: Computation in Neural Systems, 1996, pp. 477-500, Informa PLC, St. Helier, Jersey.
Small, "The Statistical Theory of Shape," 1996, pp. 66-116, Springer, New York, NY, USA.
Dryden, et al., "Statistical Shape Analysis," 1998, pp. 251-290, Wiley, Hoboken, NJ, USA.
Lele, et al., "An Invariant Approach to Statistical Analysis of Shapes," 2000, pp. 215-244, Chapman and Hall/CRC Press, London, UK.
McKeague, "A Statistical Model for Signature Verification," Journal of the American Statistical Association, Mar. 2005, pp. 231-241, American Statistical Association, Alexandria, VA, USA.
Benirschke, "Normative Values and Tables," in Pathology of the Human Placenta, 2002, pp. 1019-1026, Springer, New York, NY, USA.
Salafia, et al., "Relationship between placental histologic features and umbilical cord blood gases in preterm gestations," American Journal of Obstetrics & Gynecology, 1995, pp. 1058-1064, vol. 173, Elsevier, Maryland Heights, MO, USA.
Salafia, C.M., et al., Intrauterine growth restriction in infants of less than thirty-two weeks' gestation: associated placental pathologic features. Am Journal Obstet Gynecol, 1995. 173(4): pp. 1049-1057.
Salafia, C.M., et al., Maternal, placental, and neonatal associations with early germinal matrix/intraventricular hemorrhage in infants born before 32 weeks' gestation. Am Journal Perinatol, 1995. 12(6): pp. 429-436.
Salafia, C.M., et al., Clinical correlations of patterns of placental pathology in preterm pre-eclampsia. Placenta, 1998. 19(1): pp. 67-72.
Salafia, C.M., et al., Placental pathologic features of preterm preeclampsia. Am Journal Obstet Gynecol, 1995. 173(4): pp. 1097-1105.
Salafia, C.M., et al., Placental pathology of absent and reversed end-diastolic flow in growth-restricted fetuses. Obstet Gynecol, 1997. 90(5): pp. 830-836.
Viscardi, R.M. and C.C. Sun, Placental lesion multiplicity: risk factor for IUGR and neonatal cranial ultrasound abnormalities. Early Hum Dev, 2001. 62(1): pp. 1-10.
Hagberg, H., D. Peebles, and C. Mallard, Models of white matter injury: comparison of infectious, hypoxic-ischemic, and excitotoxic insults. Ment Retard Dev Disabil Res Rev, 2002. 8(1): pp. 30-38.
K. B., Examination of the Placenta, prepared for the Collaborative Study on Cerebral Palsy, Mental retardation and other Neurological and Sensory Disorders of Infancy and Childhood, N.I.o.N.D.a. Blindness, Editor. 1961, US Department of Health, Education and Welfare.
Kuh, D. and R. Hardy, A life course approach to women's health. Life course approach to adult health ; No. 1. 2002, Oxford ; New York: Oxford University Press. xvi, 419 pp.
Niswander, K. and M. Gordon, The Collaborative Perinatal Study of the National Institute of Neurological Diseases and Stroke: The Women and Their Pregnancies. 1972, Philadelphia, PA: W.B. Saunders.
Myrianthopoulos, N.C. and K.S. French, An application of the U.S. Bureau of the Census socioeconomic index to a large, diversified patient population. Soc Sci Med, 1968. 2(3): pp. 283-299.
Salafia, CM, Miller, RK, Chorionic Vascular Fit, Poster Presentation, International Federation of Placent Organizations, Kobe, Japan Sep. 2006.
Salafia, CM, Miller, RK, Automated Analysis of Placental Villous Branching Poster presentation, International Federation of Placenta Organizations, Kobe, Japan Sep. 2006.

* cited by examiner

NEUTROPHILS EXTRACTED FROM THE IMAGE BY THE SFCM ALGORITHM

CONNECTIVE TISSUE EXTRACTED FROM IMAGE BY SFCM ALGORITHM

VASCULAR COVERAGE SCORES = $D_{SURFACE\ PIXEL\ TO\ THE\ NEAREST\ VESSEL}$/DIAMETER
LOWEST                              HIGHEST

CHORIONIC VASCULAR AREA
LOWEST                              HIGHEST

BRANCHING SCORES= VASCULAR COVERAGE X VASCULAR AREA
LOWEST                              HIGHEST

A. HIGH CPS CERVICAL BIOPSY SPONTANEOUS DELIVERY AT 30 WEEKS GESTATION

B. LOW CPS CERVICAL BIOPSY SPONTANEOUS DELIVERY AT 38 WEEKS GESTATION

AUTOMATED PLACENTAL MEASUREMENT

REFERENCE TO RELATED APPLICATIONS

The present application is a continuation-in-part of U.S. patent application Ser. No. 12/153,724, filed May 23, 2008 now U.S. Pat. No. 8,107,710. It also claims the benefit of U.S. Provisional Patent Application No. 61/202,510, filed Mar. 6, 2009. The disclosures of both of the above-cited applications are hereby incorporated by reference in their entireties into the present application.

STATEMENT REGARDING FEDERALLY SPONSORED RESEARCH OR DEVELOPMENT

This invention was made with government support under Grant No. 1K23 MH067857-01 awarded by National Institutes of Health. The Government has certain rights in the invention.

FIELD OF THE INVENTION

The present invention generally relates to automated imaging measures of the intrauterine environment through measures of placental imaging and histology.

BACKGROUND

The placenta, the key organ upon which the fetus is entirely dependent for all oxygen and nutrition, grows in a branching fashion analogous to the growth of a tree and its branches. The major villous types, their principal time periods of development during gestation, and their specific physiology have been well delineated in the research setting. But routine pathology slide review has poor reliability in distinguishing the major patterns of placental branching morphogenesis. As the evidence that lifelong health risks appear to be correlated with birthweight, the importance of placental growth and development as the principal non-genetic contributor to fetal growth has grown.

The placenta is the only fetal organ that can be dissected in a living child to yield information related to cell proliferation (a marker of tissue health), branching (reflecting gene transcription events) and cell death.

Placental vascular growth, essential to healthy fetal life, is too complex to be reliably estimated even by specialists. Indeed, pathologists often make unreliable diagnoses of histology features that are recognized to be associated with long term health risks.

A reliable and automated assessment tool performed on routine stained placental slides may help understand how intrauterine stressors modulate placental (and by extension fetal) well-being.

Thus, there exists the need for an automated, reliable, and inexpensive method of measurement of placental vascular growth through placental imaging and histology.

SUMMARY

Disclosed herein is a new approach towards automated measures of the intrauterine environment through placental imaging and histology.

Other objects and features will be in part apparent and in part pointed out hereinafter.

BRIEF DESCRIPTION OF THE DRAWINGS

Those of skill in the art will understand that the drawings, described below, are for illustrative purposes only. The drawings are not intended to limit the scope of the present teachings in any way.

DETAILED DESCRIPTION OF THE PREFERRED EMBODIMENTS

Figure 1:
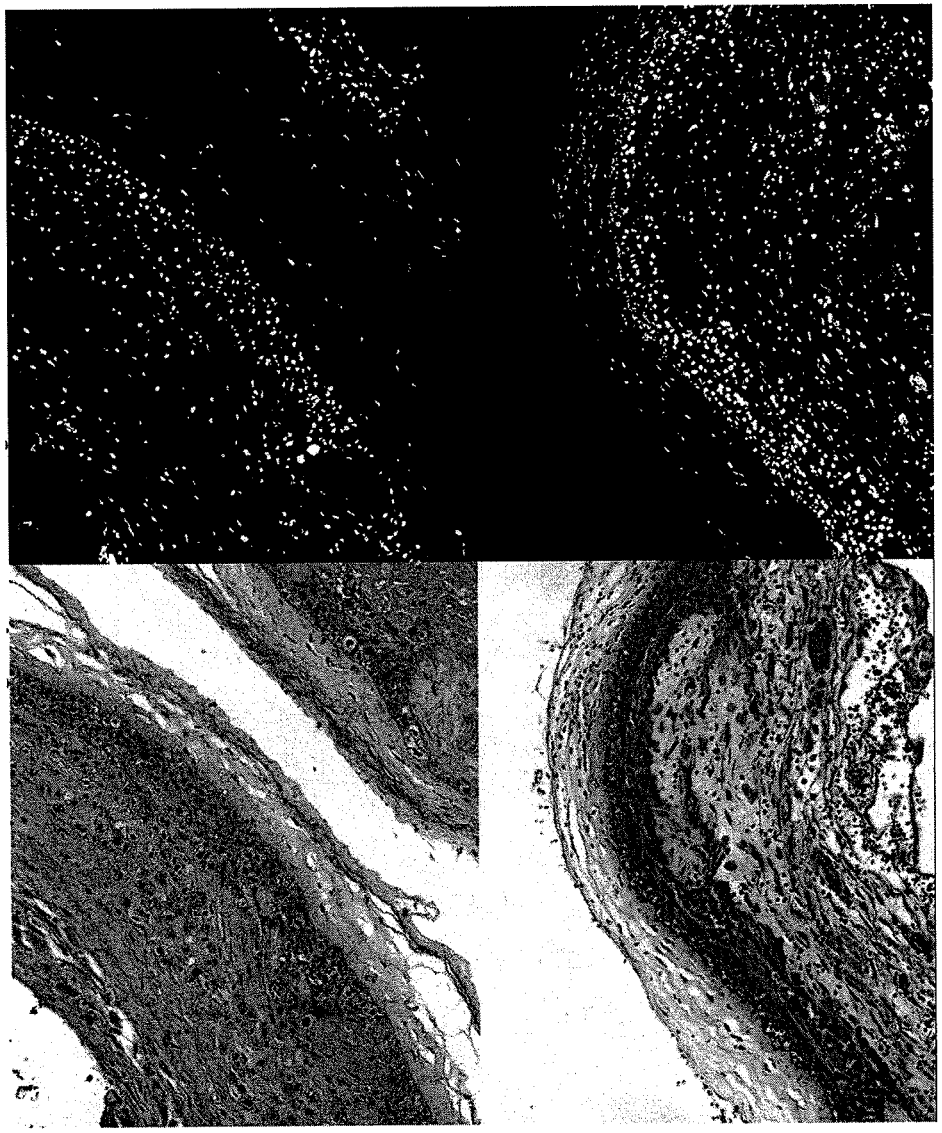
FIG. 1 is a pair of before and after images of placental tissue processed by a spatial fuzzy c-means algorithm (SFCM algorithm). In this application of the algorithm the parts of the image that show the neutrophils have been extracted.

The methods described herein teach a process for extracting medically significant information from digital images of placentas and placental tissues by processing the image through a mathematical algorithm. The medically significant information extracted from the image may, for example, count neutrophils that are responses to bacterial infection. High neutrophil counts indicate a bacterial infection was present in the fetal environment before birth. Such bacterial infections are one of the most significant predictors of risk for Cerebral Palsy (CP) in term infants. Cerebral Palsy is not diagnosed until several years after birth; CP cannot be identified by examination of the mother or the newborn, but identification of the risk of CP by the methods taught herein can enable a physician to prescribe a plan of monitoring and early intervention if signs of the disease begin to manifest themselves. An example of the extraction of neutrophil information is discussed further in Example 1.

Another example of medically significant information that can be extracted from digital images is a measure of the integrity of the connective tissue. As a result of bacterial or viral infections, these connective tissues may be damaged by digestive enzymes released by the neutrophils recruited to attack the invader. These same enzymes can damage the connective tissues of the fetus and lead to brain and lung damage in the child. As with CP, this damage may not be observable in the newborn, but the information produced by these methods for analysis of the placenta may allow a physician to prescribe early monitoring, intervention, or treatment for the infant and child. Furthermore, medically significant information can extracted from digital images of placental histological features so as to provide analysis of congenital viral infection (well recognized as a precursor to fetal anomalies as well as poor long-term neurological development), and maternal/uteroplacental and fetal-placental vascular pathologies (both of which are associated with fetal hypoxia and risk for poor long-term neurological development).

Another example of medically significant information is the measurement of placental shape that measures the underlying vascular fractal and is an indirect measure of healthy placental growth throughout pregnancy and indicates times during pregnancy when stressors alter placental (and by extension, fetal) health. Placental shapes can be measured by image segmentation or pixel counting and Fourier analysis.

Another example of medically significant information is the quantitation of chorionic branching structure. The number of chorionic blood vessels, the number of branch points, inter-branching intervals, and the total vascular length are measured to quantify aspects of vascular growth and gene events relevant to fetoplacental branching and growth early and throughout gestation. Segmentation and branching metrics including Laplacian and other graph and network metrics can be used to analyze the 2-dimensional image to quantitate and time the severity and numbers of events contributing to deformation of placental vascular branching growth.

Another example of medically significant information is the fourier analysis of placental shape that indicates the time and severity of deformed placental vascular growth, and quantitates the effect of altered placental shape on placental function through effects on placental scaling Another example of medically significant information is the assessment of villous maturation and potential exposure to hypoxia, congenital viral infection, fetal vascular pathology, and abnormal maternal uteroplacental perfusion. Altered villous size, vascularity, extent and integrity of connective tissue, number, hue and intensity of syncytial and stromal nuclei can be used to measure appropriate placental maturation and also serve as indicators of villous diseases that affect placental function and/or fetal health.

Another example of medically significant information is the 3-dimensional reconstruction of the gross placental shape and its mathematical solution, the inverse of which represents the maternal intrauterine environment. Fourier analysis of placental shape indicates the time and severity of deformed placental vascular growth, and quantitates the effect of altered placental shape on placental function through effects on placental scaling.

Another example of medically significant information is the 3-dimensional reconstruction of the villous stem vascular tree. The 3-dimensional reconstruction may be obtained by mathematical recombination of two or more serial sections. Segmentation or branching algorithms can be used to "prune" or remove the finer villous elements leaving the larger branches for analysis. The number of fetal stem blood vessels, the number of branch points, inter-branching intervals, and the total vascular length are measured to quantify aspects of vascular growth and gene events relevant to fetoplacental branching and growth early and throughout gestation. Segmentation and branching metrics including Laplacian and other graph and network metrics can be used to analyze the 3-dimensional image to quantitate and time the severity and numbers of events contributing to deformation of placental vascular branching growth.

Another medically useful technique is the analysis of individually segmented villi for their maternal/uteroplacental and fetoplacental functions using standard diffusion equations.

Another example of medically significant information is the measurement of the timing of the occurrence of events or stressors that affect the growth and development of the placenta and the fetus. The influence of these events or stressors can manifest themselves in the development and branching of the placental vascular system. These events or stressors cause the vascular system to develop in ways that make it deviate from its nominal fractal scale and different types of deviations from the nominally round shape can indicate an earlier event. Thus, measurements of the placental vasculature or the placental shape using algorithms such as segmentation or branching metrics including Laplacian and other graph and network metrics can reveal information about when during the development of the placenta changes occurred that altered or influenced its development. Also, determination of which blood vessels have been affected can lead to an assessment of timing. For example, the chorionic vessels are developed early in pregnancy, and so events that change their development therefore must have occurred early in pregnancy.

The timing of events that change the development of the placental vasculature are correlated with fetal characteristics that are, in turn, strongly associated with childhood health risks. For example, it is commonly understood by those of typical skill in the art that birth weight is a primary indicator of childhood health risk. As birth weight deviates from the optimum range, the risk of childhood health issues increases. Similarly, it is understood that placental weight is strongly correlated with birth weight, and deviations from that correlation are also associated with childhood health risks. The inventors have discovered that placental vascular branching affects placental efficiency and affect birth weight independently of the placental weight.

Yet another example of medically significant information is the assessment of timing of placental infection. The duration of an infection can be determined by the effects of bacterial and bodily-produced chemicals on many different cell types in the placenta, cord and membranes. One example of effect on infection on these tissues is the infiltration of neutrophils that combat pathogens into the placental tissues. Other cells affected by infection and its related physiology include epithelia, connective tissue and fibroblasts, monocyte/macrophages, and vascular endothelia. For example, segmentation algorithms disclosed herein are useful in extracting the images of neutrophils from the digital image of the placental histology slides. As a further example, mathematical analysis, using algorithms that compute the mean distance of each particle to the placental surface, provide an assessment of time of infection.

The first step of these methods is the selection of the placental sample to be analyzed. Every baby is born with a placenta and the sample may be of the entire placenta (i.e., a digital image) or taken from the placenta, the umbilical cord, or the membranes. The sample may be the entire placenta, the gross placental shape, portions of the placenta, umbilical cord, or membranes, or may be a slice of tissue from any of these fixed to a histology slide. The samples may be taken soon after birth, or the placental tissues may be preserved in formalin and the digital images may be taken at a later date, even years later. Measurements taken at birth can be used to predict risk to future pregnancies born to that mother, as well as risks to the particular child.

A digital image of the placental sample may be obtained using a film or digital camera, using a microscope with a camera attachment, or using a slide digitizer. Film images may be digitized if they are of sufficient resolution. For obtaining a digital image of the entire placenta, the preferred method is to use a digital camera. For obtaining a digital image of histology slides, the preferred method is to use a slide digitizer such as an Aperio T3, manufactured by Aperio Technologies Corp. in Vista, Calif. Other slide digitizers may be used such as those manufactured by Nikon, Zeiss, or Leica. The digital images of histology slides should have sufficient resolution to allow extraction of image features up to a magnification of 20-40x.

The digital images are analysed by processing them by a mathematical algorithm. Several types of algorithms may be employed alone or in combination to extract the features of interest from the image. Among the algorithms that can be used are spatial fuzzy c-means algorithms, segmentation algorithms, boundary finding algorithms, counting algorithms, length measuring algorithms, branching algorithms, angle measuring algorithms, and color discriminating algorithms. Other types of algorithms useful for image analysis or segmentation are clustering (K-means) algorithms, mean shift algorithms, histogram-based algorithms, edge detection algorithms, region growing algorithms, level setting algorithms, graph partitioning algorithms, watershed transformation algorithms, model based segmentation algorithms, multiscale segmentation algorithms, semi-automatics segmentation algorithms, and neural network algorithms. For example, a branching algorithm may be used to extract the extent of branching of the major placental blood vessels from the digital image of the chorionic surface of the entire placenta. A color discriminating algorithm may be used to extract the neutrophils from a digital image of a histology slide and then a counting algorithm used to count the number of neutrophils present.

These mathematical algorithms analyse the image by the application of mathematical rules. For example, one particularly useful algorithm is the spatial fuzzy c-means (SFCM) algorithm. The unsupervised cluster algorithm, called SFCM (Spatial Fuzzy c-Means), is based on a fuzzy clustering c-means method that searches the best fuzzy partition of the universe assuming that the evaluation of each object with respect to some features is unknown, but knowing that it belongs to circular regions of R 2 space. The spatial function is the summation of the membership function in the neighborhood of each pixel under consideration. The advantages of the SFCM are the following: (1) it yields regions more homogeneous than those of other methods, (2) it reduces the spurious blobs, (3) it removes noisy spots, and (4) it is less sensitive to noise than other techniques. This technique is a powerful method for noisy image segmentation and works for both single and multiple-feature data with spatial information.

The features of interest include neutrophils, connective tissues, portions of edema, cell nuclei, major blood vessels, branched villi, large villi, long villi, small villi, nutrition exchange vessels, and capillaries, markers of fetal hypoxia such as syncytial knots and syncytial basophilia, villous fibrosis/scarring, chronic villitis and chronic intervillositis, infarcts, abruption, perivillous fibrin deposition and cytotrophoblast proliferation, abnormalities of clotting and inflammation in the basal plate and maternal uteroplacental vessels, cell death of epithelia, stroma, endothelia, proliferation of macrophages and fibroblasts in connective tissue and stroma, abnormalities of clotting and inflammation in the fetal-placental blood vessels.

After extracting the feature of interest from the digital image measurements of those features may be made and statistics of those parameters may be calculated. In one example noted above the neutrophils can be extracted and then counted. Similarly, syncytial knots may also be extracted and counted. The major blood vessels may be extracted and their lengths and areas measured with statistics such as minimum, maximum, and mean computed.

Obtaining the digital image, analyzing the image, extracting the features of interest, applying the algorithm or algorithms, and computing relevant statistics may be automated by computer scripts or macros. The physician or pathologist may be able to insert a slide in a slide digitizer and via an interface select features of interest or regions of interest on the image and the computer scripts will perform the requested analysis and report the relevant measurements or statistics in an automated operation. It is contemplated within the scope of this invention that these scripts may allow a slide to be inserted into the slide digitizer and the computer will look for any evidence of abnormality or disease in a completely automated operation without prior physician input.

Statistics derived from the digital image are correlated with known health risks and outcomes. High numbers of neutrophils are known to be related to risk of Cerebral Palsy. Vascular edema is related to brain damage. Lack of integrity of connective tissue is related brain, lung, and heart damage. Additional published studies relate the health and development of the fetus, as reflected by changes in birth weight that are independent of parental or extrauterine factors, to the long term health—or health risks—of children and adults. The placenta, as the fetus' sole source of oxygen and nutrients, is the principal determinant of fetal growth independent of factors such as parental size and reflects the adequacy of the maternal environment.

Reliable measures of placental tissues as taught by the methods described herein enable physicians to more accurately assess future health risks, risks to future pregnancies of that mother, and to prescribe monitoring, intervention, and treatment at an earlier time and to greater effect of her current child. Thus is provided an approach for an automated and method of placental diagnosis that includes a completely novel measurement of placental vascular branching structure and more comprehensive and reliable histopathology diagnoses that can be performed on a routine hematoxylin and eosin stained slide obtained from, for example, the placenta at birth. This measure can improve diagnosis of fetal growth restriction, identify critical periods of abnormal placental growth that might mark risks for later health risks, and reliably diagnose placental histopathology features that have been associated with increased long term neurodevelopment risks but which remain unreliably diagnosed by routine pathology. The measure is comprehensive, including both measures of the whole placenta and visible features of the chorionic surface vasculature with measures of the fine (microscopic) placental structure. Further, the measurement is automated, incorporating into its algorithms the full field of knowledge of placental structure, pathology, and functional correlates. The reliability of the method and the ease of preparation of a routine stained slide, makes its application practical on a wide population basis. As such, the diagnoses generated by these measurement tools would be accessible to all newborns. Such tools could impact public health burdens as obesity and diabetes, cardiovascular disease, certain cancers, and psychological disorders, disorders that have their genesis, at least in part, in fetal life.

Image Segmentation: Gross Placental Features

Image segmentation methods are described herein to be applied to the gross features of the placenta and to histology slides taken from placental tissues. The prior art method for measuring the whole placenta involves describing whether the placenta is round/oval or more irregular, noting whether more than one placental lobe is present, and taking a single measurement of larger and smaller diameters, and a single measure of the placental disc thickness. This method may be used in capturing the shape of regular, round/oval placentas, but is unreliable in regards to the irregular placental shapes that are commonly considered to reflect the effects of the most problematic maternal/uteroplacental environments and the formations of normal placental growth patterns. We have demonstrated, using the publicly available data collected as part of the Collaborative Perinatal Project, that abnormal placental shape has a persistent negative effect on birthweight after adjustment for placental weight and other placental dimensions. Thus, given to placentas, each weighing 500 g, the placenta with the irregular shape will yield a statistically significantly smaller baby than a round/oval placenta. This means that abnormal placental shape is not compensated for by further placental growth. Furthermore, abnormal placental growth affects the three-quarter scaling of placental growth to fetal growth, indicating that these abnormal shapes reflect abnormal placental vascular fractal networks. While most normal placentas (placentas delivered with infants who are well grown at term and not admitted to the neonatal intensive care unit) will have a uniform thickness, many placentas have variable thickness which is well recognized to reflect variable arborization of the placental villous trees. It is generally held that such variability in villous arborization reflects maternal uteroplacental pathology. However, current surgical diagnostic methods do not capture variability in disc thickness, and current research methods cannot allow such variability to be analyzed.

We described that more precise measurement of placental perimeters increases the total amount of birthweight variants attributable to placental factors. However, this measurement method required a trained technician applying costly software, and could not be used on a population basis. Our current methods involved the simple tracing of the placental perimeter, noting appropriate landmarks (such as umbilical cord insertion and the edge of the placenta closest to the free edge of the ruptured membranes) with a drawing tool in Adobe Photoshop. Use-specific algorithms written in MatLab code extract a series of quantities that reflect the area, eccentricity, and regularity of the shape. We have applied the same method to marking the vascular parameter of the chorionic disc, to furthest-most extensions of the chorionic surface vessels on the plate. A similar use-specific algorithm calculates a series of quantities, and the two sets of quantities are used to calculate the eccentricities, among other features, of the two shapes. The placental disc is fixed in formalin and subsequently sliced in eighths, and the seven unique surfaces are digitally photographed. Again the drawing tool in Adobe Photoshop is sufficient to extract slice perimeters. These slices are used to add n "height function" to the surface information, in essence re-creating the three-dimensional placental shape. The combination of data from the chorionic surface and disc thickness reflecting the height of villous arborizations are used to calculate the "inverse solution", namely, a mathematical distribution of the maternal environment that created the particular combination of chorionic plate shape, chorionic vascular growth, and villous arborization patterns.

Chorionic surface vascular branching is laid down by the middle of the second trimester, and the principal branches off the umbilical cord insertion reflect the state of the primordial placenta shortly after the onset of the beating fetal heart. As such, the number of such vessels, the number of branch points, inter-branching intervals, and the total vascular length are measured to quantify aspects of endothelial proliferation and gene events relevant to placental branching early in gestation. At the same to early gestational ages, fetal viscera such as lung, kidney, and pancreas are also using the same gene families, and the same molecular signals and cascades to induce growth and branching growth. Using an image denoising method and the graphic tool of Adobe Photoshop, the chorionic surface vessels can be reliably traced, the resultant network extracted, and analyzed by use-specific algorithms for initial number of branches and branching density at intervals of the radius out from the umbilical cord. Another embodiment takes the digital image of the chorionic surface vessels traced on the placental image. A distance measuring algorithm finds the distance from each pixel of the image to the nearest blood vessel. That metric is correlated with birth weight.

Image Segmentation: Histologic Placental Features—Current Diagnostic Types (Acute Inflammation, Chronic Inflammation and Vascular Pathology)

While histopathologic identification of specific features is the prior art method for diagnosis of inflammation and hypoxia, the diagnosis of these processes, each with well-characterized fetal, neonatal and potentially lifelong impacts, remains problematic. Interobserver reliability, even with a test set of 20 slides, 14 of which had lesions, yielded reliability coefficients that were primarily only "fair". Furthermore, "consensus" was the gold standard, not a specific maternal, fetal or neonatal outcome, nor was an objective morphometric quantification provided for such items as "neutrophil count" or "syncytial knotting". The digitization of images and, more recently, entire histology slides, has moved each of these into the realm of "data", accessible (as pixels) to mathematical manipulation.

In one embodiment, image segmentation is directed toward the identification of "objects" that can be organized into networked structures of linked objects, which may carry various kinds of data (including physiologic/functional). Images are segmented according to pixel characteristics. There can be many possible partitions of the domain of an image into subsets among them are coherence of brightness, color, texture, or motion. The objective is to use the low-level coherence of brightness, color, texture, or motion attributes to sequentially come up with hierarchical partitions. Such hierarchical partitioning returns a tree structure instead of a single "flat" partition. One of several computational approaches is based on concepts from spectral graph theory. The modeling of the extracted quantities can be informed by mid- or high level knowledge about symmetries of objects or object models, and physiologic attributes of the measured structures.

Data are extracted from segmented images by straightforward algorithms but are modeled based on a priori understanding of the underlying structure or data organization. Modeling, rather than the image analysis itself, is used to construct "objects" such as villi or specific histology items from the concrete image. Once created, "semantic meanings" can be assigned and the objects (or "latent variables, in modeling parlance) ordered into a hierarchical input object structure, importantly again, incorporating a priori knowledge of the biological system. This approach has been suggested to have the relational flexibility of nonlinear methods such as functional data analysis plus the ability to organize relationships within a hierarchical structure that is biologically based.

Stained histology slides of placental tissue produce images with highly concentrated color spectra, making these images strong candidates for the use of automatic image segmentation and object classification algorithms.

In order to improve algorithm reliability but to retain the lack of bias inherent in an automated analysis system, the procedure is operationalized as follows:

The digitized slide is opened. The specific algorithm/algorithms sets are specified. The interface runs a "Specify ROI" sub-routine which selects regions of interest (ROI) from the whole slide at random and presents them to the technician/pathologist for review. ROI's can be accepted all or in part, and rejected (all or in part) due to malposition (ROI located off the tissue image), technical artifact (knife blade artifact, folding, staining irregularities), or appropriateness (e.g., algorithms for diagnosis of acute intraamniotic infection are applied to the chorionic plate in a tissue slide, but not to the chorionic villi). ROI's are presented until a set area is reached; algorithms are then run and data exported.

Image Segmentation: Villous Branching Structure

While at least some methods for histopathologic identification of inflammation and hypoxia exist, the prior art has no standard method for the analysis of placental branching architecture. Advanced mathematical techniques are well suited for the quantitative analysis of placental branching architecture, and the quantities so extracted can be entered into models to study their contributions to causal pathways of fetal disease. However, placental arborized structure, as measured after delivery, reflects the effects of the underlying maternal uteroplacental environment. That environment is not directly observable (hence "latent") but it causes the observed placental arborized structure. Empirically, then, measures of placental arborized structure and the maternal uteroplacental environment should be correlated, and the relationships among a set(s) of measured histological parameters related to placental arborized structure can be examined. Examples of histological parameters include, but are not limited to, villous numbers, villous areas, villous perimeters, trophoblast features including thickness, vascular features including medial characteristics, luminal perimeter and location within the villus (central versus subjacent to the trophoblast epithelium).

Further examples of histological parameters include, but are not limited to, syncytial knots (e.g., dark blue cluster of round objects); perivillious fibrin/fibrinoid (e.g., pink and devoid of nuclei the size of normal villous Syncytiotrophoblast, stroma and endothelial cells); cytotrophoblast proliferation (useful, for example, to distinguish "old" PVF from recent PVF; e.g., nuclei of the size of cytotrophoblast cells which should be distinct from villous stromal and other nuclei, found in PVF); and stromal cellularity (e.g., nuclear number within each distinct villus or maybe better nuclear area per villous area). Such histopathology parameters can be detected in, for example, H&E slides. Still further examples of histological parameters include, but are not limited to, syncytiotrophoblast; endothelium (useful, for example, to verify H&E stained algorithms); macrophages (e.g., 40-60% of villous stromal cells are immunocompetent macrophages); and anchoring and endovascular trophoblast (useful, for example, to shifts focus from villous arborization to the placental remodeling of the implantation site, which moves analysis into earlier times of gestation, and ultrasonographic correlation). Such histopathology parameters can be detected in, for example, immunohistochemical (IHC) stained or in situ PCR slides for cell proliferation, cell activation, cell death and gene expression.

Generally, analysis includes definition objects (e.g., discrete histological factors). The objects can be obtained from an image (e.g., an image of a histological slide from a placenta). Such image is segmented, and each segment is classified according to size (see e.g., Examples 1-3). The classification parameters are combined in linear combinations so as to form factors (see e.g., Example 4). Usually, the parameters will relate to various placental structures and/or cell types. Analysis includes determination of the presence and number of the factors ("model object"). Analysis also includes determination of relationships and patterns among the factors ("neighborhood"). Useful to the methods described herein is any software package that incorporates these specific types of analytical tools. Examples of software approaches include factor analysis (FA) (e.g., exploratory and/or confirmatory factor analysis) and cognition networks (see infra, data reduction).

The computational methods used in pattern recognition of objects are discussed in, for example, U.S. Pat. No. 6,091, 852; U.S. Pat. No. 6,229,920; WO0171577; WO0063788; EP0863485; EP0858051; EP0846306; EP0843864; and EP0870275, each of which are specifically incorporated by reference in their entirety. Examples of software packages useful to the present invention include, but are not limited to, ECognition (Definiens, Munich, Germany) and Biomarker AMplification Filter (BAMF) (Vacaville, Calif.).

The methods described herein can be employed to reliably diagnose placental villous branching patterns that, to date, cannot be reliably diagnosed including, but not limited to, the 6 paradigm branching patterns as elaborated by Kaufmann (Normal preterm placenta (defined as prevalence of immature intermediate and mesenchymal villi, complete absence of mature intermediate and terminal villi, poorly matured stem villi), Immature placenta at term (defined as prevalence of mature intermediate and stem villi, paucity of immature intermediate and terminal villi), Normal term placenta (defined as a generally even distribution of all types of villi), Preterm preeclampsia (the pathology classic for maternal vascular pathology, defined as poorly branched, extremely tiny, filiform terminal villi and because of paucity of terminal branching, an unusually wide intervillous space), Term preeclampsia (defined as a generally even distribution of all types of villi, with terminal villi generally being enlarged and highly branched), and two cases of malformed villi with normal numerical mixture of villous types).

The methods described herein can also be employed, for example, to: diagnose time of onset of placental pathology (through "branching tree" analysis); quantify the effect of abnormal placental growth on the fetus (by, for example, assigning physiological quantities to a cognition network); reliably diagnose fetal growth restriction including abnormal growth within the "normal" birth weight range; diagnose which cases of maternal diseases (such as diabetes, preeclampsia) affect the growth of the placenta and/or growth of the baby and which do not; document treatment efficacy and treatment failure in patients treated in a subsequent pregnancy after a pregnancy loss or serious complication; and diagnose which pregnancies following IVF/ART have abnormal placental growth and which do not.

Abnormal placental branching could be associated with childhood (and potentially lifelong) abnormal function of organs that are undergoing branching growth at the same time as the placenta. Thus, the methods described herein can also be employed to diagnose risk for abnormal neurodevelopmental outcome (analysis of neuron branching growth); risk of insulin resistance and abnormal glucose metabolism, obesity and diabetes (analysis of pancreatic branching growth); hypertension (analysis of branching growth of the cardiovascular system); reduced renal reserve/risk of hypertension, renal dysfunction (analysis of kidney branching growth).

Furthermore, by building language algorithms for identifying pathology lesions that are currently recognized correlates with maternal and fetal/neonatal pathologies, one can provide an automated and reliable diagnostic service to a field with few dedicated practitioners and with a large need for such services (e.g., community hospitals, academic centers without a dedicated practitioner, in medicolegal field/risk management with "competing experts") such as histology features that diagnose, for example, acute intraamniotic infections, chronic placental inflammation, maternal uteroplacental vascular pathology and fetal-placental vascular pathology. Thus is provided methods to diagnose the mechanistic cause and the time of onset of pathologies that create ill newborns or stillborn fetuses. More generally, the methods described herein allow identification of the time of onset of the histology features described herein and quantify their total effect on the fetus (via their effects on placental growth globally).

Registration and Reconstruction of Branching Architecture

Histology slides are two-dimensional slices from a three-dimensional placental volume. Image registration is the process of transforming the different sets of data into one coordinate system. Registration is necessary in order to be able to compare or integrate the data obtained from different measurements. Using image registration many slices can be combined to form a sub-volume of the three-dimensional structure. Two powerful registration methods can be combined in placental registration: Area based image registration algorithms and related methodology look at the structure of the image via correlation metrics, Fourier properties and other means of structural analysis; feature based methods, instead of looking at the overall structure of images, map to image features: lines, curves, points, line intersections, boundaries, etc. Combining segmentation techniques with registration, parts of the villous tree internal to the placental volume may be extracted and studied. Using these methods to segment histology images as well as images of the chorionic surface produces the geometric structure of several parts of the placental villous tree.

Very simple morphological methods can be applied to skeletonize the geometry and construct a representation of the tree as an embedded (i.e. geometric) graph. Graph theoretic techniques are applicable to analyzing the anatomical structure of the villous tree. Metrics can be designed from both the geometry and topology of the villous tree. For example, topological metrics count how many leaves are on each tree or how many levels of branching there are at each leaf, while geometric metrics examine how far traveling between two points in the tree compares to traveling in a straight line across the chorionic plate. Additionally, combined metrics, i.e., metrics that consider both the geometry and topology of the tree, can be used. One example is to measure the length between branch points at each level of branching. During the skeletonization process, some information may be lost (such as the thickness of the vessels), but some of this information can be retained by assigning weights to the edges of the constructed graph and viewing the resulting structure as a flow network or as a self-organizing map, a method that has been useful in dimension reduction.

Validation of Placental Measures and Models: Placental Function Depends on Placental Architecture.

Another embodiment described herein are based at least in part upon application of the discovery that placental growth scales to fetal growth to the three-quarter power, essentially consistent with scaling typical of fractal transport networks, and that altered placental shapes have scaling factors that deviate from the three-quarter rule, consistent with altered placental shapes reflecting altered underlying placental vascular fractal networks.

Modeling placental function and growth are accomplished separately. As stated above the primary function of the placenta is maternal-fetal transfer, therefore models of the vascular tree can be produced that optimize the transport function. Data analysis tools are then applied to compare specific villous trees with trees generated by this model to determine how far the given placental tree is from the "optimal" tree.

Optimal transport can be used to validate our measurement methods; in other words, the villous (and by extension, the underlying vascular) architectures we reconstruct are directly related to the estimated transport function of the placenta. Diffusion limited aggregation (DLA) is a stochastic process that can be applied to dynamically model angiogenesis in the placenta, thereby modeling placental growth. DLA has been used to model retinal and tumor angiogenesis. Dynamic models of placental growth can be used to investigate the effect that environmental changes at different stages of the growth cycle have on the resulting vascular structure. DLA may be particular useful in maintaining a reasonably good agreement between the observed scaling exponent, approximately 0.75, which we have found to be appropriate for describing the relationship between placental structure and placental function.

Dynamical modeling of vascular trees is a new technique, developed by M. Yampolsky and his team at the University of Toronto. There have been prior art efforts to model the complex architecture of a vascular tree. They have been based on selecting certain geometric constraints for the tree, such as the number of branches at each vertex, and the branching ratios;

and then optimizing the tree to fill the spatial shape of the organ. This approach is static in its nature, and does not give clues to the temporal development of the vasculature, and thus is not suitable for determining how growth pathologies affect the development of a placental vascular tree and the geometric shape of the placenta. The dynamical growth process in this invention is based on sprouting angiogenesis which is the mechanism of growth at the tips of the vessels. With each time increment, the model vascular tree is randomly grown at one of its extremities, with a single parameter controlling the density of the branching. This random growth process is known as DLA. Applying a "hit" to the parameter of the model at a specific moment of time we influence the development of a particular level of the vasculature.

The model successfully reproduces the variability of shapes of pathological placentas. Quantitatively, the deformations in the model trees will be described by the changes in the average number, length, and thickness of branches. This makes it possible to introduce measures of the deviation from the normal, and to search for markers corresponding to the specific changes in the vascular structure. Another approach to measuring the deviation from the normal relies on measuring the optimality of the branching architecture. Possible conditions of optimality reflect the efficiency with which the blood flow is delivered to the tissues. They translate into an optimal local geometry of the vascular tree. Under the assumption that a normal vasculature is close to optimal, the deviation from normal growth can be expected to induce a measurable decrease in optimality.

In summary, the tools we apply to placental measurement fully characterize the histopathology and the architecture of a fetal organ the growth of which depends upon pathways critical to the genesis of autism and other childhood and adult morbidity risks. Finally optimal transport analysis and DLA confirm that our measures and reconstructions are valid and relevant to placental function and fetal-placental physiology.

Data Reduction

Computer-assisted image analysis minimizes measurement error of individual histology items and while each item may be reliable, the complexity of placental arborized structure requires measuring so many histology items that data reduction is required before examination of the predictive effects of different patterns of placental arborized structure. Various strategies of data reduction can be employed.

In one embodiment factor analysis (FA) is an applicable method of data reduction. FA determines the number of underlying latent variables that fit the mathematical variance of a large number of observed items. But empirically derived factors may not be biologically relevant. Also, it can be difficult to choose between explaining greater data variance (with many factors) and accounting for less variance with a more readily interpretable model (with fewer factors). Trimming factors can be problematic as well. A factor marking a set of uncommon item values accounts for little variance, but may mark a physiologically significant process. Moreover, FA is vulnerable to small fluctuations in multi-dimensional data "space"; factor extractions are not infrequently poorly generalizable to other data. A large data set allows split-half analysis; a set of empiric factors is extracted by exploratory factor analysis (EFA) in one half of the data. In the other half, that factor structure is tested with confirmatory factor analysis (CFA), with the EFA-derived factor structure being explicitly specified.

Another embodiment is the use of cognition networks (CN) attempt to reduce data via building biologically driven hierarchies into what could be viewed as a more complicated and hierarchical factor structure. CN are network structures of linked objects, which may carry various kinds of data extracted from complex inputs such as images. Data are extracted by algorithms drawn from a priori understanding of the underlying structure or data organization (e.g., placental structure). Objects such as villi or specific histology items are constructed from the concrete data in the image. In the CN analytical software (e.g., ECognition, Definiens, Munich, Germany), "class" labels can describe semantic meaning of these concrete objects. The classes can form a structured subnetwork of model objects called the model network. In the beginning of the cognition process, the model network can create a separate hierarchical input object structure from the input data (like pixels or words). The model network and the objects linked into it are generally termed a "network situation". This can be modified by user-specified "procedures" (algorithms) that can incorporate a priori knowledge of the biological system (e.g., placental structure and development) until a final network configuration is reached that represents the knowledge extracted from the input data. The final output can include object features, measured properties of individual image objects, means and ranges of properties for specific image object types, and parameters of network structure and object classification that represent higher levels of data organization. CN has the relational flexibility of nonlinear methods such as functional data analysis plus the ability to organize relationships within a hierarchical structure that is biologically based, and thus has application to the development of placental structure measurement tools.

EFA is generally exploratory and has few explicit assumptions but can be problematic to define and interpret. CFA allows explicit incorporation of knowledge but factors may be unstable between data sets. CN have features of CFA (e.g., relationships among objects are explicit) but allows for nonlinear relationships among objects, classes and groups. CN also add an explicit hierarchy or ordering of relationships that may be biologically more reasonable than the linear variable combinations that are EFA factors.

Reliability and Validity of Measures

While data might be reduced to a parsimonious set of factors, the factors may not reliably measure what they are intended to measure. In evaluating reliability of quantification of individual histology items and of the EFA/CFA factors, several reliability tests can be used. For example, multiple tissue samples from one placenta are multiple "tests" of that placental structure. As another example, "test-retest" reliability can assess reliability of histology item quantification and also the extent to which placental structure (reflected in factors as combinations of related histology item scores) is stable across multiple tissue "tests"

The analysis methods may generate a large number of quantified variables relating to aspects of histology items, many of which are intercorrelated. When many potentially parallel histology items are present, histology items can be split in two to test "alternate forms" reliability. This approach can test whether items missing could be substituted with other items and the overall measures remain reliable. Such flexibility allows for tools to be robust to inevitable variability in tissue sampling techniques (that may result in missing histology items) when employed on large populations. Generalizability is the extent to which the measurement process is equivalent across dimensions. Potential sources of variation include, for example, gestational age at delivery, maternal disease states (e.g., preeclampsia, diabetes), and exposures (e.g., maternal smoking). Procedures described herein are sufficient to test whether the measures are consistent across strata.

To determine the associations between placental structure and childhood outcomes, structural equation modeling (SEM) can be employed. SEM explicitly models factors as minors of latent variables to test the relationships among factors, covariates and outcomes. MPlus (Muthen and Muthen, 2006) is an especially flexible SEM tool that accommodates categorical and continuous latent variables, and latent class analysis. SEM is a linear modeling approach and, as such, provides for modeling factors that are linear combinations of histology items. With CN data reduction, nonlinear methods such as functional adaptive model estimation (FAME) can model non-Gaussian responses with the ease of generalized linear models as well as nonlinear response surfaces, and can be applied to more functional data such as CN.

Having described the invention in detail, it will be apparent that modifications, variations, and equivalent embodiments are possible without departing from the scope of the invention defined in the appended claims. Furthermore, it should be appreciated that all examples in the present disclosure are provided as non-limiting examples.

All publications, patents, patent applications, and other references cited in this application are incorporated herein by reference in their entirety for all purposes to the same extent as if each individual publication, patent, patent application or other reference was specifically and individually indicated to be incorporated by reference in its entirety for all purposes. Citation of a reference herein shall not be construed as an admission that such is prior art to the present invention.

EXAMPLES

The following non-limiting examples are provided to further illustrate the present invention. It should be appreciated by those of skill in the art that the techniques disclosed in the examples that follow represent approaches the inventors have found function well in the practice of the invention, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the invention. It shall be understood that any method described in an example may or may not have been actually performed, or any composition described in an example may or may not have been actually been formed, regardless of verb tense used.

Example 1

Extracting Neutrophils

A placental sample was taken from the placental membranes of a term fetus. A slice of the tissues was prepared using the standard procedure for preparing a histology slide. The tissue was fixed in formalin, de-hydrated, embedded in a paraffin block, a thin slice was microtomed from the block, and affixed to a glass slide. The slide was placed in an Aperio T3 slide digitizer and the image produced at a magnification of 20×. The digitized image was processed using the SFCM algorithm. The parameters of the algorithm were set to extract the color differences of the neutrophils. Both the original image and the extracted image are shown in FIG. 1. The extracted image separates the neutrophils from the remainder of the image. The high incidence of neutrophils indicates a higher risk that this child will develop Cerebral Palsy.

Example 2

Extracting Tissue Edema

Figure 2:
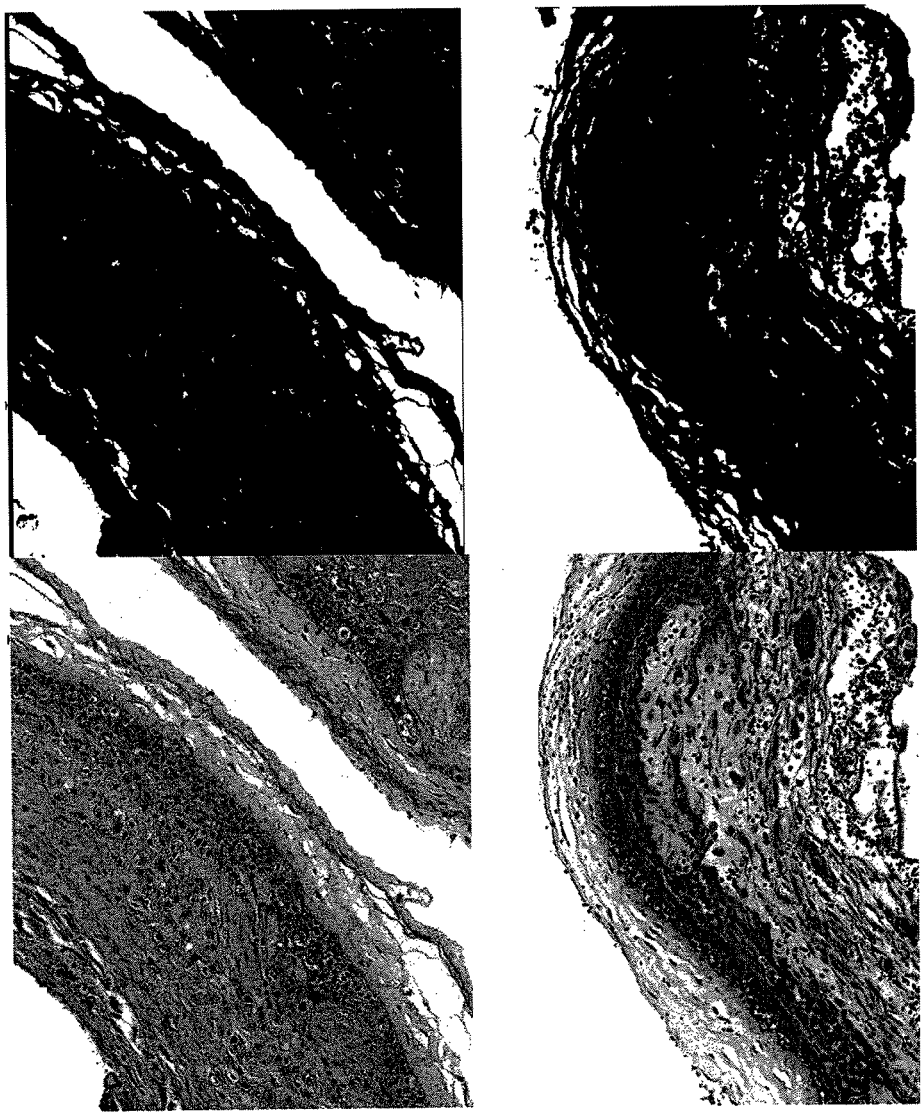
FIG. 2 is a pair of before and after images of placental tissue processed by a spatial fuzzy c-means algorithm (SFCM algorithm). In this application of the algorithm the parts of the image that show an edema of the connective tissue have been extracted.

A placental sample was taken from the umbilical cord of a term fetus. A slice of the tissues was prepared using the standard procedure for preparing a histology slide. The tissue was fixed in formalin, de-hydrated, embedded in a paraffin block, a thin slice was microtomed from the block, and affixed to a glass slide. The slide was placed in an Aperio T3 slide digitizer and the image produced at a magnification of 20×. The digitized image was processed using the SFCM algorithm. The parameters of the algorithm were set to extract the clear areas that characterize edema. Both the original image and the extracted image are shown in FIG. 2. The extracted image separates the areas of edema from the remainder of the image. The presence and extent of edema indicates an abnormal tissue function associated with poor neurodevelopmental outcome.

Example 3

Extracting Connective Tissue

Figure 3:
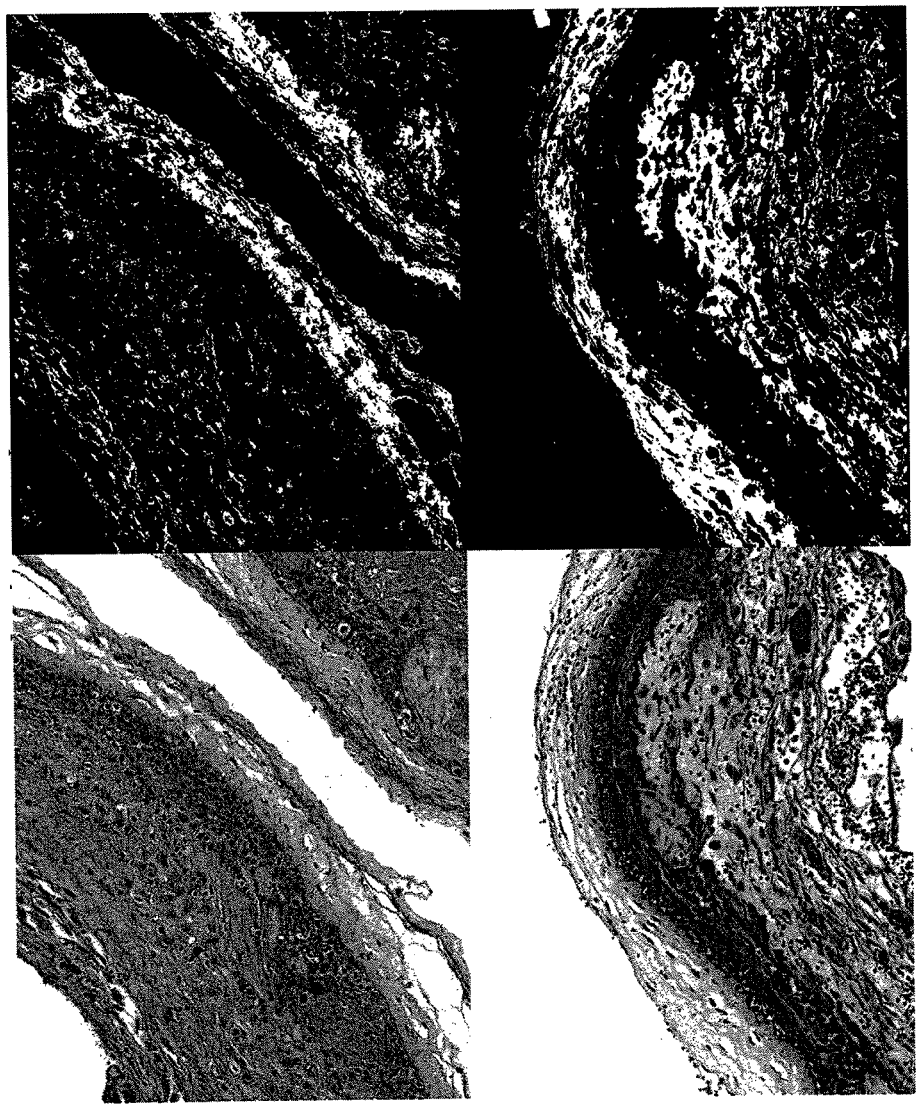
FIG. 3 is a pair of before and after images of placental tissue processed by a spatial fuzzy c-means algorithm (SFCM algorithm). In this application of the algorithm the parts of the image that show views of the connective tissue have been extracted.

A placental sample was taken from the placental membranes of a term fetus. A slice of the tissues was prepared using the standard procedure for preparing a histology slide. The tissue was fixed in formalin, de-hydrated, embedded in a paraffin block, a thin slice was microtomed from the block, and affixed to a glass slide. The slide was placed in an Aperio T3 slide digitizer and the image produced at a magnification of 20×. The digitized image was processed using the SFCM algorithm. The parameters of the algorithm were set to extract the grayscale intensity differences of the characterize connective tissues. Both the original image and the extracted image are shown in FIG. 3. The extracted image separates the connective tissues from the remainder of the image. The damage seen in the connective tissues of the fetal placenta reflects breakdown of those tissues from digestive enzymes which are associated with an increased risk of damage to the child's heart, lungs, and brain.

Example 4

Placental Shape as Reflective of Placental Function as a Fractal Network

Subjects were a subset of the National Collaborative Perinatal Project (NCPP). Details of the study have been described elsewhere [19, 20]. Briefly, from 1959 to 1965, women who attended prenatal care at 12 hospitals were invited to participate in the observational, prospective study. At entry, detailed demographic, socioeconomic and behavioral information was collected by in-person interview. A medical history, physical examination and blood sample were also obtained. In the following prenatal visits, women were repeatedly interviewed and physical findings were recorded. During labor and delivery, placental gross morphology was examined and samples were collected for histologic examination. The children were followed up to seven years of age. Placental gross measures included placental disk shape, relative centrality of the umbilical cord insertion, estimated chorionic plate area, disk eccentricity, placental disk thickness, placental weight, and umbilical cord length, measured according to a standard protocol. Gestational age was calculated based on the last menstrual period in rounded weeks. Among 41,970 women who gave the first or only singleton live birth, 36,017 contributed placenta data. The analytic sample was restricted to those with complete data on the six placental gross measures, placental weight and birth weight, of gestational ages≥34 weeks (younger infants having been unlikely to survive) and less than 43 completed weeks (given that gestations were assigned implausible gestational lengths up to 54 weeks, N=24,061). The original coding of placental measures and the recoding used for this analysis follow:

Chorionic disk shape coding was based on the gross examination of the delivered placenta. Shapes included round-to-oval, and a variety of atypical shapes (e.g., bipartite, tripartite, succenturiate, membranous, crescent or "irregular"). Only 926 (3.8 percent) were labeled as one of the 6 categories of shape other than round-to-oval. For this analysis, the shape measure was recoded as a binary variable with "round-to-oval" as "0" and "other than round-to-oval" as "1."

Relative centrality of the umbilical cord insertion was calculated from two variables recorded in the original data set. The distance from the cord insertion to the closest placental margin was recorded to the nearest cm. The type of umbilical cord insertion was coded as membranous (velamentous), marginal or normal (inserted onto the chorionic disk). We combined these two variables into a single distance measure, by recoding velamentous cord insertions as a negative value, cords inserted at the placental margin as "0" and progressively more central cords as "1" to "9" (overall scale range −13 to 13).

Estimated chorionic plate area was calculated as the area of an ellipse from two variables recorded in the original data set, the larger diameter and smaller diameter of the chorionic disc were recorded in cm. Disk eccentricity was calculated as the ratio of the larger and smaller diameters. Both the chorionic plate area and disk eccentricity could be cast as "interactions" between larger and smaller disk diameters.

Placental thickness at the center of the chorionic disc was recorded in units of 0.1 cm, by piercing the disc with a knitting needle on which millimeter marks were inscribed.

Placental weight was measured in decagrams to the nearest 10 grams; this variable was converted to grams.

The fetoplacental weight ratio was calculated as birth weight divided by the placental weight, and is a value generally considered to reflect a physiologic state of balance between fetal and placental growth.

Umbilical cord length was analyzed as it was measured in the Labor and Delivery Room. Cord lengths ranged from seven to 98 cm.

Maternal characteristics were recorded at enrollment. Maternal age was coded as age at (enrollment) in years, and maternal height was measured in inches. Maternal weight prior to pregnancy was self-reported in pounds. Body mass index (BMI) was calculated from maternal height and weight. Parity counted all delivered live born offspring and did not include miscarriages/early pregnancy losses. Socioeconomic status index was a combined score for education, occupation and family income as scaled by the US Bureau of the Census. [21] Mother's race was coded as a binary variable denoting African-American as "1" and all others as "0"; original data coded race as Caucasian, African American, and "other", most of whom were Puerto Ricans (9.2 percent). Cigarette use was coded by maternal self report at enrollment as non-smoker (coded as <1 cigarette per day), or by the self-reported number of cigarettes smoked daily grouped as 1-9, 10-20, and >20 (greater than one pack per day).

The allosteric metabolic equation was solved for estimates of $\alpha$ and $\beta$. Specifically, $PW=\alpha(BW)^\beta$ is rewritten as a standard regression equation and solved for $\alpha$ and $\beta$:

$$\mathrm{Log}(PW) = \mathrm{Log}\,\alpha + \beta\,\mathrm{Log}(BW)] \quad \text{[Equation 1.1]}$$

From Equation 1.1, $$\mathrm{Log}\,\alpha = \mathrm{Log}(PW) - \beta[\mathrm{Log}(BW)] \quad \text{[Equation 1.2]};$$

Substituting the mean $\beta$ for the population, this second equation was solved for each case, and the calculated Log $\alpha$ was exponentiated and used as a dependent variable in subsequent analyses. Spearman's rank correlations and multivariate regression were used to determine significant associations with P<0.05 was considered significant throughout. Three analyses were run. The first included all placental variables; thus the point-estimate of effect for each placental variable is adjusted for the presence of the others. The second included all maternal and fetal variables; again, data presented reflect effects adjusted for the presence of the other maternal variables. The third analysis included all variables (placental, maternal and fetal). Table 1 shows that the mean $\beta$ was 0.78, ~equal to the scaling of a fractal transport network.

TABLE 1

Descriptives of the placental measures (N = 24,061)
Overall Population

|   | Mean (SD) | Range |
|---|---|---|
| $\alpha$ | −0.25 (0.17) | −1.23, 0.62 |
| $\beta$ | 0.78 (0.02) | 0.66, 0.89 |

Table 2 shows that each of the (crudely measured) placental dimensions altered the equation relating placental weight and birth weight.

TABLE 2

Placental, maternal and fetal influences on $\alpha$

| Variable | | Multivariate model-Placental variables only (N = 24,061) | Multivariate model-Maternal and fetal variables only (N = 21,603) | Multivariate model - All variables (N = 21,603) |
|---|---|---|---|---|
| Placental shape | Round-oval (23,131) Other than round/oval (930) | −0.021 (0.005)*** | | −0.019 (0.005)*** |
| Chorionic plate area | | −0.001 (0.000)* | | −0.001 (0.000)*** |
| Disk ellipsivity | | 0.167 (0.032)*** | | 0.158 (0.031)*** |
| Larger diameter | | 0.016 (0.004)*** | | 0.030 (0.004)*** |
| Smaller diameter | | 0.042 (0.004)*** | | 0.054 (0.004)*** |
| Disc thickness | | 0.010 (0.000)*** | | 0.013 (0.000)*** |

TABLE 2-continued

Placental, maternal and fetal influences on α

| Variable | Multivariate model-Placental variables only (N = 24,061) | Multivariate model-Maternal and fetal variables only (N = 21,603) | Multivariate model - All variables (N = 21,603) |
|---|---|---|---|
| Cord length | *0.001 (0.000)**** | | *0.001 (0.000)**** |
| Relative cord eccentricity | 0.014 (0.007)* | | 0.008 (0.007) |
| Maternal age | | 0.000 (0.000) | −0.001 (0.000)** |
| Parity | | 0.000 (0.000) | 0.001 (0.001)* |
| Smoking | | *0.022 (0.001)**** | *0.017 (0.001)**** |
| Infant gender | | *0.020 (0.002)**** | *0.018 (0.002)**** |
| Birth length | | *0.002 (0.000)**** | *-0.011 (0.000)**** |
| Maternal BMI | | *-0.001 (0.000)**** | *-0.001 (0.000)**** |
| Socioeconomic status | | 0.000 (0.001) | *-0.008 (0.001)**** |
| African-American race | | 0.002 (0.003) | *0.023 (0.002)**** |
| Gestational age | | *-0.007 (0.001)**** | *-0.009 (0.001)**** |

***P < 0.0001 bolded and italicized;
**P < 0.001;
*P < 0.05;
Not bolded, P > 0.05.

In a modern data set with our more sensitive and valid methods of measuring placental shape, we were more direct. Using the population α derived from the Collaborative Perinatal Project, we solved for β, and subtracted the calculated β from the population β, and explored the relationships between "delta β" and the irregularity of the placental shape measured in 3 ways: 1. From the centroid of the placental shape (the mathematical center of the placenta, a physiologically arbitrary point); 2. From the site of umbilical cord insertion, the actual point of origin of the placental fractal vascular network; and 3. The roughness, calculated as the ratio of the perimeter to that of the smallest convex hull. Deviations from the ideal fractal scale were uncorrelated with the biologically arbitrary centroid, but were highly correlated with both the radial deviation from the umbilical cord insertion, and the roughness, a general measure of perimeter irregularity.

TABLE 3

Correlation of the deviation from a round shape with a deviation from the ¾ rule

| | | beta3_4 |
|---|---|---|
| Radial standard deviation of the plate area from the centroid | Pearson Correlation | .020 |
| | Significance | .485 |
| | N | 1199 |
| Radial standard deviation of the plate area from the umbilical cord | Pearson Correlation | −.076 |
| | Significance | .009 |
| | N | 1187 |
| Roughness = ratio of the perimeter to that of the smallest convex hull | Pearson Correlation | .091 |
| | Significance | .002 |
| | N | 1199 |

In another data set the blood vessels were traced on digital images of the placental chorionic surface. A distance measurement algorithm was applied to the image to determine the distance from each pixel to the nearest blood vessel. A metric was calculated using the mean distance divided by the placental diameter. Regression of that metric versus birth weight data showed that it accounted for 25% of birth weight variation.

Example 5

Seven Slides

A set of 7 slides considered paradigms for major types of placental growth included: Normal placenta at 31 weeks (defined as prevalence of immature intermediate and mesenchymal villi, absent mature intermediate and terminal villi, poorly matured stem villi), Immature placenta at term (defined as prevalence of mature intermediate and stem villi, paucity of immature intermediate and terminal villi), Normal term placenta (defined as an even distribution of all types of villi), Preterm preeclampsia at 31 weeks (defined as poorly branched, extremely tiny, filiform terminal villi and an unusually wide intervillous space due to reduced terminal branching), Term preeclampsia (defined as a generally even distribution of all villus types), and two cases of malformed villi with normal numerical mixture of villous types). A minimal set of villous morphometric algorithms developed with ECognition software was applied to these 7 slides.

Figure 4A:
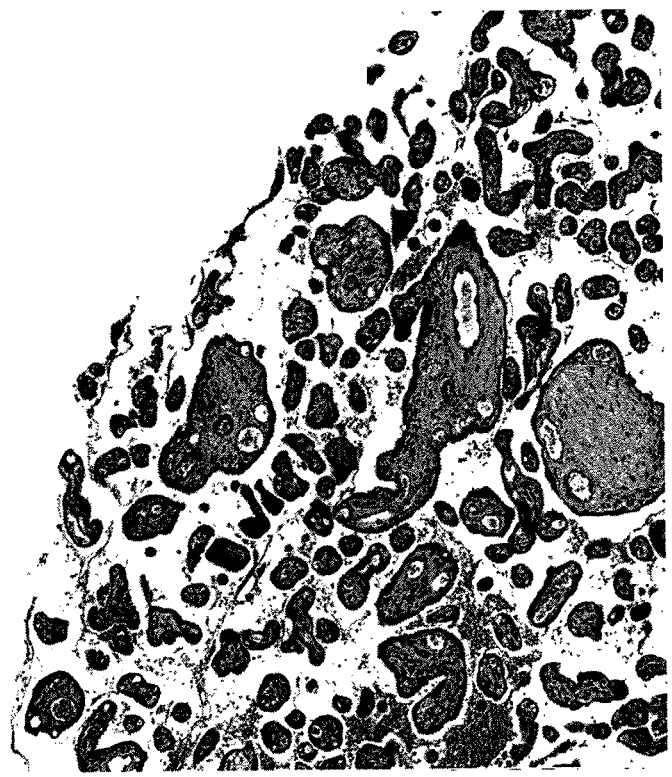
FIG. 4A is a photograph of a digitized histology slide.
Figure 4B:
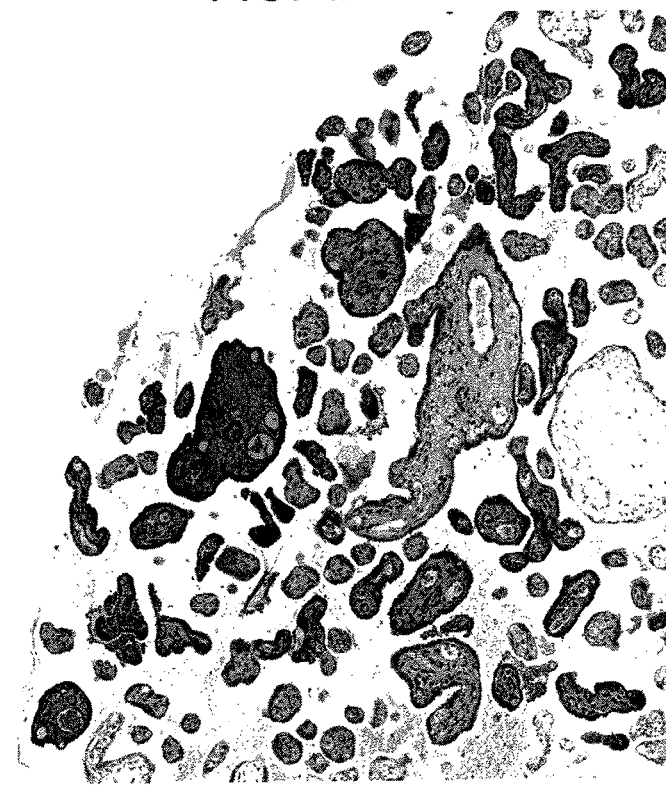
FIG. 4B is the image processed by the ECognition software showing the extracted objects
Figure 5:
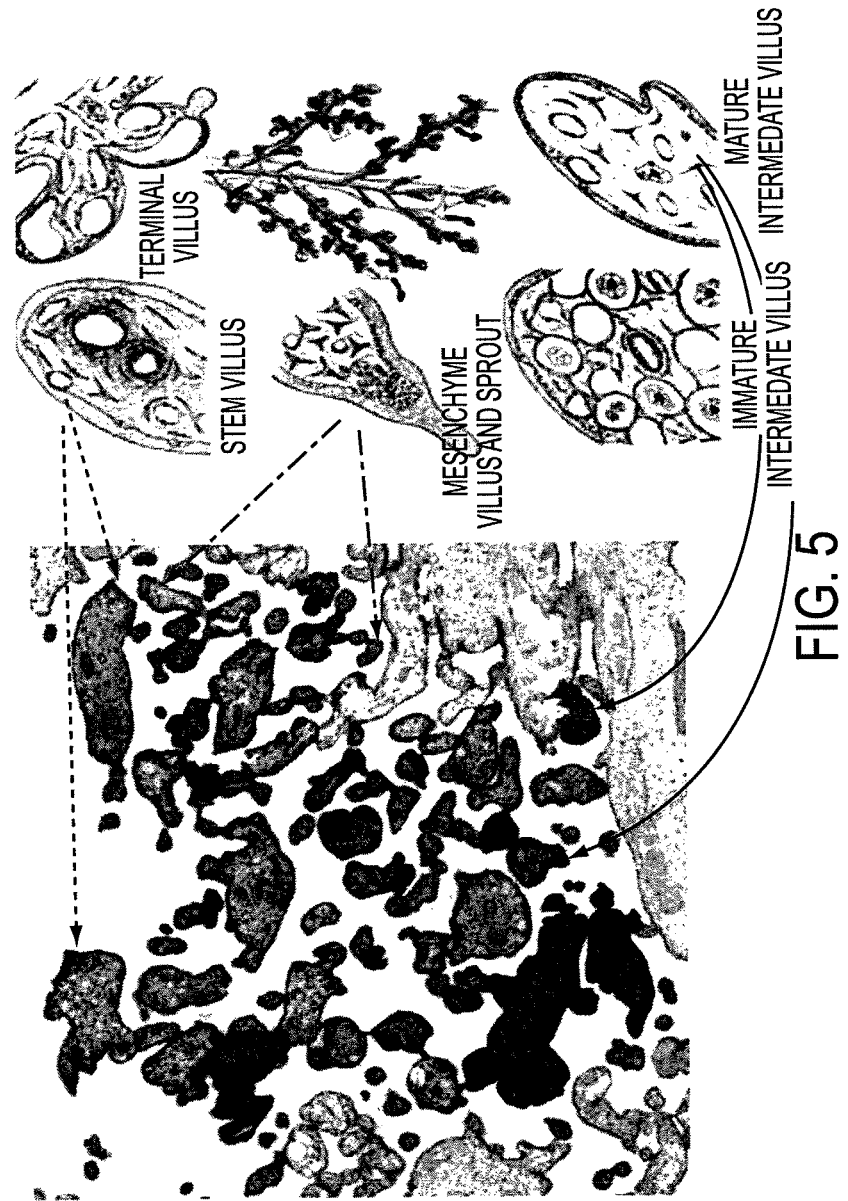
FIG. 5 shows the image from FIG. 4B correlated with the biological schema.
Figure 6:
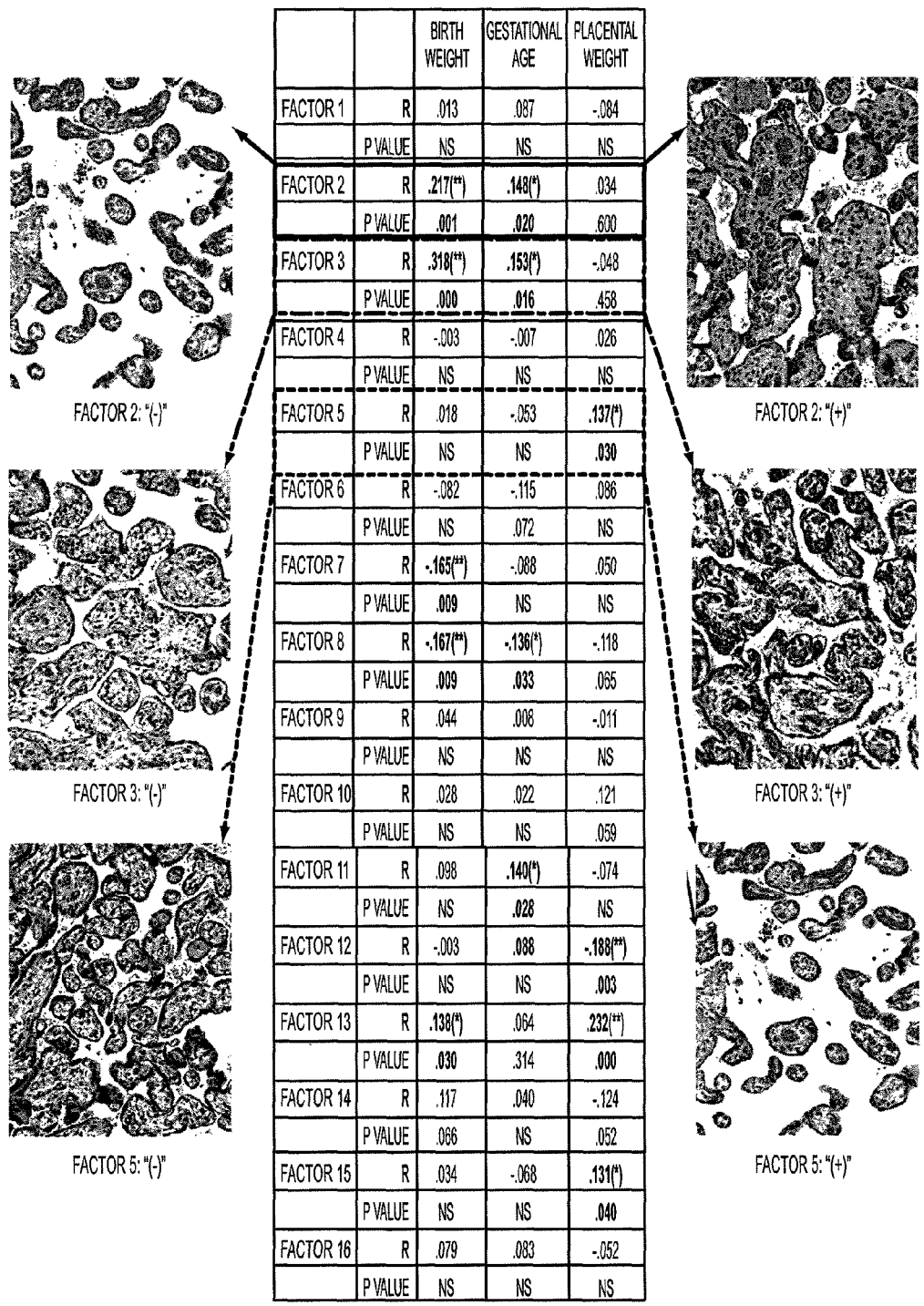
FIG. 6 is a series of photomicrographs depicting selected photomicrographs from cases with extreme low (negative) and high (positive) factor scores.

Slide Digitization: Slides were digitized using an Aperio T3 instrument that is a self-contained system for image capture, manipulation and management. This included tissue finding, auto-focusing, automated scanning, image compression and slide quality assessment. All relevant image capture parameters (e.g., file name, ScanScope ID, scan time, barcode, quality score, the directory path to the virtual slide image, etc.) are stored in a Virtual Slide Manager database (Aperio, Vista, Calif.). The slides were stored as JPEG compatible .svs files for optimal computational speed within the ECognition framework. FIG. 4A shows an unprocessed image obtained by the slide digitizer. FIG. 4B shows the same image after it was processed by the ECognition software. FIG. 5 shows the correlation of the image objects to their biological counterparts.

Results showed that villous histologic features were reduced to 13 variables related to villous size and/or villous capillary location. At least 2 and as many as 5 variables significantly distinguished the abnormal patterns from the paradigm normal pattern (p<0.05).

TABLE 4

Factor means comparing pathology types to "normal"

|  | Malformed at term | Preterm/ immature | Immature/term | Preterm preeclampsia | Term preclampsia |
|---|---|---|---|---|---|
| Factor 1 | −0.08 v 0.15 | −.021 v. 0.13 | 0.04 v. −0.90 | 0.15 v. −076 | −0.13 v. 0.41 |
| Factor 2 | −0.26 v. 0.45 | 0.04 v. −0.27 | 0.0 v. −0.14 | −0.14 v. 0.70 | 0.29 v. −0.96 |
| Factor 3 | 0.23 v. −0.40 | 0.02 v. −0.11 | 0.02 v. −0.36 | −0.04 v. 0.21 | −0.22 v. 0.73 |
| Factor 4 | −0.15 v. 0.26 | −0.04 v. 0.21 | −0.02 v. 0.51 | 0.10 v. −0.50 | 0.05 v. −0.17 |
| Factor 5 | −0.05 v. 0.08 | 0.02 v. −0.14 | 0.00 v. −0.21 | 0.08 v. −0.41 | −0.06 v. 0.21 |
| Factor 6 | 0.09 v. −0.16 | 0.00 v. −0.01 | 0.01 v. −0.21 | −0.10 v. 0.48 | 0.00 v. 0.00 |
| Factor 7 | 0.04 v. −0.08 | 0.06 v. −0.34 | 0.00 v. −0.04 | −0.03 v. 0.15 | −0.06 v. 0.19 |
| Factor 8 | 0.02 v. 0.04 | 0.02 v. −0.49 |  |  |  |
| Factor 9 | −0.20 v. 0.04 | −0.20 v. 0.82 |  |  |  |

In the 7 hematoxylin and eosin stained samples of placental villous branching morphogenesis types (paradigms for major types of placental growth), 80 variables were analyzed and reduced to 9 factors using principal components factor analysis (PCA) (see Table 5). The 6 paradigm patterns of abnormal placental villous branching were distinguishable from "term normal" by >1 factors, suggesting the present approach is tenable.

In the original test of 7 slides (see above), several variables could not be calculated; segmentation criteria were not robust to the full range of villous variability. Algorithms were revised and applied to 23 digitalized slides containing at least 1.5 MB of tissue data. 131 variables were calculated. Principal components analysis yielded 16 factors that together accounted for ~88% of total data variance (see Table 5).

TABLE 5

PCA results showing 5 factors acount for 2/3 of data variance

| Component | Initial Eigenvalues | | |
|---|---|---|---|
|  | Total | % of Variance | Cumulative % |
| Factor 1 | 40.584 | 36.56 | 36.56 |
| Factor 2 | 11.518 | 10.38 | 46.94 |
| Factor 3 | 9.296 | 8.38 | 55.31 |
| Factor 4 | 7.386 | 6.65 | 61.97 |
| Factor 5 | 4.954 | 4.46 | 66.43 |
| Factor 6 | 4.293 | 3.87 | 70.30 |
| Factor 7 | 3.601 | 3.24 | 73.54 |
| Factor 8 | 3.190 | 2.87 | 76.42 |
| Factor 9 | 2.700 | 2.43 | 78.85 |
| Factor 10 | 1.841 | 1.66 | 80.51 |
| Factor 11 | 1.709 | 1.54 | 82.05 |
| Factor 12 | 1.551 | 1.40 | 83.45 |
| Factor 13 | 1.457 | 1.31 | 84.76 |
| Factor 14 | 1.251 | 1.13 | 85.89 |
| Factor 15 | 1.172 | 1.06 | 86.94 |
| Factor 16 | 1.114 | 1.00 | 87.95 |

Thus, automated assessment of placental villous branching growth is informative in clarifying placental pathology and by extension fetal pathophysiology.

Example 5

Microscopic Placental Measurement Tool

Using analytical software (ECognition, Definiens, Munich, Germany), a first set of villous algorithms were developed that were based on the histology items identified in a set of 10 digitalized histologically "normal" slides. Data were segmented into objects (villi) of different size ranges and into several specific histopathology items that pertain to discrete levels of the villous hierarchy, creating a simple set of "model objects", the basic elements of the network language.

One hundred random hematoxylin and eosin stained (H&E) slides were digitized using an Aperio T3 instrument that is a self-contained system for image capture, manipulation and management. All relevant image capture parameters (e.g., file name, ScanScope ID, scan time, barcode, quality score, the directory path to the virtual slide image, etc.) was stored in a Virtual Slide Manager database (Aperio, Vista, Calif.). The slides were stored as JPEG compatible .svs files for optimal computational speed within the ECognition framework. 95 of the 100 were scanned at an image quality of at least 95% in a first run. In the other 5 slides, digitalization failed due to unusual placement of the tissue sample on the slide; adequate scanning was achieved in all of those cases after manual selection of the tissue frame.

Using ECognition software (Definiens, Munich, Germany), there was developed a preliminary set of villous algorithms based on histology items identified in a set of 10 slides from term placentas considered histologically "normal" and delivered at term of AGA liveborn, non-anomalous infants with normal fetoplacental weight ratios, and no diagnoses of diabetes or preeclampsia. The image was segmented into objects (villi, see e.g., FIG. 2) of different sizes and into specific histology items that pertain to discrete levels of the villous hierarchy (such as syncytial knots, vasculosyncytial membranes), creating a set of "model objects", the basic elements of the network language. Seventy-eight aspects of these objects were quantified. Principal components analysis produced 7 factors that accounted for 48% of the total data variance. These algorithms were applied to 6 "gold standard" H&E slides of abnormal placental villous branching morphogenesis types (preterm preeclampsia, term preeclampsia, preterm, immature at term non-diabetic malformed, diabetic malformed). The 6 paradigms of abnormal placental villous branching were distinguishable from "term normal" by at least one (immature term vs. normal term) and up to 5 factors (preterm preeclampsia v. normal term).

The modified algorithms were applied to a set of 24 slides (drawn from the population reported in Salafia et al, AJE 2005) representing a range of birth weights from 800-4300 g, and gestational ages 24-41 weeks. One hundred thirty-one variables were quantified and reduced into 16 principal component factors that accounted for 88% of data variance (see Table 3). Cases with extreme low ("negative") and high ("positive") factor scores were imaged (see e.g., FIG. 3). Spearman correlations showed 5 factors correlated with birth weight, 3 of which were also correlated with gestational age. Four additional factors were correlated with placental weight but were not correlated with gestational age. One of these was correlated with birth weight. Generally, birth weight, gestational age, and placental weight are highly correlated. That the selected factors discriminate among these outcomes supports the efficacy of the approaches described herein.

TABLE 6

Table of correlations of factor scores with birthweight, gestational age and placental weight.

| | | Birth weight | Gestational age | Placental weight |
|---|---|---|---|---|
| Factor 1 | R | .013 | .087 | −.084 |
| | P value | NS | NS | NS |
| Factor 2 | R | .217(**) | .148(*) | .034 |
| | P value | .001 | .020 | .600 |
| Factor 3 | R | .318(**) | .153(*) | −.048 |
| | P value | .000 | .016 | .458 |
| Factor 4 | R | −.003 | −.007 | .026 |
| | P value | NS | NS | NS |
| Factor 5 | R | .018 | −.053 | .137(*) |
| | P value | NS | NS | .030 |
| Factor 6 | R | −.082 | −.115 | .086 |
| | P value | NS | .072 | NS |
| Factor 7 | R | −.165(**) | −.083 | .050 |
| | P value | .009 | NS | NS |
| Factor 8 | R | −.167(**) | −.136(*) | −.118 |
| | P value | .009 | .033 | .065 |
| Factor 9 | R | .044 | .008 | −.011 |
| | P value | NS | NS | NS |
| Factor 10 | R | .028 | .022 | .121 |
| | P value | NS | NS | .059 |
| Factor 11 | R | .098 | .140(*) | −.074 |
| | P value | NS | .028 | NS |
| Factor 12 | R | −.003 | .088 | −.188(**) |
| | P value | NS | NS | .003 |
| Factor 13 | R | .138(*) | .064 | .232(**) |
| | P value | .030 | .314 | .000 |
| Factor 14 | R | .117 | .040 | −.124 |
| | P value | .066 | NS | .052 |
| Factor 15 | R | .034 | −.068 | .131(*) |
| | P value | NS | NS | .040 |
| Factor 16 | R | .079 | .083 | −.052 |
| | P value | NS | NS | NS |

**Correlation is significant at the 0.01 level (2-tailed).
*Correlation is significant at the 0.05 level (2-tailed).

Given the data above, histologically, factors appear to mark visually distinct patterns of villous sizes, stromal composition, trophoblast features, and capillary architecture. Therefore, Automated slide analysis of villous branching patterns is feasible and may open a new avenue of placental analysis.

Example 6

Macroscopic Placental Measurement Tool

A random sample of 50 Kodachrome slides was obtained from Avon Longitudinal Study of Parents and Children (ALSPAC) and digitized using a computer linked Canon Canoscan FS2710. Images suitable for the graphical analysis methods were selected by a placental pathologist and epidemiologist.

Figure 7:
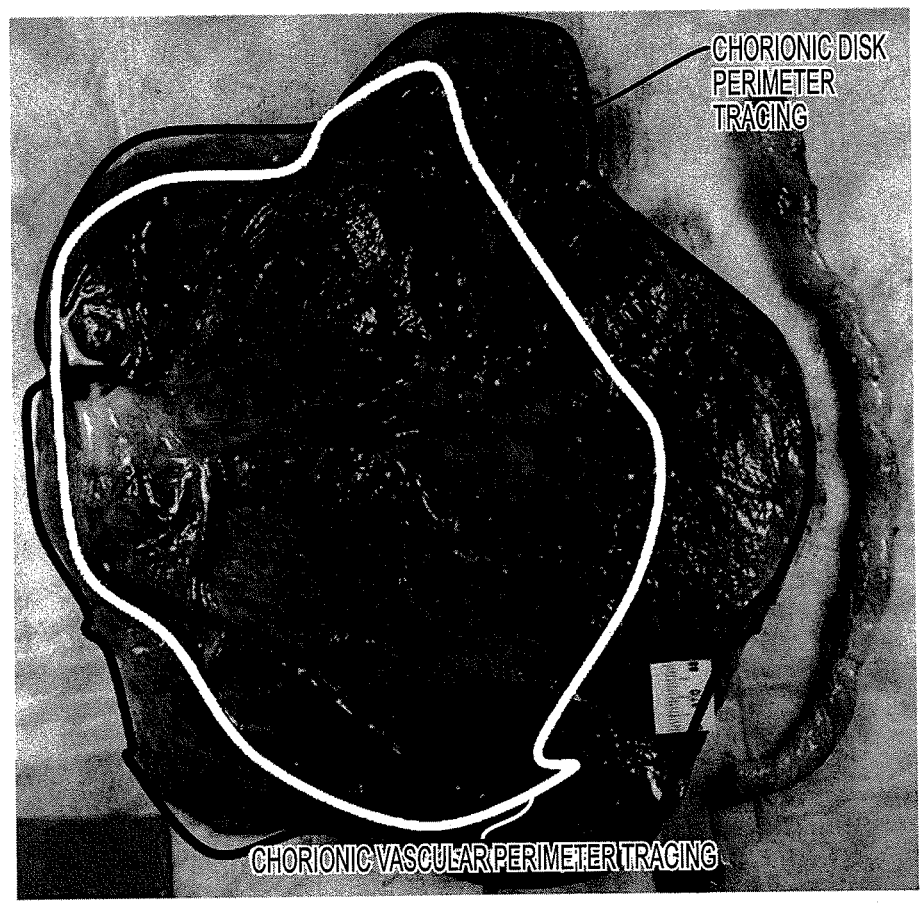
FIG. 7 is a photograph of a placenta sliced in 8ths, and the corresponding traced sliced perimeters

A set of Excel-based macros were developed that capture and organize the mouse-clicks of a Kurta Graphics tablet. From digitized photographs of the placental chorionic surface, the umbilical cord insertion, the disk perimeter and terminal points of chorionic plate vasculature were marked (see e.g., FIG. 7). A second macro captured placental chorionic vasculature stereologically with a spiral grid of pitched at 1 cm intervals with the origin centered at the umbilical cord insertion. At each intersection of a placental chorionic vessel with the spiral, the sides of the vessel were marked, from which vessel numbers and calibers were calculated at distances from the umbilical cord insertion. A third macro traced the outlines of placental disk slices. The placenta was sliced in 8ths, creating 7 unique surfaces from which placental volume can be estimated without bias following Cavalieri's method. The macro also calculated mean and standard deviation of thickness, and minima and maxima relative to the cord insertion site and margins.

Standard regression analysis of placental chorionic surface characteristics was performed. The simple perimeter of the placental chorionic surface, oriented to cord insertion and disk edge closest to the site of membrane ruptured captured as much birth weight variance as placental weight. Novel measures accounted for more than twice the birth weight variance of current pathology standard measures (a single pair of diameters, and a single measure of disk thickness (c.f., Salafia et al, Am J Epidemiol 2005)).

Example 7

Factor Analysis

Thirty variables were successfully quantified for each of three different classes of villi defined by their cross sectional area; one variable quantified the area of fibrin in the slide.

A principal components analysis was used for data reduction. 16 factors were identified that had eigen values>1, and accounted for 89% of the total data variance.

Figure 9:
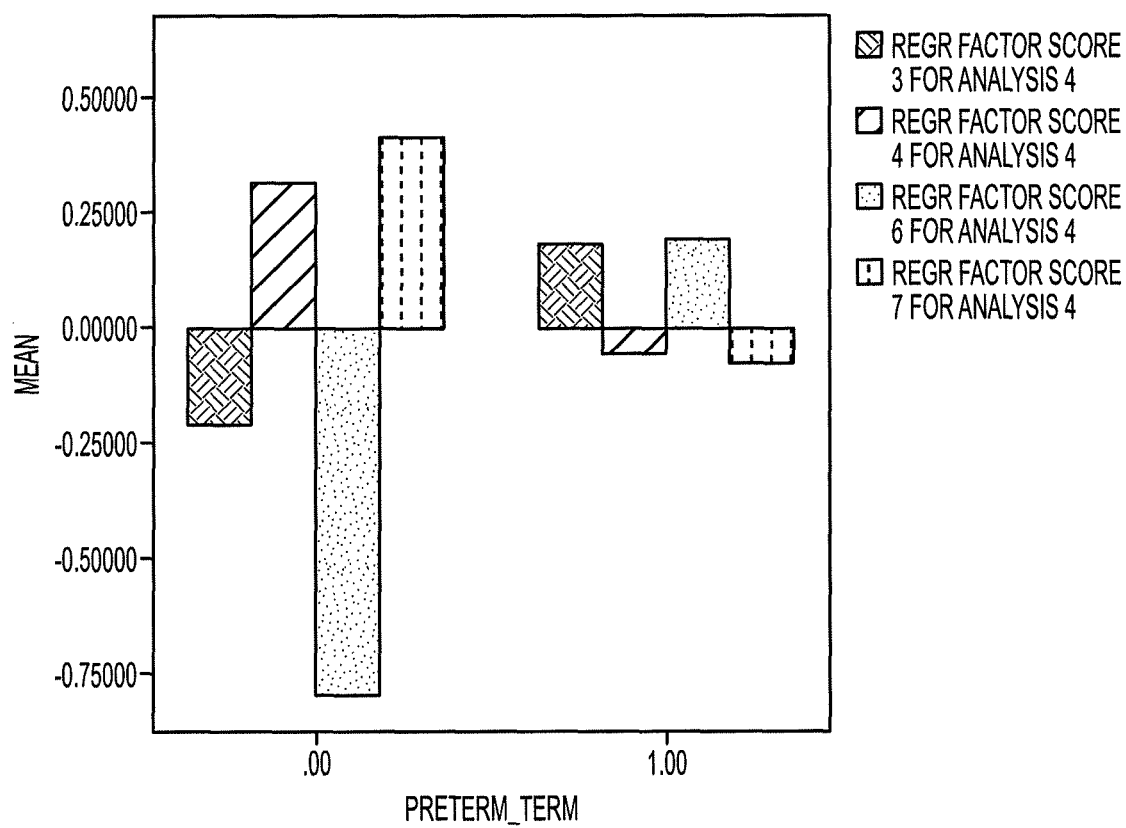
FIG. 9 is a series of histograms of mean REGR factor score 3, 4, 6, and 7, for term and preterm birth.

Data were categorized as preterm v. term. Four factors were significantly different (see e.g., FIG. 9).

Figure 10:
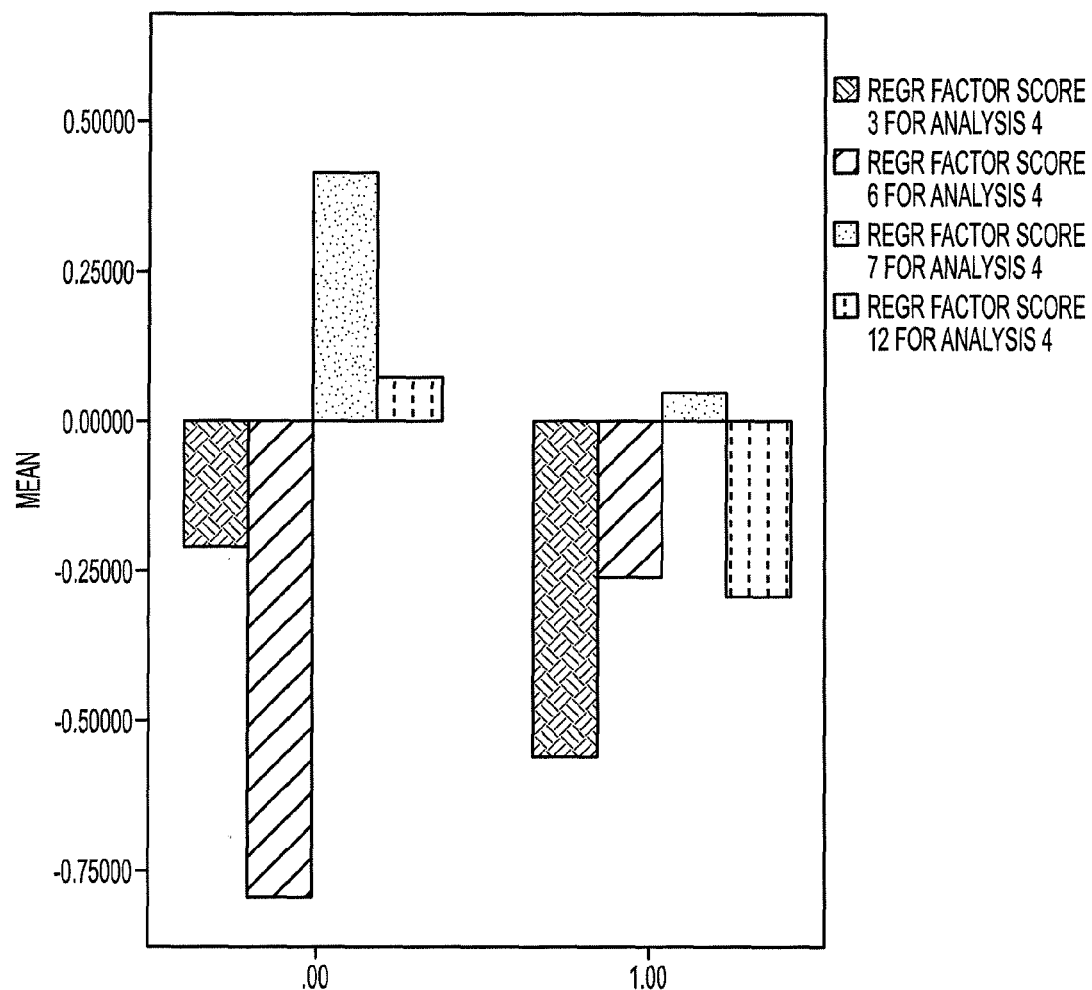
FIG. 10 is a series of histograms of mean REGR factor score 3, 6, 7, and 12 for preterm cases categorized as having chorioamnionitis ('1') and not having chorioamnionitis ('0').

Preterm cases were categorized as having chorioamnionitis (a recognized cause of preterm birth birth) and not having chorioamnionitis. The latter, "idiopathic preterm birth", is believed to result from chronic intrauterine pathology. However, since villous branching patterns are impossible to reliably quantify by expert pathologists, this has been debated. Four factors distinguished villous patterns between these two types of preterm birth (the single largest cause of infant morbidity and mortality in the US and in the world) (see e.g., FIG. 10). This is the first demonstration of distinct villous growth patterns in these two distinct types of preterm birth.

Finally, Spearman's correlations were performed to assess associations among factors scores and birth weight, gestational age and placental weight (see e.g., Table 4). While these three features are highly intercorrelated, factor scores differentiated among them, with only 3 factors associated with all three outcomes, and 9 other factors associated with one or two of the outcomes but not a third. Notably, factor 1, which accounted for ~40% of data variance, was not associated with any of the outcomes. Without wishing to be bound to a single theory, it is speculated that this factor reflects some basic common structure in placental villi that is common to placentas, and not variable by birth weight, gestational age or placental weight.

TABLE 7

Spearman's correlations for associations among factors scores and birth weight, gestational age and placental weight.

| | | Birth weight | Gestational age | Placental weight |
|---|---|---|---|---|
| Factor score 1 | Correlation Coefficient | .014 | .010 | −.088 |
| | Sig. (2-tailed) | .794 | .855 | .170 |
| Factor score 3 | Correlation Coefficient | .465 | .312 | −.035 |
| | Sig. (2-tailed) | .000 | .000 | .585 |
| Factor score 4 | Correlation Coefficient | −.129 | −.104 | .054 |
| | Sig. (2-tailed) | .019 | .052 | .399 |
| Factor score 5 | Correlation Coefficient | .294 | .177 | .015 |
| | Sig. (2-tailed) | .000 | .001 | .815 |
| Factor score 6 | Correlation Coefficient | .304 | .280 | .187 |
| | Sig. (2-tailed) | .000 | .000 | .003 |
| Factor score 7 | Correlation Coefficient | −.254 | −.161 | .035 |
| | Sig. (2-tailed) | .000 | .003 | .590 |
| Factor score 8 | Correlation Coefficient | .130 | .146 | .130 |
| | Sig. (2-tailed) | .018 | .006 | .042 |
| Factor score 10 | Correlation Coefficient | .002 | −.064 | .193 |
| | Sig. (2-tailed) | .972 | .230 | .002 |
| Factor score 11 | Correlation Coefficient | .109 | .144 | −.050 |
| | Sig. (2-tailed) | .047 | .007 | .432 |

TABLE 7-continued

Spearman's correlations for associations among factors scores and birth weight, gestational age and placental weight.

| | | Birth weight | Gestational age | Placental weight |
|---|---|---|---|---|
| Factor score 12 | Correlation Coefficient | .128 | .126 | .232 |
| | Sig. (2-tailed) | .019 | .019 | .000 |
| Factor score 13 | Correlation Coefficient | .113 | .202 | −.131 |
| | Sig. (2-tailed) | .039 | .000 | .040 |
| Factor score 14 | Correlation Coefficient | .044 | .022 | .130 |
| | Sig. (2-tailed) | .421 | .686 | .041 |
| Factor score 15 | Correlation Coefficient | .031 | −.049 | −.148 |
| | Sig. (2-tailed) | .567 | .365 | .020 |

Example 8

Testing Predictive Value for Abnormal Childhood Somatic Development

No comparable placental measures have been calculated previously in any of the national and international birth cohorts that have childhood follow-up. However, crude measures of the placental disk (a pair of placental chorionic disk diameters and one measure of disk thickness) were collected in the National Collaborative Perinatal Project (NCPP, recruited 1959-1966, see reprint Salafia et al, 2006 in review). Extracted was the first singleton liveborn of each family in the NCPP delivered at ≥34 gestational weeks (N=15,399). Body mass index (BMI) and IQ at age 7 years were regressed against z-scored placental weight, birth weight and estimated placental chorionic surface area (calculated from the larger and smaller placental disk diameters) and disk thickness. Placental chorionic surface area and disk thickness were independently associated with BMI and IQ at age 7 years after adjustment for birth and placental weights. These standard placental measures are not only crude but they more poorly measure more unusually shaped (and more poorly grown) placentas than more normal round, oval and uniformly thick placentas. Despite limitations, the above analysis demonstrates effects on both bodily growth and IQ at age 7 and supports the approach of using comprehensive placental measures to yield useful predictions of childhood health risks.

TABLE 8

Regression
Dependent Variable: Zscore Age 7 IQ
Predictors: Chronological age at the time of IQ test,
Zscore chorionic plate area,
Zscore placental thickness (.1 cms), Zscore cord length (cms),
Zscore birthweight, gms Model Summary

| Model | R | R Square | Adjusted R Square | Std. Error of the Estimate |
|---|---|---|---|---|
| 1 | .250 | .063 | .062 | .97170116 |

ANOVA

| Model | | Sum of Squares | df | Mean Square | F | Sig. |
|---|---|---|---|---|---|---|
| 1 | Regression | 1952.285 | 5 | 390.457 | 413.531 | .000 (a) |
| | Residual | 29283.517 | 31014 | .944 | | |
| | Total | 31235.802 | 31019 | | | |

TABLE 8-continued

Regression
Dependent Variable: Zscore Age 7 IQ
Predictors: Chronological age at the time of IQ test,
Zscore chorionic plate area,
Zscore placental thickness (.1 cms), Zscore cord length (cms),
Zscore birthweight, gms Coefficients

| Model | | Unstandardized Coefficients B | Std. Error | t | Sig. |
|---|---|---|---|---|---|
| 1 | (Constant) | .791 | .058 | 13.751 | .000 |
| | Zscore birthweight, gms | .076 | .006 | 11.853 | .000 |
| | Zscore cord length(cms) | .134 | .006 | 23.194 | .000 |
| | Chronological age at time of test | −.002 | .000 | −12.977 | .000 |
| | Zscore placental thickness (.1 cms) | .118 | .006 | 20.466 | .000 |
| | Zscore chorionic plate area | .043 | .006 | 6.916 | .000 |

TABLE 9

Regression
Dependent Variable: Body Mass Index (BMI) at age 7 years
Predictors: (Constant), Zscore Placental thickness,
Zscore Chorionic plate area,
Zscore length of cord (cms), Zscore birthweight (gms),
Zscore placental weight (gms)

Model Summary

| Model | R | R Square | Adjusted R Square | Std. Error of the Estimate |
|---|---|---|---|---|
| 1 | .195 | .038 | .038 | 1.81252 |

ANOVA

| Model | | Sum of Squares | df | Mean Square | F | Sig. |
|---|---|---|---|---|---|---|
| 1 | Regression | 2000.113 | 5 | 400.023 | 121.8 | .000 |
| | Residual | 50569.281 | 15393 | 3.285 | | |
| | Total | 52569.394 | 15398 | | | |

Coefficients

| Model | | B | Std. Error | t | Sig. |
|---|---|---|---|---|---|
| 1 | (Constant) | 15.965 | .015 | 1093.013 | .000 |
| | Zscore placental weight (gms) | .055 | .022 | 2.511 | .012 |
| | Zscore length of cord (cms) | .074 | .015 | 4.898 | .000 |
| | Zscore birthweight (gms) | .242 | .019 | 12.946 | .000 |
| | Zscore Chorionic plate area | .059 | .019 | 3.157 | .002 |
| | Zscore Placental thickness | .068 | .016 | 4.184 | .000 |

TABLE 10

Dependent Variable: Zscore: Age 7 IQ.
Predictors: Chronological age at the time of IQ test,
Zscore gestational age at delivery in weeks,
Zscore birthweight, gms, log transformed score for
fetal inflammatory response in umbilical cord,
log transformed score for maternal inflammatory response
in extraplacental membranes and chorionic plate Model Summary

| Model | R | R Square | Adjusted R Square | Std. Error of the Estimate |
|---|---|---|---|---|
| 1 | .185 (a) | .034 | .034 | .98736564 |

ANOVA

| Model | | Sum of Squares | df | Mean Square | F | Sig. |
|---|---|---|---|---|---|---|
| 1 | Regression | 960.896 | 5 | 192.179 | 197.129 | .000 |
| | Residual | 27224.804 | 27926 | .975 | | |
| | Total | 28185.700 | 27931 | | | |

Coefficients

| Model | | Coefficients B | Std. Error | t | Sig. |
|---|---|---|---|---|---|
| 1 | (Constant) | .782 | .061 | 12.765 | .000 |
| | Zscore birthweight, gms | .142 | .006 | 22.451 | .000 |
| | Chronological age at time of test | −.002 | .000 | −11.847 | .000 |
| | Zscore: gestational age at delivery, weeks | .025 | .006 | 3.865 | .000 |
| | log transformed score for fetal inflammatory response in umbilical cord | .240 | .020 | 12.182 | .000 |
| | log transformed score for maternal inflammatory response in extraplacental membranes and chorionic plate | −.152 | .014 | −10.629 | .000 |

TABLE 11

Dependent Variable: Zscore: Age 7 IQ; Predictors: Chronological age
at the time of IQ test, Zscore gestational age at delivery in weeks,
Zscore birthweight, gms, log transformed score for infarct/abruption Model Summary

| Model | R | R Square | Adjusted R Square | Std. Error of the Estimate |
|---|---|---|---|---|
| 1 | .183 | .033 | .033 | .98683026 |

ANOVA

| Model | | Sum of Squares | df | Mean Square | F | Sig. |
|---|---|---|---|---|---|---|
| 1 | Regression | 1039.565 | 4 | 259.891 | 266.874 | .000 (a) |
| | Residual | 30072.967 | 30881 | .974 | | |
| | Total | 31112.531 | 30885 | | | |

Coefficients

| Model | | Unstandardized Coefficients B | Std. Error | t | Sig. |
|---|---|---|---|---|---|
| 1 | (Constant) | .697 | .059 | 11.896 | .000 |
| | Zscore: birthweight, gms | .145 | .006 | 24.235 | .000 |

TABLE 11-continued

Dependent Variable: Zscore: Age 7 IQ; Predictors: Chronological age
at the time of IQ test, Zscore gestational age at delivery in weeks,
Zscore birthweight, gms, log transformed score for infarct/abruption

| | | | | |
|---|---|---|---|---|
| Chronological age at time test | −.002 | .000 | −11.800 | .000 |
| Zscore: gestation at delivery, weeks | .025 | .006 | 4.140 | .000 |
| log transformed score for infarct/abruption | .108 | .008 | 13.578 | .000 |

Example 9

Refinement

The data set is a 1,000 case subset of the Avon Longitudinal Study of Parents and Children (ALSPAC), an internationally recognized longitudinal study of children's health. The data set has been used to help understand the contribution of genetic factors, antenatal risk factors, peripartum conditions to perinatal and/or childhood outcomes. 14,000 placentas were collected and stored. The analytic sample used, and to be used, according to methods described herein include 1000 cases with placental photographs and a minimum of 7 tissue samples processed into wax blocks and H&E slides.

Macroscopic

For macroscopic placental analysis, ALSPAC placental photographs, initially preserved as Kodachrome slides, are scanned using the Canon Canoscan FS2710 attached to a PC using Windows and stored as jpgs. Data are extracted from digitized images of placental chorionic surface and disk slices (see Example 3).

Figure 8:
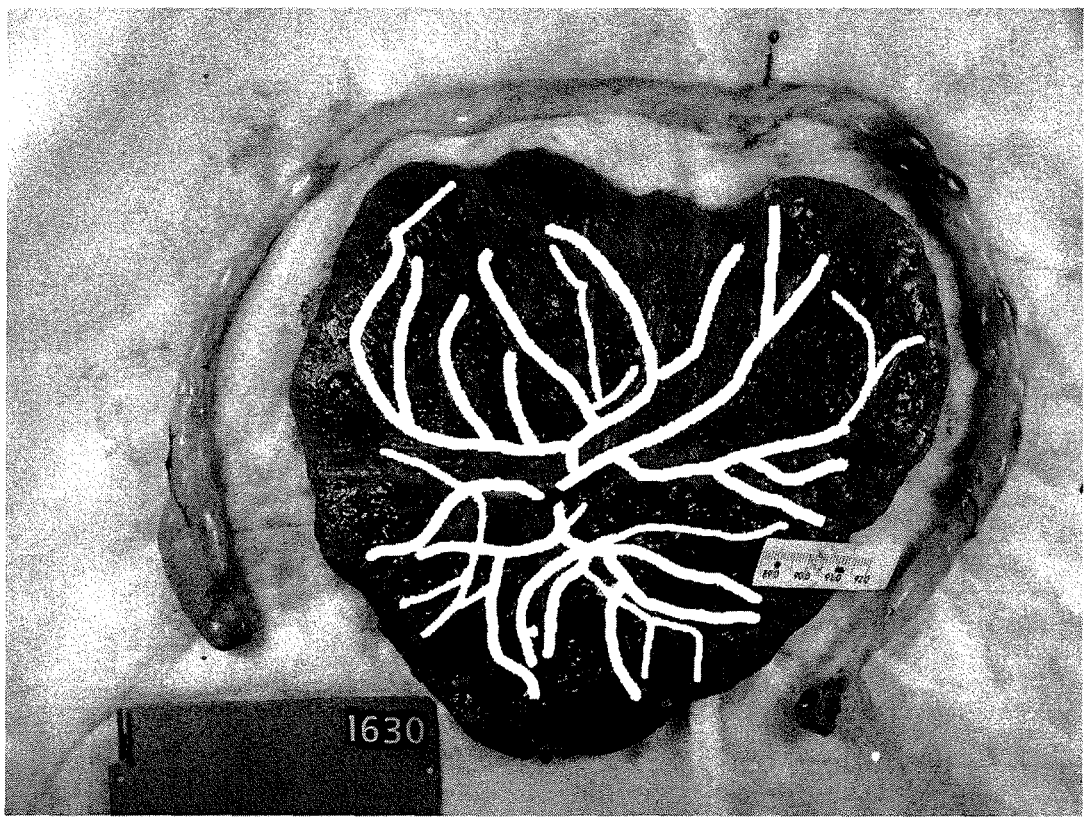
FIG. 8 is a digitized photograph of the placental chorionic surface marked for the umbilical cord insertion, the disk perimeter (outer marking), and terminal points of chorionic vascular plate branches (inner marking). The ratio of these areas is associated with decreased observed/expected birth weight.

Additional data and orientation points are incorporated into the placental chorionic surface analyses (e.g., chorionic vascular branching and vessel calibers). As described above, the macros for chorionic vascular branching measurement have <5% inter-rater variability. Patterns of chorionic surface branching correlate with patterned villous branching in microscopic slides, and they combine to provide a measure that predicts the long term health of other organs that undergo contemporaneous (in utero) branching development. FIG. 8 shows an example of the tracing of chorionic vessel branching.

Disk thickness measures are incorporated into a single 3-dimensional macroscopic placental structural measurement model Likewise, measurements of disk thickness (also with 5% inter-rater variability) that better capture its variability improve the ability to characterize placental structure. Moreover, differences in disk thickness may correlate with specific changes in microscopic patterned villous branching. Macroscopic and microscopic placental structural measures are likely to converge to identify abnormally stressful intrauterine environments. Data reductions by EFA/CFA and CN are compared, as for the microscopic tool.

Also, placental three-dimensional shapes are mathematically characterized, in terms of both chorionic plate area and disk thickness, as resulting from a single "disturbance" (or a "single hit") and those with shapes that would require multiple "disturbances" ("multiple hits"), a recognized antecedent to poor outcome. Shapes are also analyzed in terms of the relative severity of "disturbances" required to generate achieved placental shapes. Because early (peri-implantation) placentas are thought to have a basic shape (discoid, centered about the umbilical cord insertion), abnormal shapes that result from maternal uteroplacental stressors or "disturbances" that deform normal uniform centripetal expansion are better able to be characterized.

Microscopic

For microscopic placental analysis, H&E slides from ALSPAC are digitized using an Aperio T3 instrument. Described above is a set of "model objects", the basic elements of the network language.

Example 10

Expanded Algorithms for Histology Items

The set of model objects are added to by including other histology features (e.g., characteristics of villous stroma, characteristics of placental vessel media) that distinguish among villous types and refine objects. Data set and macroscopic and microscopic methods are as described earlier. Additional histology features that are defined as a result of that refinement yield a large number of variables that can be expressed as raw values (e.g., villous cross sectional area) or in relative terms (e.g., capillary number per villous cross sectional area, syncytial knots per villi, etc.) Once verified, items are subjected to data reduction (EFA/CFA). Individual histology items and extracted factors are also tested for inclusion within a CN framework.

Histology Item and Network Verification

Verification is made that automatically generated histology items quantities accurately measure the tissue features, and that CN parameters accurately reflect distinctive histopathology types.

For quantitative immunostaining, automatically generated quantities of trophoblast, endothelial and stromal areas are compared against immunostained serial sections marking specific villous compartments (trophoblast via cytokeratin 8, endothelium via CD-31, and villous stroma via vimentin).

For immunostaining methods, placental tissue samples are fixed in 10% buffered formalin solution for 24 hours, transferred to 70% ethanol and dehydrated. The tissues are embedded in paraffin, and the blocks cut into 5 μm thick serial sections that are placed on charged slides, deparaffinized and rinsed. Target Retrieval Solution (DAKO) is used to optimize antigen binding. Immunostaining methods otherwise involve standard double-labeling developed with AEC chromogen to reveal the reaction product (a reddish deposit). The stained slides are digitized as above.

Quantitative Immunostained Image Analysis

For quantitative immunostained image analysis, an "Intensity Score" algorithm (Aperio Technologies, Vista, Calif.), a general-purpose method for quantitating immunostained slides, were set to detect the appropriate chromogen and counterstains. The algorithm segments the stained image pixels into categories (negative, weak positive, positive, and strong positive) according to intensity thresholds that can be adjusted by the pathologist, and calculates the total stained area ($mm^2$) and the percentages of that area belonging to each category. For all slides, three regions with different anatomy and histology, and gene expression are specified: the subchorionic, the basal, and the central regions of the chorionic disk. The percent area of immunostaining is measured for each type of immunostained preparation (CD-31, cytokeratin 8 and vimentin), and extracted. This method has been used successfully to quantitate villous endothelial % area in placentas containing different levels of arsenic. As a second quality assurance check, slides with values in the upper quartile have independent review of the markup image to visually confirm algorithm accuracy. These checks allow detection of outliers due to technical variability making these variables robust. H&E and immunostained quantified areas are compared and H&E algorithms refined until variance is <5%.

Pathologist Review

The algorithm assessments are compared against expert pathologist's histology feature scoring. While villous branching patterns are not reliably diagnosed by pathologist' review, many histology items are quantified by Ecognition algorithms (e.g., numbers of syncytial knots, changes in villous calibers or "distal villous hypoplasia) and scorings are thus compared. Various approaches, such as a histology item dictionary of photo-micrographs, a learning set of slides, and periodic centering and standard conditions of slide review improve scoring reliability. Histology items are scored according to their template based on previous publications and villous branching patterns are categorized in preparation for developing a CN that organizes the histology items according to the standard understanding of villous arborized structure. Algorithm classification and automated histology item quantitative measures are compared against pathologists' classifications and semiquantitative histology item scores. Algorithm-pathologist discrepancies are resolved by standard morphometric analysis of 40 random slide fields, and 15 fields selected to justify pathologist classification. Standard quantitative morphometry and pathologists' assessment are reviewed and the algorithm revised. Iterative revision ceases when classification kappa is >0.80, and CN and standard morphometry quantities have <10% variance.

Data Reduction by EFA/CFA

For EFA/CFA data reduction, the distributions of the macroscopic and microscopic item values or variables are reviewed with histograms and box plots to identify key distributional features (such as skewness or outliers) that might impact on the performance of inferential methods. ANOVA tests for significant differences in distributions of histology items across gestational age categories (preterm v. term) and maternal diseases and exposures (e.g., diabetes, preeclampsia, smoking). Nonlinearities, multicolinearity and intercorrelations are evaluated with cross tabulation and plots of bivariate relationships. Data transformation develops linear functions of associations between placental measurement items. In one random split half, EFA extracts latent variables that capture important facets of placental arborized structure. Alternate factor structures are compared using robust fit criteria. CFA tests the factor structures in the second random split half including assessment of potentially relevant obstetric mediators, effect modifiers, and/or confounders. Reliability of histology items and extracted factors are assessed using test-retest and alternate forms methods.

Data Reduction by Cognition Networks

The villous and histology item objects are organized into a "cognition network" that incorporates Kaufmann's model of the normal relationships among the levels of branches of the placental villous tree. This network describes the "semantic meaning" of objects in the network. Different villous types have different physiological roles (terminal villi as sites of nutrient and oxygen exchange, stem villi as sites of placental vascular resistance) and are laid down, like tree branches, at different times in pregnancy.

Within the total image, villi generated at different times in pregnancy, with different anatomic and physiologic attributes, are analyzed not only as individual objects (present status of algorithms) but also within their "neighborhood" context, in relation to their neighboring villi, also assigned specific anatomic and physiologic attributes. The objects within their neighborhoods are analyzed in terms of the normal hierarchy of arborization of the placental villous tree, from the surface placental chorionic vascular branches to the distal terminal villi. As an illustrative metaphor, these algorithms provide outputs that distinguish, for example, the branching structure of a maple tree from that of a willow tree. With over 7500 slides available in the ALSPAC sample, abundant resources are available to refine classification algorithms. As noted, extracted factors are also tested for inclusion in the CN, for the sake of model parsimony. The "manual" for the resulting tool is the algorithm sets that define the histology items and that place them within their "neighborhood" context. Thus, the tool can be applied to any digitalized slide set. An archive of slides from placentas of persons currently aged 45-55 years, and other data sets, is used to confirm generalizability of the approach, and to refine algorithms where needed to achieve that generalizability.

Example 11

Chronic Vascular "Fit", Cord Centrality, and Fetal Growth Restriction

The experiments described herein demonstrate that poor "fit" of the chorionic vessels to the chorionic plate area and asymmetric growth of vessels from the cord insertion are correlated with reduced fetal growth.

Figure 11:
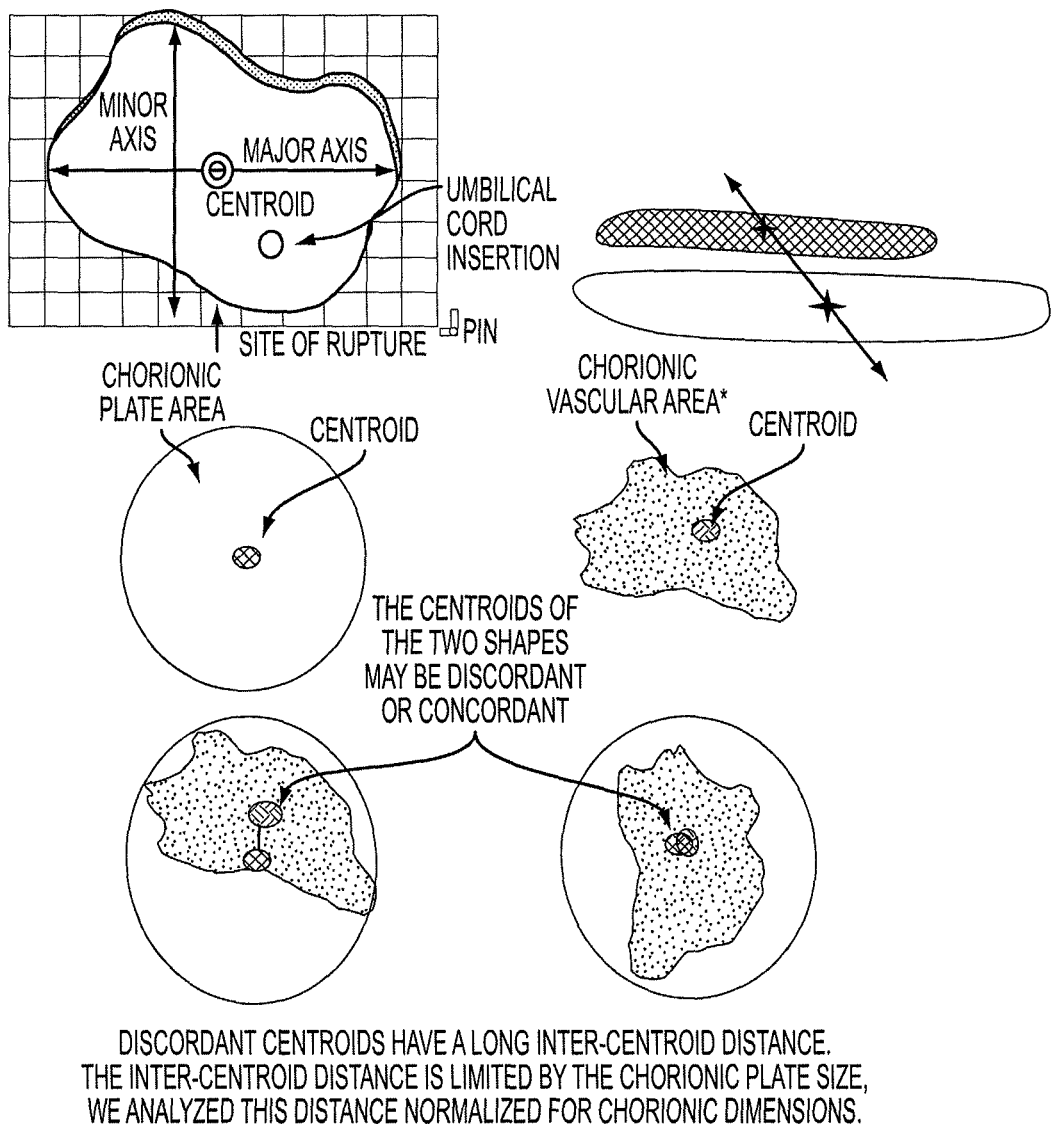
FIG. 11 is a series of schemas depicting determination of chorionic plate area and centroid, chorionic vascular area and centroid, and discordance or concordance of centroids.

Three hundred fourteen consecutive consenting mothers delivering singleton live-born infants had placentas collected, and digitally photographed and weighed. The perimeter of the chorionic disk was traced; cord insertion and the sites at which each chorionic vessel dived beneath the chorionic plate were marked (see e.g., FIG. 7). More specifically, a print of the photograph was placed on a Kurta Graphics tablet, overlaid with a transparent 1 cm grid. X,Y coordinates were captured at each intersection of the perimeter with the grid, and additionally at any points of inflection. Then a second set of mouse clicks marked the end points of all chorionic plate surface vessels. The two shapes were interpolated. The area and perimeter demarcated by the diving sites was calculated. An algorithm calculated areas, and the centroid, the weighted center of the area. The chorionic plate and the chorionic vascular area were essentially treated as a pair of shapes that should "fit." "Fit" is reflected in the distance between centroids. Dimensionless ratios of chorionic vascular area/perimeter and chorionic disk area/perimeter, distance between centroids of the inner and outer areas (inter-centroid distance), and distance from cord insertion to the disk area centroid (FIG. 11) were analyzed with regression, with $p<0.05$ significant. Observed/expected birthweight ratio (O/E BW) was calculated from national 50th centile standards adjusting for gestational age, race, gender and parity.

Results showed that each measure was associated with O/E BW ($\rho$area=0.17, $\rho$perimeter=0.18, $\rho$inter-centroid=−0.18, $\rho$cord-centroid=−0.14) (see Table 6). Reduced area and perimeter ratios as well as greater inter-centroid distance ($P<0.004$) were related to reduced placental weight. In multiple regression, intercentroid and cord-centroid distances) retained independent effects on O/E BW (p=0.015, p=0.04). In a multivariate regression, the novel ratio measures accounted for 17% of O/E BW variance (r=0.44). Only inter-centroid distance affected O/E BW independent of adjusted placental weight.

Figure 12A:
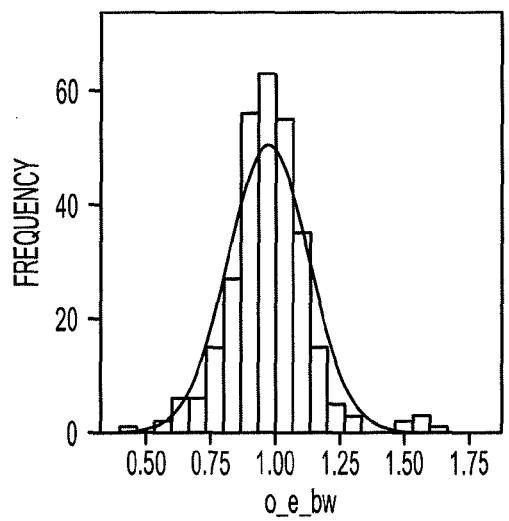
FIG. 12 is a series of histograms depicting the distribution of baby weight (12A), placental weight (12B) and inter-centroid distance normalized to chorionic plate area (12C).
Figure 12B:
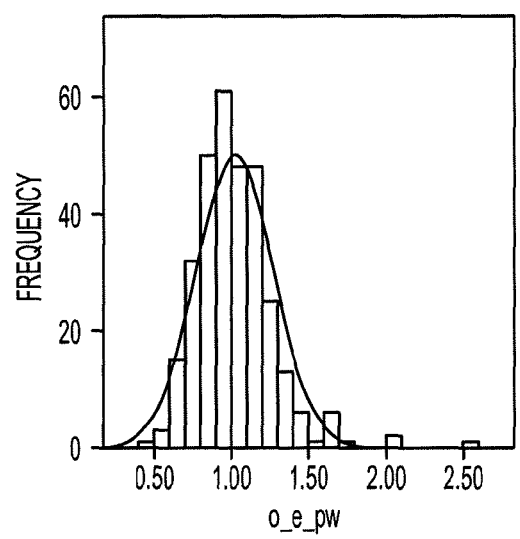
Figure 12C:
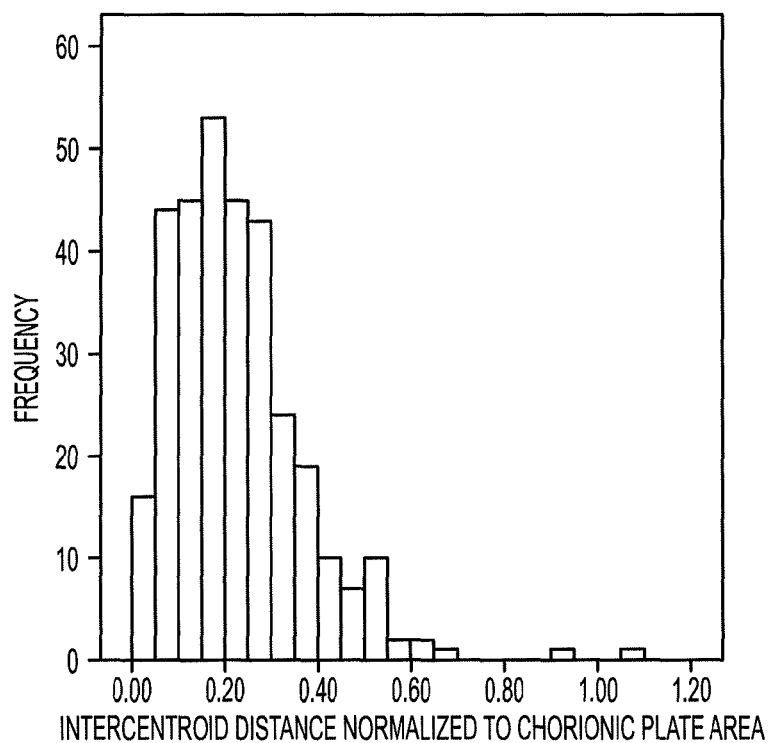
Figure 13A:
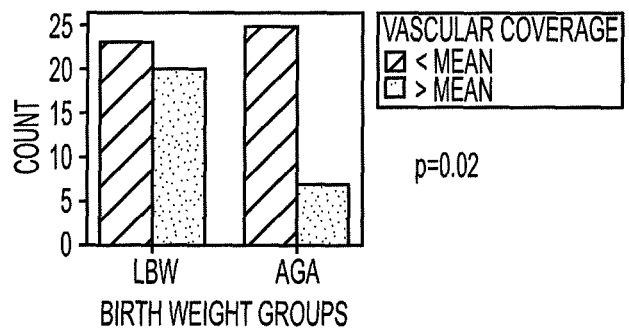
FIG. 13 is a traced chorionic plate vessels and birth weight scatterplot
Figure 13B:
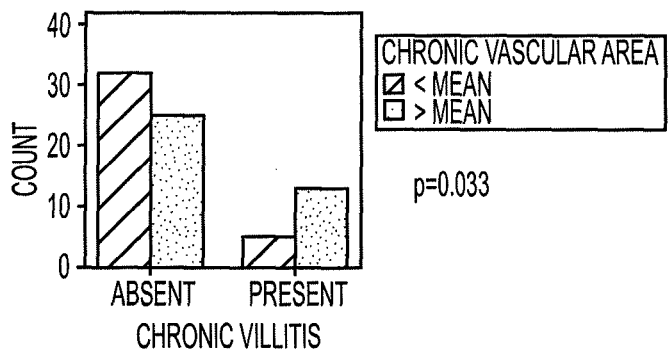
Figure 13C:
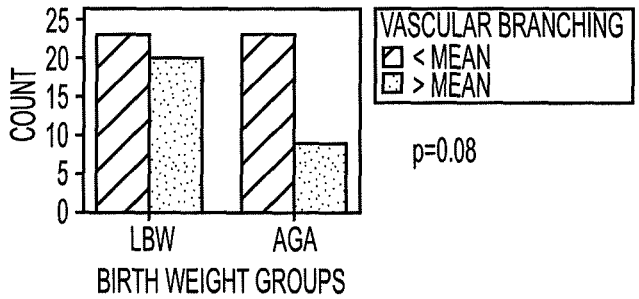
Figure 13D:
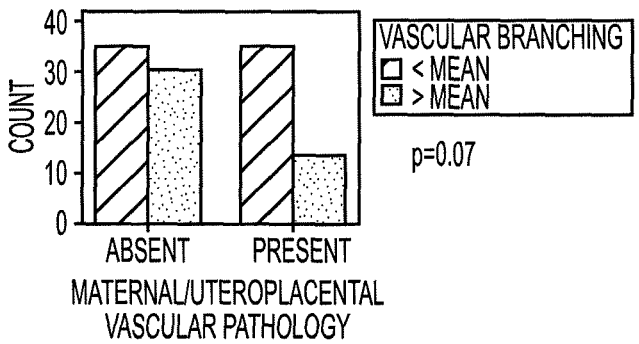
Figure 14A:
FIG. 14 is a set of figures of traced chorionic plate vessels comparing lush and sparse vascular distributions.
Figure 14A:
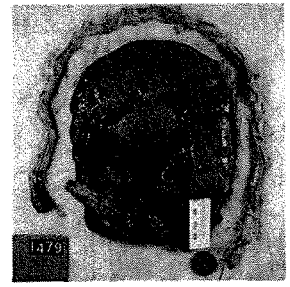
Figure 14B:
Figure 14B:
Figure 14C:
Figure 14C:
Figure 15A:
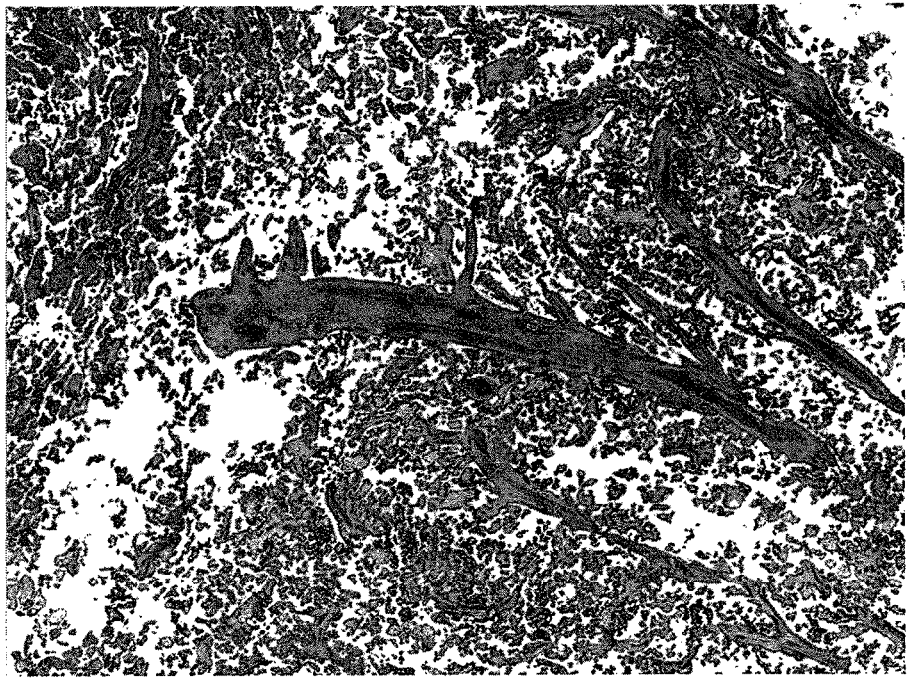
FIGS. 15A-15I show nine registered histology slides, demonstrating the capacity for the 3-D reconstruction of the placental finer villous tree.
Figure 15B:
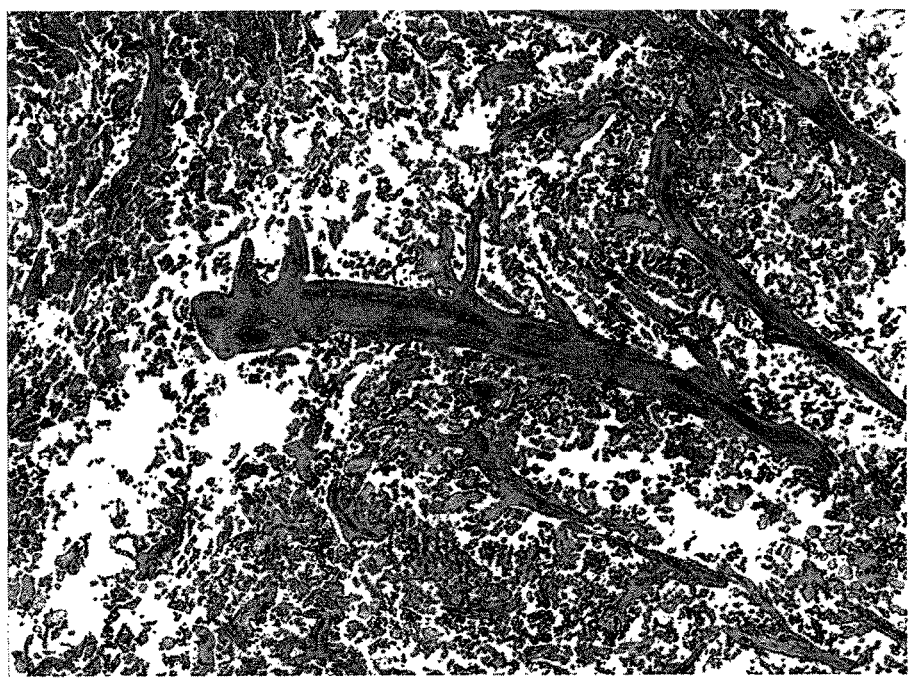
Figure 15C:
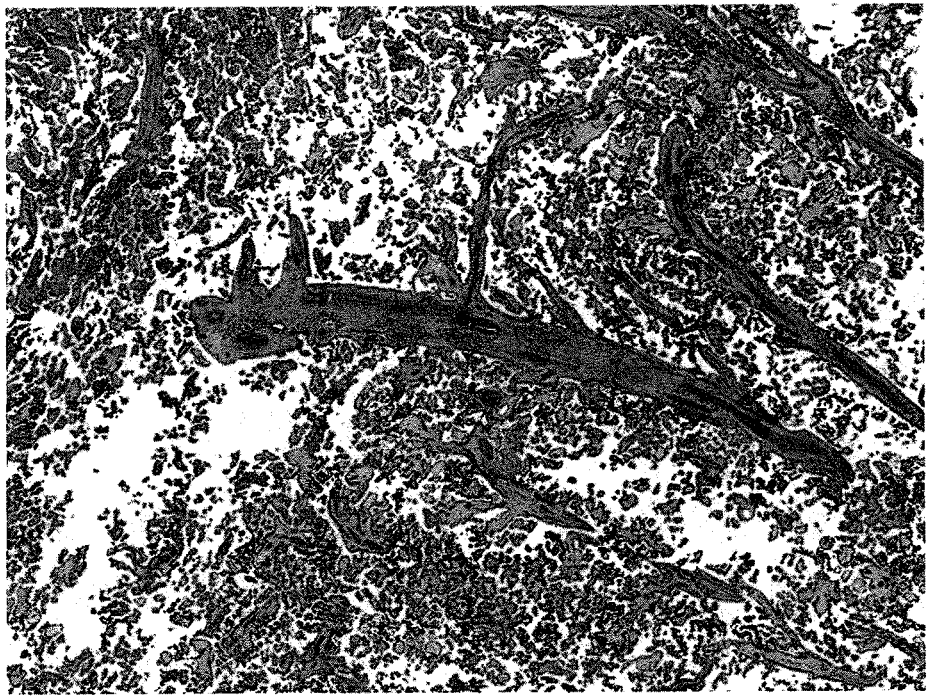
Figure 15D:
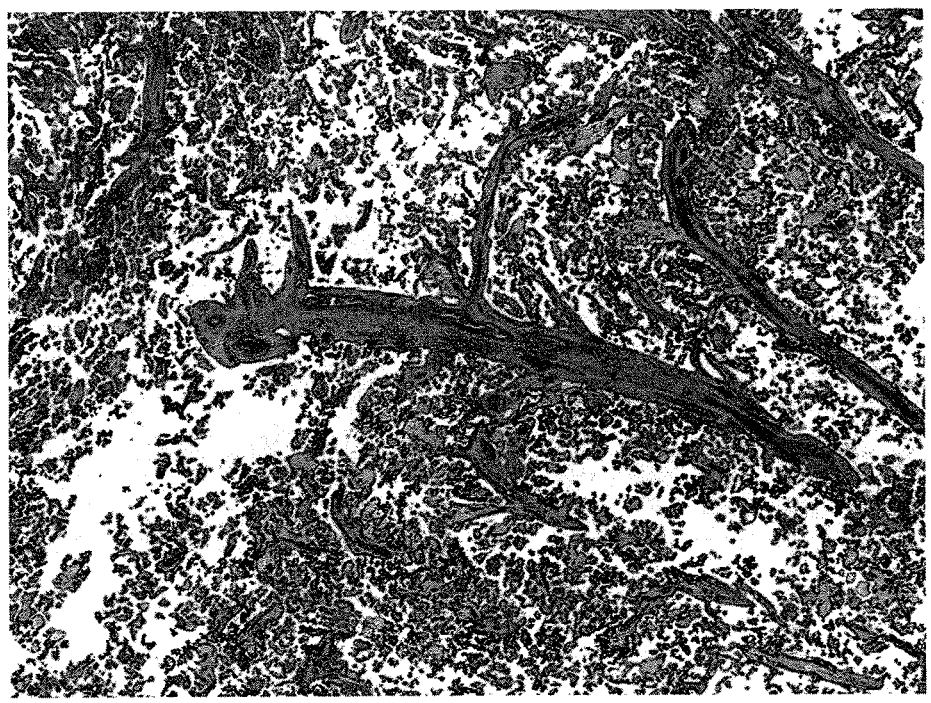
Figure 15E:
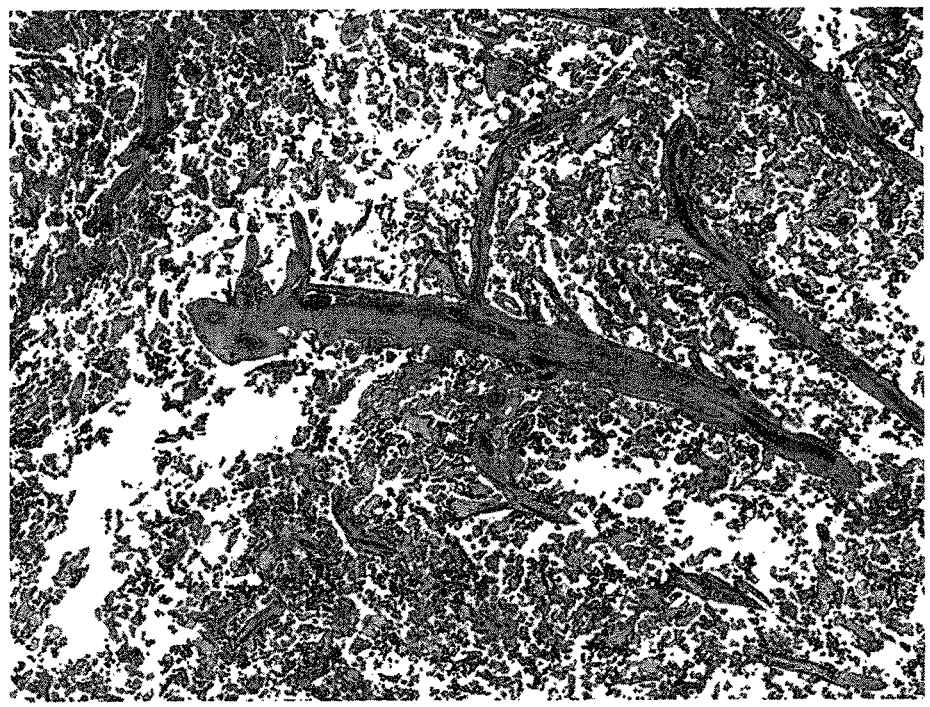
Figure 15F:
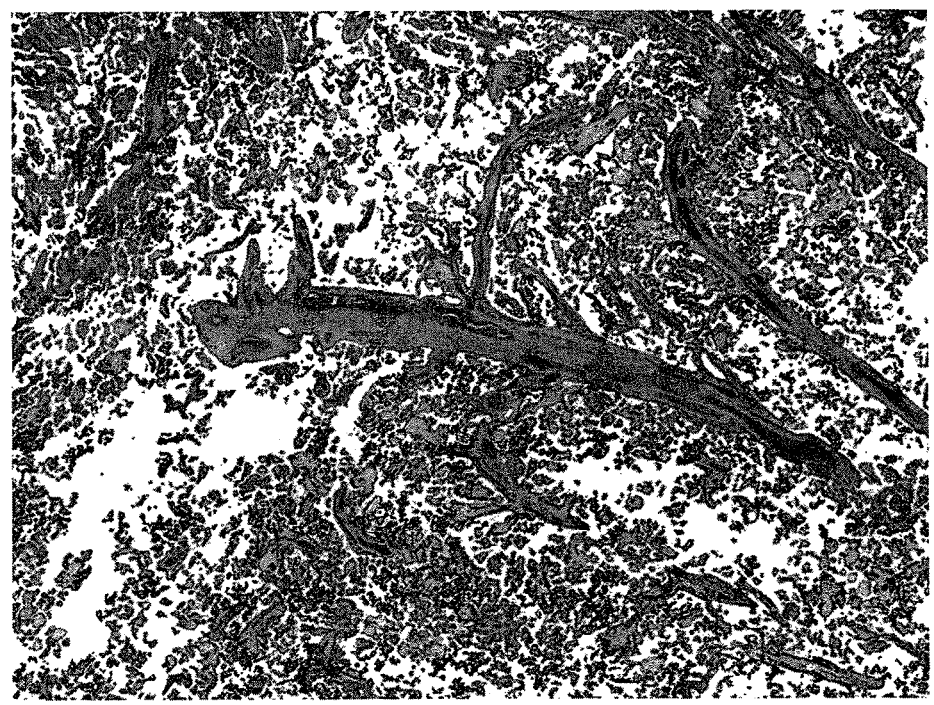
Figure 15G:
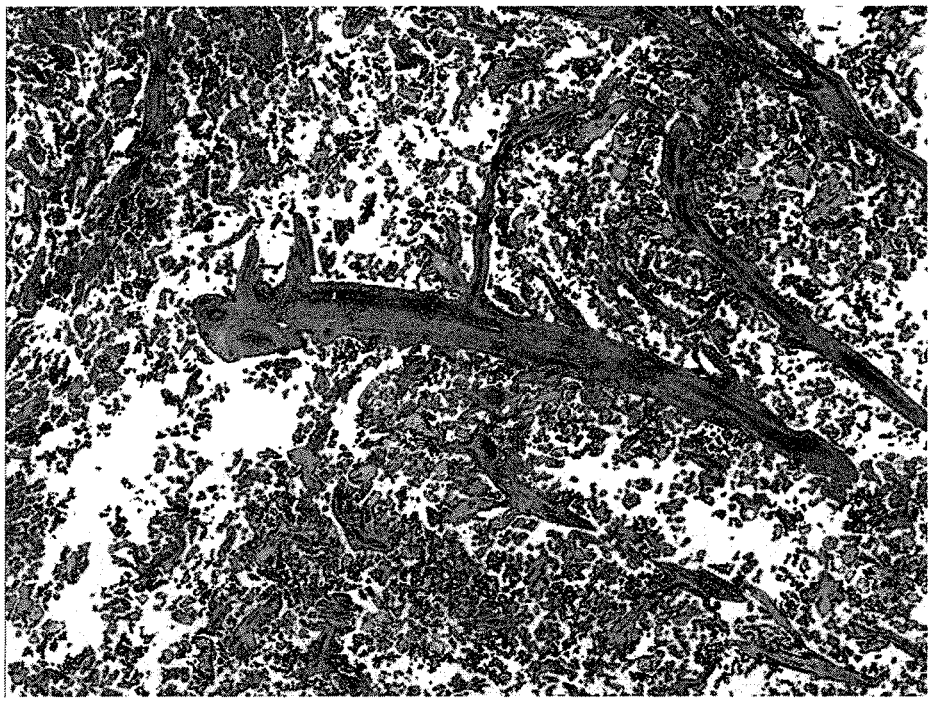
Figure 15H:
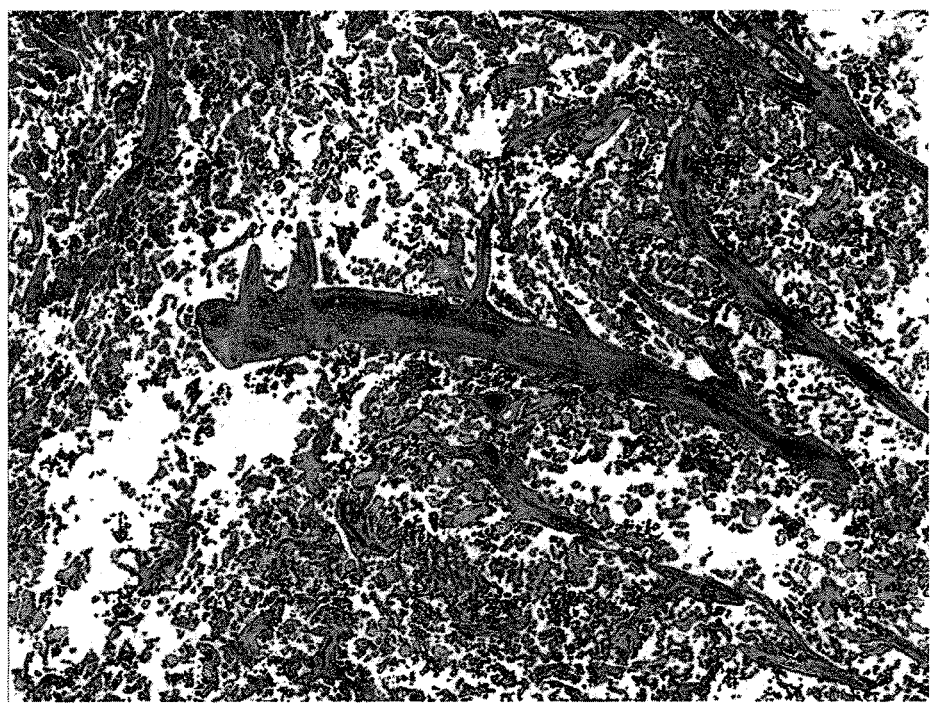
Figure 15I:
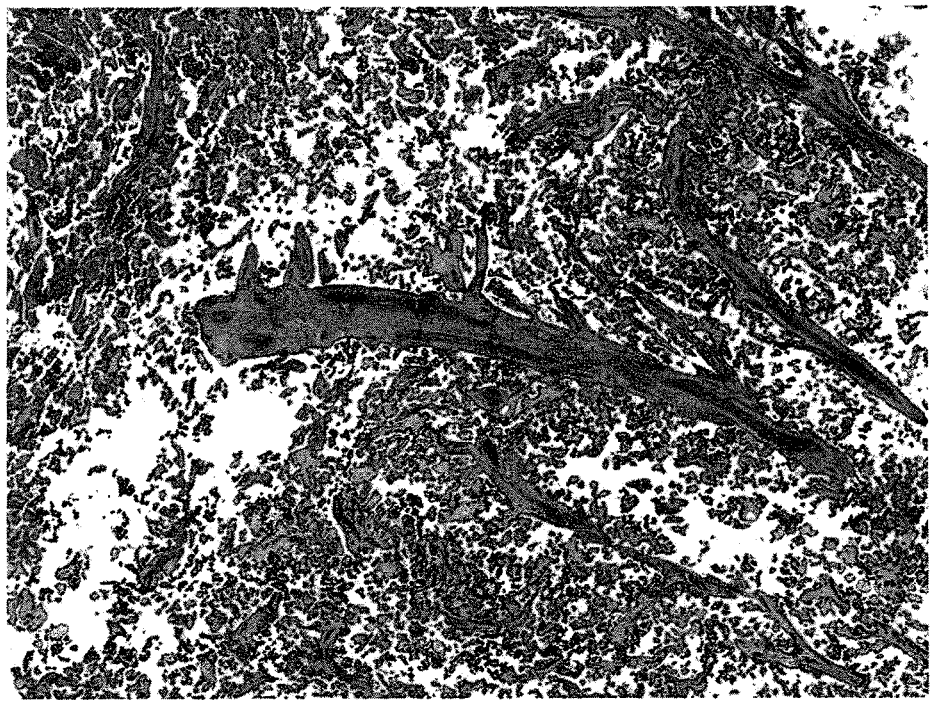
Figure 16A:
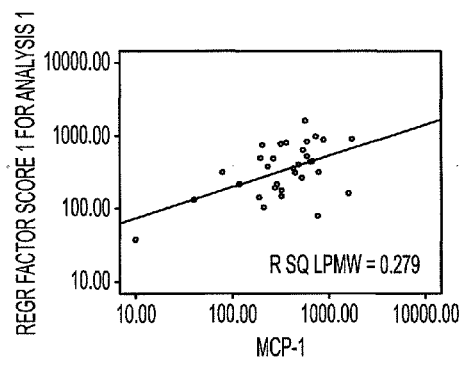
FIG. 16 shows high and low scores of cervical collagen intensity as image analyzed.
Figure 16B:
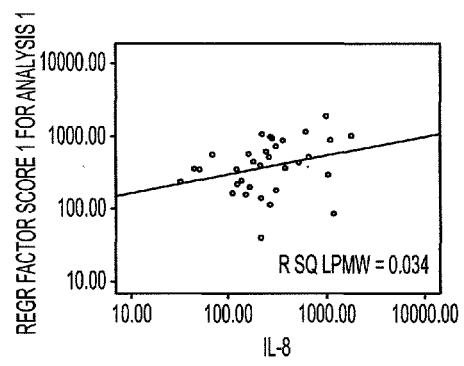
Figure 16C:
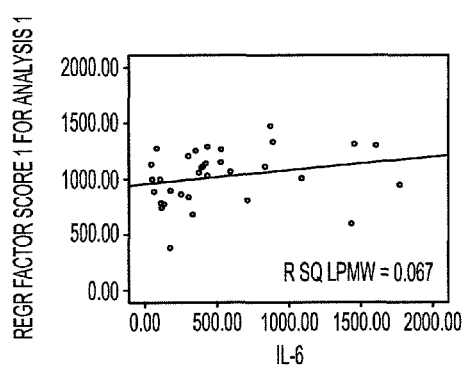
Figure 16D:
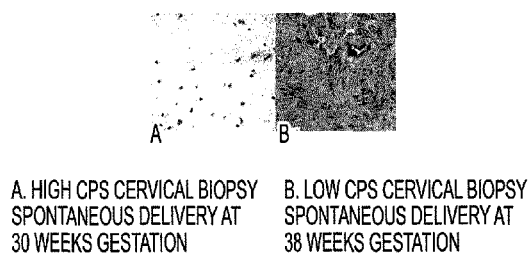

Area and perimeter ratios were normally distributed; inter-centroid and cord-centroid distances were skewed (see e.g., FIG. 12C). Each was transformed and tested in univariate and multivariate regression. Only the intercentroid distance ("in-intercent") affected O/E BW ratio independent of placental weight (see Table 7).

Chattanooga babies tended to be slightly smaller than expected (mean=0.98) (see e.g., FIG. 12A). Chattanooga placentas tended to be slightly larger than expected (mean=1.02) (see e.g., FIG. 12B).

TABLE 12

Distributions of Novel Chorionic Disk Measures and Ratios.
This data set was a consecutively collected series of singleton placentas of liveborn, non-anomalous infants born at Erlanger Hospital, Chattanooga, TN, July-August 2005.
The series was collected to explore environmental contributions to a LBW epidemic that has led to county-wide LBW rates of 14+%.
LBW rates were 17% in samples herein, with PTD rates of 11%.

| | Min | Max | Mean | SD |
|---|---|---|---|---|
| Chorionic plate area | 0.08 | 435.69 | 257.89 | 60.58 |
| Chorionic plate perimeter | 0.05 | 306.92 | 162.05 | 49.51 |
| Chorionic plate compactness | 0.53 | 0.99 | 0.93 | 0.06 |
| Chorionic plate standard deviation | 24.34 | 119.55 | 41.74 | 9.46 |
| Distance between chorionic vascular and chorionic plate centroids | 0.01 | 3.34 | 0.56 | 0.38 |
| Distance between chorionic vascular and chorionic plate centroids, normalized for scaling | 0 | 0.2 | 0.04 | 0.03 |
| Distance from cord insertion point to outer centroid | 0.04 | 17.82 | 3.61 | 2.29 |
| Distance between cord insertion point and outer centroid, normalized for scaling | 0.01 | 1.09 | 0.23 | 0.15 |
| Ratio of chorionic vascular and chorionic plate areas | 0.33 | 0.93 | 0.65 | 0.09 |
| Ratio of chorionic vascular area to chorionic vascular perimeter ("ruffling") | 0.13 | 16.6 | 0.37 | 0.93 |
| Ratio of chorionic plate area to chorionic plate perimeter ("ruffling") | 0.88 | 3.23 | 1.65 | 0.29 |
| Placental weight adjusted for gestational age | 248.84 | 920.83 | 465.56 | 104.1 |
| Birth weight adjusted for gestational age | 1783.4 | 5896.4 | 3052.4 | 474.4 |
| Observed/expected placental weight ratio | 0.47 | 2.58 | 1.02 | 0.25 |
| Observed/expected birth weight ratio | 0.55 | 1.61 | 0.98 | 0.15 |

TABLE 13

Regression: Dependent-Observed/Expected Birth weight ratio

|  | B | Std. Error | t | Sig. |
|---|---|---|---|---|
| (Constant) | .34 | .39 | .86 | .39 |
| Ratio of chorionic vascular area to chorionic vascular perimeter ("ruffling") | −.47 | .34 | −.87 | .39 |
| Ratio of chorionic plate area to chorionic plate perimeter ("ruffling") | .69 | .80 | .86 | .39 |
| Chorionic plate radius from centroid standard deviation | .00 | .00 | .82 | .42 |
| Chorionic vascular radius from centroid standard deviation | .00 | .00 | .94 | .35 |
| Distance between chorionic vascular and chorionic plate centroids | .33 | .14 | 2.35 | .02 |
| Distance between inner and outer centroids, normalized for scaling | −5.67 | 2.23 | −2.54 | .01 |
| Distance from cord insertion point to outer centroid | .07 | .03 | 2.43 | .02 |
| Distance between cord insertion point and outer centroid, normalized for scaling | −1.08 | .45 | −2.37 | .02 |
| Chorionic plate area compactness | .34 | .25 | 1.39 | .17 |
| Chorionic vascular area compactness | −.01 | .16 | −.05 | .96 |

TABLE 14

Regression: Dependent-O/E BW ratio, Ln transformed predictors

| Model |  | B | Std. Error | t | Sig. |
|---|---|---|---|---|---|
| 1 | (Constant) | .464 | .059 | 7.807 | .000 |
|  | Inintercent | −.045 | .016 | −2.826 | .005 |
|  | Incordcent | −.013 | .012 | −1.089 | .277 |
|  | o_e_pw | .341 | .033 | 10.181 | .000 |

Thus, variations in O/E BW for a given placental weight can be explained, at least in part, by subtle alterations in the relationships among placental parameters (e.g., cord insertion, chorionic vessel growth and chorionic disk expansion). Asymmetric growth of chorionic vasculature relative to the underlying chorionic disk results in a relatively inefficient placenta that produces a smaller-than-expected infant.

FIG. 13 is a traced chorionic plate vessels and birth weight scatterplot. As shown, more LBW had poor vascular coverage (greater distance from any chorionic surface pixel to the nearest vessel), while more chronic vilitis cases had increased chorionic vascular area (area>mean). Both LBW and "maternal/uteroplacental vascular pathology present" trended to having more cases with poorer branching efficiency (greater distance to the nearest vessel given the chorionic vascular area, p=0.08 and p=0.07).

FIG. 14 is a set of figures of traced chorionic plate vessels comparing lush and sparse vascular distributions. Shown are (top row, left to right), lowest and highest vascular coverage scores ($D_{surface\ pixel\ to\ the\ nearest\ vessel}$/diameter), (middle row, left to right) lowest and highest chorionic vascular area and (bottom row, left to right) lowest and highest branching scores (vascular coverage×vascular area).

FIGS. 15A-15I show nine registered histology slides, demonstrating the capacity for the 3-D reconstruction of the placental finer villous tree.

FIG. 16 shows high and low scores of cervical collagen intensity as image analyzed.

Figure 17:
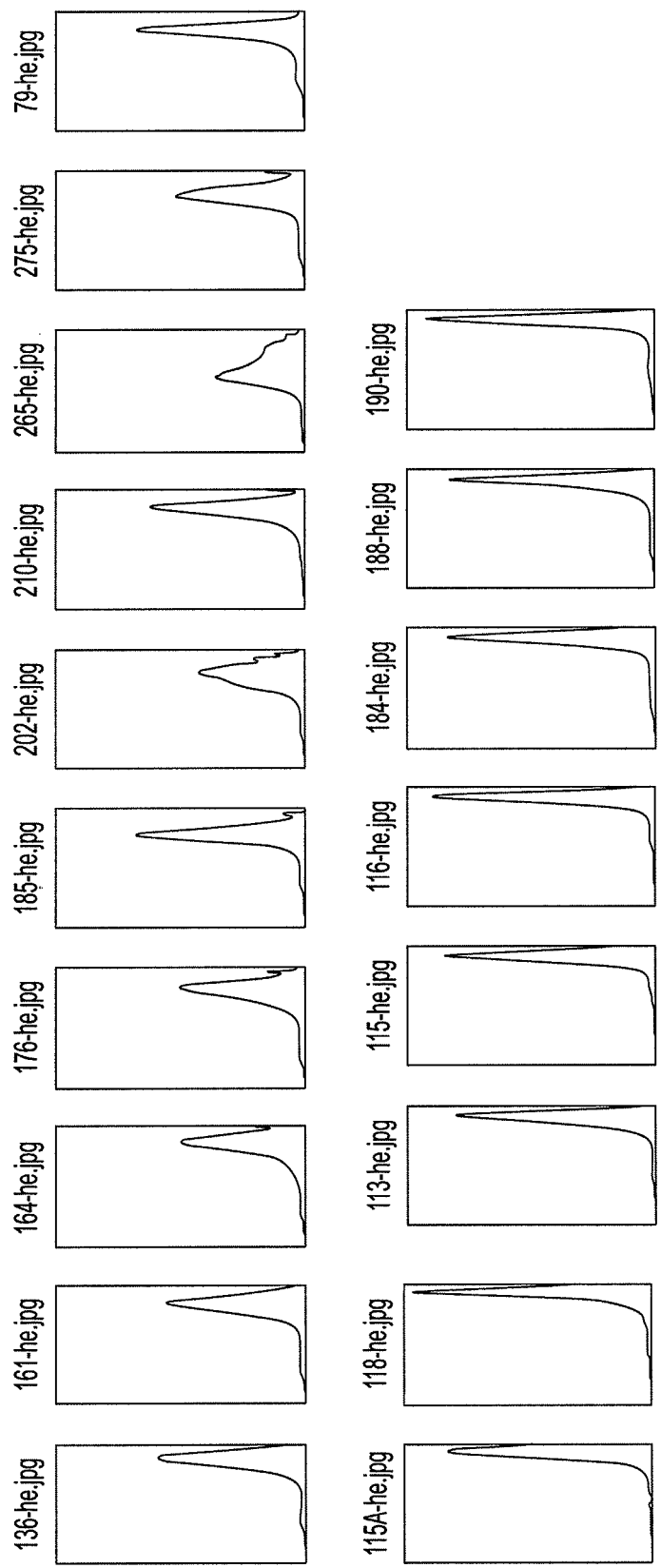
FIG. 17 shows examples of histograms of R channel intensities that correlate with collagen integrity in cervical biopsies.
Figure 18A:
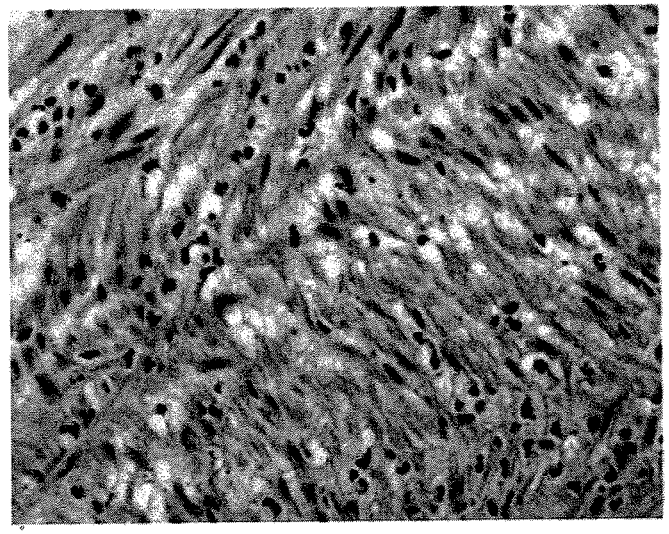
FIG. 18 outlines the computational analyses of placental images for neutrophil (as an example) segmentation and quantification.
Figure 18A:
Figure 18A:
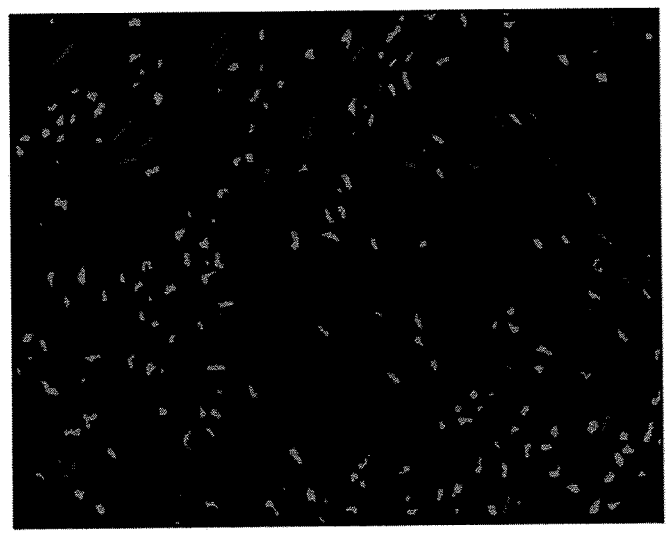
Figure 18A:
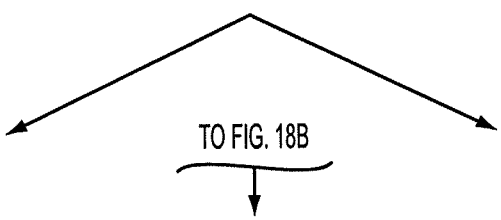
Figure 18B:
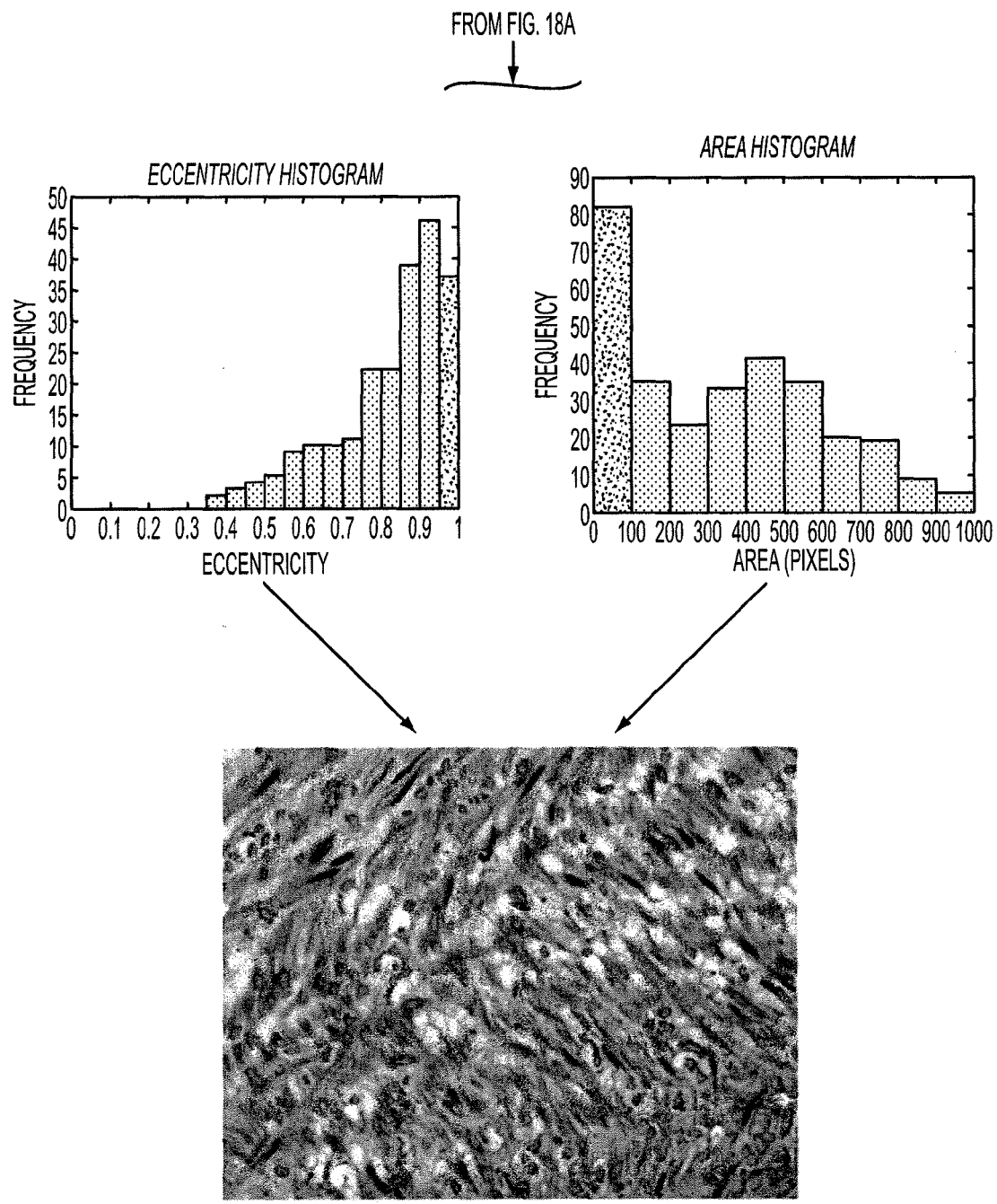

FIG. 17 shows examples of histograms of R channel intensities that correlate with collagen integrity in cervical biopsies.

FIG. 18 outlines the computational analyses of placental images for neutrophil (as an example) segmentation and quantification. Shown are the original slide image, the segmentation of the original slide image, the computation of geometric properties (eccentricity histogram and area histogram) and filtering to remove shapes representing non-neutrophil nuclei based on eccentricity and area constraints.

Figure 19:
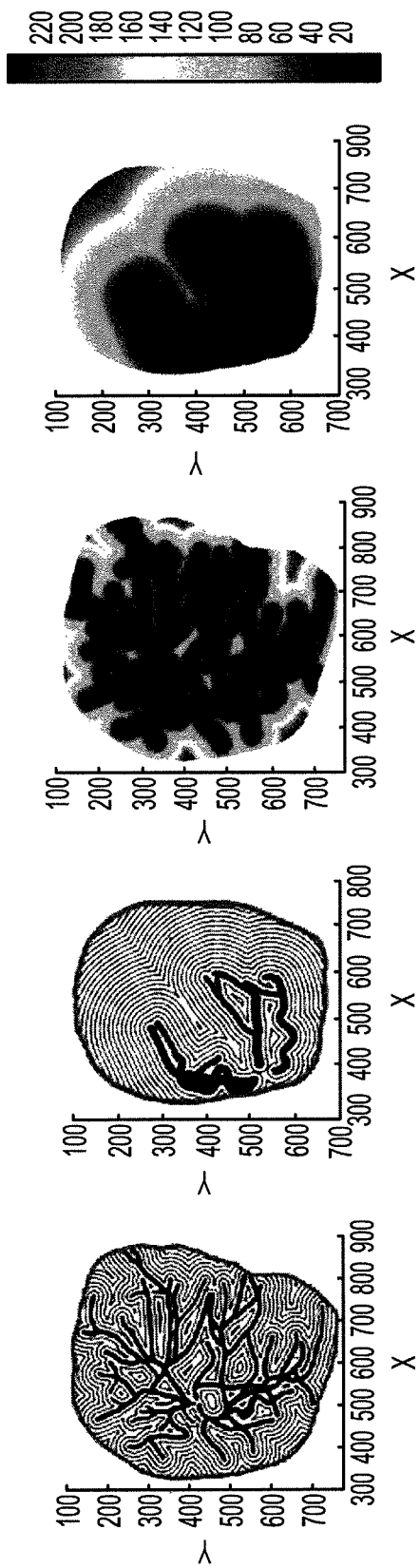
FIG. 19 shows examples of the image segmentation used in quantifying chronic surface vascular metrics.

FIG. 19 shows examples of the image segmentation used in quantifying chronic surface vascular metrics.

Figure 20B:
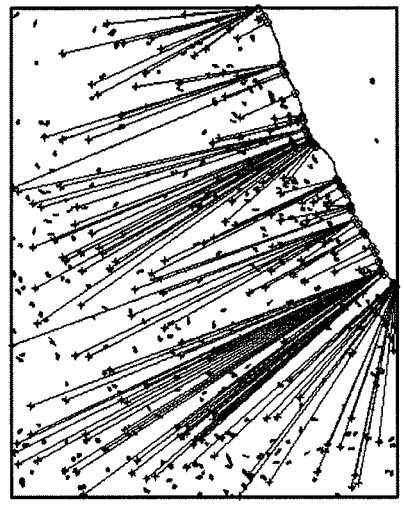
FIGS. 20A-20C show an example of quantification of neutrophil migration from, as an example, a fetal chorionic vessel lumen.
Figure 20A:
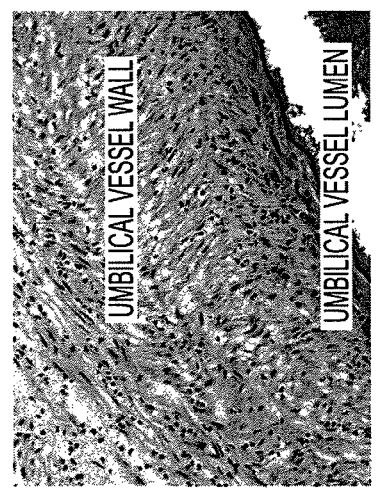
Figure 20C:
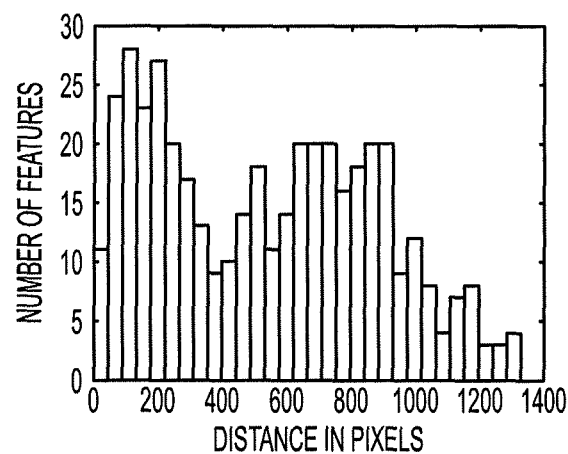

FIGS. 20A-20C show an example of quantification of neutrophil migration from, as an example, a fetal chorionic vessel lumen. FIG. 20A shows the original image with marking. FIG. 20B shows distances to identified to features after filtering (40% of distance lines shown). FIG. 20C shows a histogram of the distances.

Figure 21:
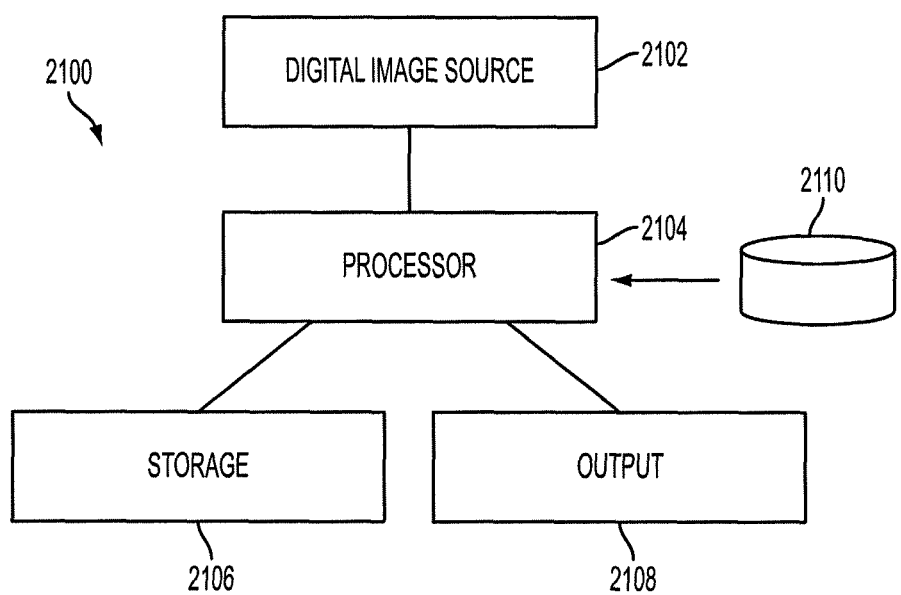
FIG. 21 is a schematic diagram of an exemplary hardware system on which the preferred or other embodiments can be implemented.

FIG. 21 is a schematic diagram of an exemplary hardware system 2100 on which the preferred or other embodiments can be implemented. As explained above, the digital image source 2102 can be a digital camera, a slide digitizer, or any other suitable source. The processor 2104 performs the operations disclosed above and can output the resulting data to a persistent storage medium (e.g., hard drive) 2106 or an output 2108, which can include one or more of a printer, a display, a communication device for remotely transmitting the data, or any other suitable output device. Software for performing the above can be provided on any suitable medium 2110.

While preferred embodiments have been set forth in detail above, those skilled in the art who have reviewed the present disclosure will readily appreciate that other embodiments can be realized within the scope of the present invention. For example, numerical values are illustrative rather than limiting, as are disclosures of specific hardware devices. Therefore, the present invention should be construed as limited only by the appended claims.

APPENDIX

Literature Cited

1. Benirschke K, K. P., *Architecture of Normal Villous Trees, Chapter 7*, in *Pathology of the Human Placenta*. 2002, Springer Verlag: New York, N.Y. p. 116-154.
2. Kaufmann, P., T. M. Mayhew, and D. S. Charnock-Jones, Aspects of human fetoplacental vasculogenesis and angiogenesis. II. Changes during normal pregnancy. Placenta, 2004. 25(2-3): p. 114-26.
3. Demir, R., et al., Classification of human placental stem villi: review of structural and functional aspects. Microsc Res Tech, 1997. 38(1-2): p. 29-41.
4. Kosanke, G., et al., Branching patterns of human placental villous trees: perspectives of topological analysis. Placenta, 1993. 14(5): p. 591-604.
5. Kaufmann, P., D. K. Sen, and G. Schweikhart, *Classification of human placental villi. I. Histology*. Cell Tissue Res, 1979. 200(3): p. 409-23.

6. Kingdom, J., et al., *Development of the placental villous tree and its consequences for fetal growth*. Eur J Obstet Gynecol Reprod Biol, 2000. 92(1): p. 35-43.
7. Charnock-Jones, D. S., P. Kaufmann, and T. M. Mayhew, *Aspects of human fetoplacental vasculogenesis and angiogenesis. I. Molecular regulation*. Placenta, 2004. 25(2-3): p. 103-13.
8. Mayhew, T. M., D. S. Charnock-Jones, and P. Kaufmann, Aspects of human fetoplacental vasculogenesis and angiogenesis. III. Changes in complicated pregnancies. Placenta, 2004. 25(2-3): p. 127-39.
9. Demir, R., et al., *Fetal vasculogenesis and angiogenesis in human placental villi*. Acta Anat (Base1), 1989. 136(3): p. 190-203.
10. Benirschke K, K. P., Basic Structure of the Villous Trees (Chapter 6), in The Pathology of the Placenta. 2002, Springer-Verlag: New York. p. 50-115.
11. Benirschke K, K. P., *Angioarchitecture of Villi, in The Pathology of the Placenta*. 2002, Springer-Verlag: New York. p. 134-140.
12. Grether, J. K., et al., *Reliability of placental histology using archived specimens*. Paediatr Perinat Epidemiol, 1999. 13(4): p. 489-95.
13. Khong, T. Y., et al., Observer reliability in assessing placental maturity by histology. J Clin Pathol, 1995. 48(5): p. 420-3.
14. Khong, T. Y., *Placental vascular development and neonatal outcome*. Semin Neonatol, 2004. 9(4): p. 255-63.
15. Jaddoe, V. W. and J. C. Witteman, Hypotheses on the fetal origins of adult diseases: contributions of epidemiological studies. Eur J Epidemiol, 2006. 21(2): p. 91-102.
16. DE Boo, H. and J. E. Harding, *The developmental origins of adult disease (Barker) hypothesis*. Aust N Z J Obstet Gynaecol, 2006. 46(1): p. 4-14.
17. Barker, D. J., *The developmental origins of insulin resistance*. Horm Res, 2005. 64 Suppl 3: p. 2-7.
18. Levitt, N. S. and E. V. Lambert, *The foetal origins of the metabolic syndrome—a South African perspective*. Cardiovasc J S Afr, 2002. 13(4): p. 179-80.
19. Barker, D. J., *The fetal origins of type 2 diabetes mellitus*. Ann Intern Med, 1999. 130(4 Pt 1): p. 322-4.
20. Adair, L. and D. Dahly, *Developmental determinants of blood pressure in adults*. Annu Rev Nutr, 2005. 25: p. 407-34.
21. Levitt, N. S., et al., Adult BMI and fat distribution but not height amplify the effect of low birthweight on insulin resistance and increased blood pressure in 20-year-old South Africans. Diabetologia, 2005. 48(6): p. 1118-25.
22. Levitt, N. S., et al., An inverse relation between blood pressure and birth weight among 5 year old children from Soweto, South Africa. J Epidemiol Community Health, 1999. 53(5): p. 264-8.
23. Barker, D. J., C. Osmond, and C. M. Law, *The intrauterine and early postnatal origins of cardiovascular disease and chronic bronchitis*. J Epidemiol Community Health, 1989. 43(3): p. 237-40.
24. Barker, D. J. and C. N. Martyn, *The maternal and fetal origins of cardiovascular disease*. J Epidemiol Community Health, 1992. 46(1): p. 8-11.
25. Tanis, B. C., et al., Dutch women with a low birth weight have an increased risk of myocardial infarction later in life: a case control study. Reprod Health, 2005. 2(1): p. 1.
26. Rich-Edwards, J. W., et al., Longitudinal study of birth weight and adult body mass index in predicting risk of coronary heart disease and stroke in women. Bmj, 2005. 330(7500): p. 1115.
27. Lawlor, D. A., et al., Birth weight is inversely associated with incident coronary heart disease and stroke among individuals born in the 1950s: findings from the Aberdeen Children of the 1950s prospective cohort study. Circulation, 2005. 112(10): p. 1414-8.
28. Cooper, C., et al., Review: developmental origins of osteoporotic fracture. Osteoporos Int, 2005.
29. Gluckman, P. D., et al., Life-long echoes—a critical analysis of the developmental origins of adult disease model. Biol Neonate, 2005. 87(2): p. 127-39.
30. Jasienska, G., et al., High ponderal index at birth predicts high estradiol levels in adult women. Am J Hum Biol, 2006. 18(1): p. 133-40.
31. Lagiou, P., et al., Diet during pregnancy and levels of maternal pregnancy hormones in relation to the risk of breast cancer in the offspring. Eur J Cancer Prev, 2006. 15(1): p. 20-6.
32. Lagiou, P., et al., Maternal height, pregnancy estriol and birth weight in reference to breast cancer risk in Boston and Shanghai. Int J Cancer, 2005. 117(3): p. 494-8.
33. Baik, I., et al., Association of fetal hormone levels with stem cell potential: evidence for early life roots of human cancer. Cancer Res, 2005. 65(1): p. 358-63.
34. Lagiou, P., et al., Birthweight differences between USA and China and their relevance to breast cancer etiology. Int J Epidemiol, 2003. 32(2): p. 193-8.
35. Nilsen, T. I., et al., Birth size and subsequent risk for prostate cancer: a prospective population-based study in Norway. Int J Cancer, 2005. 113(6): p. 1002-4.
36. Asbury, K., J. F. Dunn, and R. Plomin, Birthweight-discordance and differences in early parenting relate to monozygotic twin differences in behavior problems and academic achievement at age 7. Dev Sci, 2006. 9(2): p. F22-F31.
37. Bellingham-Young, D. A. and E. N. Adamson-Macedo, *Prematurity and adult minor illness*. Neuro Endocrinol Lett, 2004. 25 Suppl 1: p. 117-25.
38. Nilsson, E., et al., *Fetal growth restriction and schizophrenia: a Swedish twin study*. Twin Res Hum Genet, 2005. 8(4): p. 402-8.
39. Gunnell, D., et al., The association of fetal and childhood growth with risk of schizophrenia. Cohort study of 720,000 Swedish men and women. Schizophr Res, 2005. 79(2-3): p. 315-22.
40. Willinger, U., et al., Neurodevelopmental schizophrenia: obstetric complications, birth weight, premorbid social withdrawal and learning disabilities. Neuropsychobiology, 2001. 43(3): p. 163-9.
41. Talbert, D. G., Uterine flow velocity waveform shape as an indicator of maternal and placental development failure mechanisms: a model-based synthesizing approach. Ultrasound Obstet Gynecol, 1995. 6(4): p. 261-71.
42. Naeye, R., Disorders of the Placenta and Decidua, in Disorders of the Placenta, Fetus and Neonata. 1992, Mosby Year Book: Philadelphia, Pa. p. 129-134.
43. Benirschke K, K. P., *Placental Shape Aberrations, Chapter 13, in Pathology of the Human Placenta*. 2002, Springer Verlag: New York, N.Y. p. 401-404.
44. Naeye, R., Disorders of the Placenta and Decidua, in Disorders of the Placenta, Fetus and Neonata. 1992, Mosby Year Book: Philadelphia, Pa. p. 129-130.
45. Benirschke K, K. P., *Classification of Villous Maldevelopment, Chapter 15, in Pathology of the Human Placenta*. 2002, Springer Verlag: New York, N.Y. p. 437-460.
46. Kaufmann, P., et al., Cross-sectional features and three-dimensional structure of human placental villi. Placenta, 1987. 8(3): p. 235-47.

47. Schweikhart, G., P. Kaufmann, and T. Beck, *Morphology of placental villi after premature delivery and its clinical relevance*. Arch Gynecol, 1986. 239(2): p. 101-14.
48. Larsen, L. G., H. V. Clausen, and L. Jonsson, *Stereologic examination of placentas from mothers who smoke during pregnancy*. Am J Obstet Gynecol, 2002. 186(3): p. 531-7.
49. Mayhew, T. M., Changes in fetal capillaries during preplacental hypoxia: growth, shape remodelling and villous capillarization in placenta from high-altitude pregnancies. Placenta, 2003. 24(2-3): p. 191-8.
50. Reshetnikova, O. S., G. J. Burton, and O. V. Teleshova, Placental histomorphometry and morphometric diffusing capacity of the villous membrane in pregnancies complicated by maternal iron-deficiency anemia. Am J Obstet Gynecol, 1995. 173(3 Pt 1): p. 724-7.
51. Vickers, M. H., et al., Fetal origins of hyperphagia, obesity, and hypertension and postnatal amplification by hypercaloric nutrition. Am J Physiol Endocrinol Metab, 2000. 279(1): p. E83-7.
52. Stocker, C. J., J. R. Arch, and M. A. Cawthorne, *Fetal origins of insulin resistance and obesity*. Proc Nutr Soc, 2005. 64(2): p. 143-51.
53. McMillen, I. C., C. L. Adam, and B. S. Muhlhausler, *Early origins of obesity: programming the appetite regulatory system*. J Physiol, 2005. 565(Pt 1): p. 9-17.
54. Armitage, J. A., P. D. Taylor, and L. Poston, Experimental models of developmental programming: consequences of exposure to an energy rich diet during development. J Physiol, 2005. 565(Pt 1): p. 3-8.
55. Longo, M., et al., Fetal origins of adult vascular dysfunction in mice lacking endothelial nitric oxide synthase. Am J Physiol Regul Integr Comp Physiol, 2005. 288(5): p. R1114-21.
56. Horton, T. H., Fetal origins of developmental plasticity: animal models of induced life history variation. Am J Hum Biol, 2005. 17(1): p. 34-43.
57. Bertram, C. E. and M. A. Hanson, *Prenatal programming of postnatal endocrine responses by glucocorticoids*. Reproduction, 2002. 124(4): p. 459-67.
58. Green, L. R., Programming of endocrine mechanisms of cardiovascular control and growth. J Soc Gynecol Investig, 2001. 8(2): p. 57-68.
59. McMillen, I. C. and J. S. Robinson, Developmental origins of the metabolic syndrome: prediction, plasticity, and programming. Physiol Rev, 2005. 85(2): p. 571-633.
60. Wu, G., et al., *Maternal nutrition and fetal development*. J Nutr, 2004. 134(9): p. 2169-72.
61. Pham, T. D., et al., Uteroplacental insufficiency increases apoptosis and alters p53 gene methylation in the full-term IUGR rat kidney. Am J Physiol Regul Integr Comp Physiol, 2003. 285(5): p. R962-70.
62. Seckl, J. R., Glucocorticoids, feto-placental 11 beta-hydroxysteroid dehydrogenase type 2, and the early life origins of adult disease. Steroids, 1997. 62(1): p. 89-94.
63. Sibley, C. P., et al., *Placental phenotypes of intrauterine growth*. Pediatr Res, 2005. 58(5): p. 827-32.
64. Randhawa, R. and P. Cohen, *The role of the insulin-like growth factor system in prenatal growth*. Mol Genet Metab, 2005. 86(1-2): p. 84-90.
65. Wallace, J. M., et al., Nutritionally mediated placental growth restriction in the growing adolescent: consequences for the fetus. Biol Reprod, 2004. 71(4): p. 1055-62.
66. Baschat, A. A. and K. Hecher, *Fetal growth restriction due to placental disease*. Semin Perinatol, 2004. 28(1): p. 67-80.
67. Resnik, R., *Intrauterine growth restriction*. Obstet Gynecol, 2002. 99(3): p. 490-6.
68. Morley, R., *Fetal origins of adult disease*. Semin Fetal Neonatal Med., 2006. 11(2): p. 73-78.
69. Lockwood, C. J., The diagnosis of preterm labor and the prediction of preterm delivery. Clin Obstet Gynecol, 1995. 38(4): p. 675-87.
70. Metzger, R. J. and M. A. Krasnow, *Genetic control of branching morphogenesis*. Science, 1999. 284(5420): p. 1635-9.
71. Yevtodiyenko, A. and J. V. Schmidt, Dlk1 expression marks developing endothelium and sites of branching morphogenesis in the mouse embryo and placenta. Dev Dyn, 2006.
72. le Noble, F., et al., Control of arterial branching morphogenesis in embryogenesis: go with the flow. Cardiovasc Res, 2005. 65(3): p. 619-28.
73. Warburton, D., et al., Molecular mechanisms of early lung specification and branching morphogenesis. Pediatr Res, 2005. 57(5 Pt 2): p. 26R-37R.
74. Hu, M. C. and N. D. Rosenblum, Genetic regulation of branching morphogenesis: lessons learned from loss-of-function phenotypes. Pediatr Res, 2003. 54(4): p. 433-8.
75. Ingelfinger, J. R. and L. L. Woods, *Perinatal programming, renal development, and adult renal function*. Am J Hypertens, 2002. 15(2 Pt 2): p. 46S-49S.
76. Miettinen, P. J., Epidermal growth factor receptor in mice and men—any applications to clinical practice? Ann Med, 1997. 29(6): p. 531-4.
77. Miettinen, P. J., et al., Epithelial immaturity and multiorgan failure in mice lacking epidermal growth factor receptor. Nature, 1995. 376(6538): p. 337-41.
78. Grenander, U., *General Pattern Theory*. 1993, Oxford, UK: Clarendon Press.
79. Amit, Y., Grenander, U. Piccioni, M., *Structural image restoration through deformable templates*. Journal of the American Statistical Association, 1991. 86: p. 376-387.
80. Grizzi, F. F., B. Chiriva-Internati, M. Muzzio, P-C, Estimate of Neovascular Tree Complexity by Microscopy Analysis, in Current Issues on Multidisciplinary Microscopy Research and Education. 2005, FORMATEX. p. 140-149.
81. Giles, J., *Benoit Mandelbrot: father of fractals*. Nature, 2004. 432(7015): p. 266-7.
82. Meisel, L. V., *Generalized Mandelbrot rule for fractal sections*. Physical Review. A, 1992. 45(2): p. 654-656.
83. Keipes, M., F. Ries, and M. Dicato, *Of the British coastline and the interest of fractals in medicine*. Biomed Pharmacother, 1993. 47(9): p. 409-15.
84. Porter, R., et al., A fractal analysis of pyramidal neurons in mammalian motor cortex. Neurosci Lett, 1991. 130(1): p. 112-6.
85. Mayhew, T. M., et al., Stereological investigation of placental morphology in pregnancies complicated by pre-eclampsia with and without intrauterine growth restriction. Placenta, 2003. 24(2-3): p. 219-26.
86. Byrne, B. M., Factor analytic models: viewing the structure of an assessment instrument from three perspectives. J Pers Assess, 2005. 85(1): p. 17-32.
87. Coste, J., et al., Methodological issues in determining the dimensionality of composite health measures using principal component analysis: case illustration and suggestions for practice. Qual Life Res, 2005. 14(3): p. 641-54.
88. Bentler, P. M. and J. A. Stein, *Structural equation models in medical research*. Stat Methods Med Res, 1992. 1(2): p. 159-81.

89. Pembrey, M., The Avon Longitudinal Study of Parents and Children (ALSPAC): a resource for genetic epidemiology. Eur J Endocrinol, 2004. 151 Suppl 3: p. U125-9.
90. Patel, R. R., T. J. Peters, and D. J. Murphy, Prenatal risk factors for Caesarian section. Analyses of the ALSPAC cohort of 12,944 women in England. Int J Epidemiol, 2005. 34(2): p. 353-67.
91. Headley, J., et al., Medication use during pregnancy: data from the Avon Longitudinal Study of Parents and Children. Eur J Clin Pharmacol, 2004. 60(5): p. 355-61.
92. Fergusson, D. M., L. J. Horwood, and K. Northstone, *Maternal use of cannabis and pregnancy outcome.* Bjog, 2002. 109(1): p. 21-7.
93. Golding, J., Outcome of pregnancy in diabetic women. More investigation is needed into whether control of diabetes is really poorer in England than Norway. Bmj, 2001. 322(7286): p. 614-5.
94. Dorosty, A. R., et al., Factors associated with early adiposity rebound. ALSPAC Study Team. Pediatrics, 2000. 105(5): p. 1115-8.
95. Rogers, I., et al., Financial difficulties, smoking habits, composition of the diet and birthweight in a population of pregnant women in the South West of England. ALSPAC Study Team. Avon Longitudinal Study of Pregnancy and Childhood. Eur J Clin Nutr, 1998. 52(4): p. 251-60.
96. Farrow, A., K. M. Shea, and R. E. Little, Birthweight of term infants and maternal occupation in a prospective cohort of pregnant women. The ALSPAC Study Team. Occup Environ Med, 1998. 55(1): p. 18-23.
97. Maitra, A., et al., Mode of delivery is not associated with asthma or atopy in childhood. Clin Exp Allergy, 2004. 34(9): p. 1349-55.
98. Golding, J., Children of the nineties. A longitudinal study of pregnancy and childhood based on the population of Avon (ALSPAC). West Engl Med J, 1990. 105(3): p. 80-2.
99. Carey, W. M., S C., *Infant Temperament Questionnaire (4-8 months).* 1977, Philadelphia: Dept. Educational Psychology, Temple University.
100. Fullard, W. M., S C. Carey, W B., *Toddler Temperament Scale (1-3 year old children).* 1978, Philadelphia, Pa.: Dept. Educational Psychology, Temple University.
101. Buss, A. P., R., The EAS Temperament Scale., in Temperament: Early Developing Personality Traits. 1984, Erlbaum: Hillsdale, N.J.
102. Goodman, R., *The Strengths and Difficulties Questionnaire: a research note.* J Child Psychol Psychiatr 1997. 38: p. 581-586.
103. Frankenburg, W. D., J B., *Denver Developmental Screening Test.* J Pediatr 1967. 71: p. 181-191.
104. Griffiths, R., *The abilities of babies.* 954, New York: McGraw-Hill.
105. Fenson, L. D., P S. Reznic, S. et al., *Technical Manual for the MacArthur Communicative Development Inventories.* 1991, San Diego, Calif.: Developmental Psychology Laboratory.
106. Miller, M., Christensen, G., Amit, Y. Grenander, U., *A mathematical textbook of deformable neuro-anatomies.* Proceedings of the National Academy of Sciences, 1993. R90: p. 11944-19948.
107. Hastie, T., Tibshirani, R. Friedman, J H., *Elements of Statistical Learning: Data Mining, Inference, and Prediction.* 2001, New York: Springer.
108. Penev, P. A., J J., *Local feature analysis: a general statistical theory for object representation.* Network: Computation in Neural Systems, 1996. 7: p. 477-500.
109. Small, C., *The Statistical Theory of Shape.* 1996, New York: Springer.
110. Dryden, I. L. M., K V., *Statistical Shape Analysis.* 1998, New York: Wiley Press.
111. Lele, S. R., J T., *An Invariant Approach to Statistical Analysis of Shapes.* 2000, London, UK.: Chapman and Hall/CRC Press.
112. McKeague, I., *A Statistical Model for Signature Verification.* Journal of the American Statistical Association, 2005. 100: p. 231-241.
113. Benirschke K, K. P., *Normative Values and Tables (Chapter 28),* in *Pathology of the Human Placenta.* 2002, Springer-Verlag: New York. p. 920-927.
114. Salafia, C. M., et al., Relationship between placental histologic features and umbilical cord blood gases in preterm gestations. Am J Obstet Gynecol, 1995. 173(4): p. 1058-64.
115. Salafia, C. M., et al., Intrauterine growth restriction in infants of less than thirty-two weeks' gestation: associated placental pathologic features. Am J Obstet Gynecol, 1995. 173(4): p. 1049-57.
116. Salafia, C. M., et al., Maternal, placental, and neonatal associations with early germinal matrix/intraventricular hemorrhage in infants born before 32 weeks' gestation. Am J Perinatol, 1995. 12(6): p. 429-36.
117. Salafia, C. M., et al., Clinical correlations of patterns of placental pathology in preterm pre-eclampsia. Placenta, 1998. 19(1): p. 67-72.
118. Salafia, C. M., et al., *Placental pathologic features of preterm preeclampsia.* Am J Obstet Gynecol, 1995. 173(4): p. 1097-105.
119. Salafia, C. M., et al., Placental pathology of absent and reversed end-diastolic flow in growth-restricted fetuses. Obstet Gynecol, 1997. 90(5): p. 830-6.
120. Viscardi, R. M. and C. C. Sun, Placental lesion multiplicity: risk factor for IUGR and neonatal cranial ultrasound abnormalities. Early Hum Dev, 2001. 62(1): p. 1-10.
121. Hagberg, H., D. Peebles, and C. Mallard, *Models of white matter injury: comparison of infectious, hypoxic-ischemic, and excitotoxic insults.* Ment Retard Dev Disabil Res Rev, 2002. 8(1): p. 30-8.
122. K, B., Examination of the Placenta, prepared for the Collaborative Study on Cerebral Palsy, Mental retardation and other Neurological and Sensory Disorders of Infancy and Childhood, N.I.o.N.D.a. Blindness, Editor. 1961, US Department of Health, Education and Welfare.
123. Kuh, D. and R. Hardy, *A life course approach to women's health. Life course approach to adult health; no. 1.* 2002, Oxford; New York: Oxford University Press. xvi, 419 p.
124. Niswander, K. and M. Gordon, The Collaborative Perinatal Study of the National Institute of Neurological Diseases and Stroke: The Women and Their Pregnancies. 1972, Philadelphia, Pa.: W.B. Saunders.
125. Myrianthopoulos, N. C. and K. S. French, An application of the U.S. Bureau of the Census socioeconomic index to a large, diversified patient population. Soc Sci Med, 1968. 2(3): p. 283-99.

What is claimed is:
1. A method of analyzing a placenta comprising:
 (a) selecting the placenta to be analyzed;
 (b) obtaining a digital image of an entire chorionic surface of the placenta;
 (c) inputting the digital image into a processor; and
 (d) performing an analysis on the digital image in the processor, wherein the processor applies a mathematical algorithm to the digital image in which the algorithm does not include the step of comparing the sample image to a known or reference image.

2. The method of claim 1, wherein the mathematical algorithm analyzes a placental shape, placental diameter, major or minor axes, placental circumference, centrality of umbilical cord location, or placental area.

3. The method of claim 1, wherein the mathematical algorithm is used to assess the timing of an event or stress to the developing placenta or fetus.

4. The method of claim 3, wherein results of timing of an event or stress are used to assess future health risks to a patient.

5. A system for analyzing a placenta and histology slides of placental tissue comprising:
   a source of a digital image of the placenta;
   a processor, in communication with the source, for performing an analysis on the digital image in the processor, wherein the processor applies a mathematical algorithm to the digital image in which the algorithm does not include the step of comparing the sample ma e to a known or reference image; and
   an output, in communication with the processor, for outputting the analysis.

6. The system of claim 5, wherein the processor is configured such that the mathematical algorithm analyzes a placental shape, placental diameter, major or minor axes, placental circumference, centrality of umbilical cord location, or placental area.

7. The system of claim 5, wherein the processor is configured such that results of timing of an event or stress are used to assess future health risks to a patient.

8. A system for analyzing a placenta comprising:
   a source for a digital image of each placental sample from the placenta;
   a processor, in communication with the source, for performing an analysis on the digital images, wherein a mathematical algorithm is applied to the digital images to reconstruct a three dimensional model of the placenta in which the algorithm does not include the step of comparing the sample image to a known or reference image; and
   an output for outputting the analysis.

9. The system of claim 8, wherein the processor is configured such that the mathematical algorithm analyzes a three dimensional placental shape, placental thickness, or placental volume.

10. The system of claim 8, wherein the processor is configured such that results of timing of an event or stress are used to assess future health risks to a patient.

11. An article of manufacture for analyzing a placenta and histology slides of placental tissue comprising:
    a non-transitory computer-readable storage medium, and
    code stored on the medium, the code, when executed on a processor, controlling the processor for performing an analysis on a digital image of a placental sample from the placenta, wherein the processor applies a mathematical algorithm to the digital image in which the algorithm does not include the step of comparing the sample image to a known or reference image.

12. An article of manufacture for analyzing a placenta comprising:
    a non-transitory computer-readable storage medium, and
    code stored on the medium, the code, when executed on a processor, controlling the processor for performing an analysis on digital images of a plurality of placental samples from the placenta, wherein a mathematical algorithm is applied to the digital images to reconstruct a three dimensional model of the placenta in which the algorithm does not include the step of comparing the sample image to a known or reference image.

\* \* \* \* \*